(12) United States Patent
Toriumi et al.

(10) Patent No.: US 10,852,503 B2
(45) Date of Patent: Dec. 1, 2020

(54) JOINT STRUCTURE

(71) Applicant: Ricoh Company, Ltd., Tokyo (JP)

(72) Inventors: Yuji Toriumi, Tokyo (JP); Makoto Iikawa, Tokyo (JP); Takaaki Fujiya, Tokyo (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 18 days.

(21) Appl. No.: 16/356,586

(22) Filed: Mar. 18, 2019

(65) Prior Publication Data
US 2019/0293900 A1 Sep. 26, 2019

(30) Foreign Application Priority Data

Mar. 20, 2018 (JP) .................................. 2018-053349
Feb. 21, 2019 (JP) .................................. 2019-029668

(51) Int. Cl.
| | |
|---|---|
| *G02B 7/02* | (2006.01) |
| *G03B 17/12* | (2006.01) |
| *F16B 3/00* | (2006.01) |
| *F16B 11/00* | (2006.01) |
| *F16B 19/02* | (2006.01) |
| *H04N 5/225* | (2006.01) |
| *G02B 7/00* | (2006.01) |
| *F16B 4/00* | (2006.01) |

(52) U.S. Cl.
CPC ............. *G02B 7/023* (2013.01); *F16B 3/005* (2013.01); *F16B 11/006* (2013.01); *F16B 19/02* (2013.01); *G02B 7/003* (2013.01); *G02B 7/025* (2013.01); *G03B 17/12* (2013.01); *H04N 5/2254* (2013.01); *F16B 4/004* (2013.01); *G02B 7/004* (2013.01); *G03B 2205/0023* (2013.01)

(58) Field of Classification Search
None
See application file for complete search history.

(56) References Cited

U.S. PATENT DOCUMENTS

| | | | |
|---|---|---|---|
| 2,257,001 | A | 9/1941 | Davis |
| 5,884,110 | A | 3/1999 | Iikawa et al. |
| 5,969,889 | A | 10/1999 | Iikawa et al. |
| 6,118,601 | A | 9/2000 | Iikawa et al. |
| 6,178,295 | B1 | 1/2001 | Nakata et al. |

(Continued)

FOREIGN PATENT DOCUMENTS

| | | |
|---|---|---|
| EP | 0552510 A2 | 7/1993 |
| JP | 9-130536 | 5/1997 |
| JP | 2015-097325 | 5/2015 |

OTHER PUBLICATIONS

European Search Report dated Jul. 29, 2019, issued in corresponding European Application No. 19163675.2, 6 page.

*Primary Examiner* — William B Perkey
(74) *Attorney, Agent, or Firm* — Xsensus LLP

(57) ABSTRACT

A joint structure includes: a plurality of holes open to opposing surfaces of two members that oppose to each other, the holes each being filled with a fluid or powder filler (U) in a state where the holes communicate with each other, such that the two members are relatively fixed by the filler. The holes of the two members each have an inner surface that is wider in cross-sectional direction at a location distant from openings of the holes than at a location close to the openings.

20 Claims, 34 Drawing Sheets

(56) References Cited

U.S. PATENT DOCUMENTS

| | | | |
|---|---|---|---|
| 6,236,523 B1 | 5/2001 | Iikawa et al. | |
| 6,269,227 B1 | 7/2001 | Hamasaki et al. | |
| 6,298,192 B1* | 10/2001 | Yoo | G02B 6/30 385/137 |
| 6,333,825 B1 | 12/2001 | Hamasaki et al. | |
| 6,856,015 B1* | 2/2005 | Huang | H01L 21/4882 257/704 |
| 10,036,892 B1* | 7/2018 | Yoon | G02B 27/62 |
| 10,534,154 B2* | 1/2020 | Hubert | H04N 5/2254 |
| 10,562,467 B2* | 2/2020 | Yoshida | H04N 5/2253 |
| 2001/0009071 A1 | 7/2001 | Iikawa et al. | |
| 2002/0012539 A1 | 1/2002 | Sato et al. | |
| 2002/0020937 A1 | 2/2002 | Iikawa et al. | |
| 2002/0080049 A1 | 6/2002 | Iikawa et al. | |
| 2002/0105731 A1 | 8/2002 | Iikawa et al. | |
| 2002/0114087 A1 | 8/2002 | Iikawa et al. | |
| 2004/0012862 A1 | 1/2004 | Iikawa | |
| 2004/0061958 A1 | 4/2004 | Kobayashi et al. | |
| 2004/0090681 A1 | 5/2004 | Iikawa et al. | |
| 2004/0090682 A1 | 5/2004 | Iikawa | |
| 2004/0136090 A1 | 7/2004 | Iikawa et al. | |
| 2004/0136777 A1 | 7/2004 | Iikawa et al. | |
| 2005/0072646 A1 | 4/2005 | Hamasaki et al. | |
| 2005/0087416 A1 | 4/2005 | Iikawa et al. | |
| 2005/0094992 A1 | 5/2005 | Hamasaki et al. | |
| 2005/0115358 A1 | 6/2005 | Hamasaki et al. | |
| 2005/0244215 A1* | 11/2005 | Prat | F16B 11/006 403/268 |
| 2006/0104624 A1 | 5/2006 | Nakata et al. | |
| 2007/0002468 A1 | 1/2007 | Iikawa et al. | |
| 2007/0258155 A1 | 11/2007 | Shimizu et al. | |
| 2008/0044175 A1 | 2/2008 | Iikawa | |
| 2008/0075454 A1 | 3/2008 | Iikawa | |
| 2008/0204878 A1 | 8/2008 | Ilkawa et al. | |
| 2008/0259472 A1 | 10/2008 | Iikawa | |
| 2010/0214679 A1 | 8/2010 | Iikawa et al. | |
| 2011/0299180 A1* | 12/2011 | Yen | G02B 7/025 359/819 |
| 2012/0075720 A1 | 3/2012 | Iikawa et al. | |
| 2012/0075731 A1 | 3/2012 | Iikawa et al. | |
| 2013/0050405 A1 | 2/2013 | Masuda et al. | |
| 2013/0050408 A1 | 2/2013 | Masuda et al. | |
| 2013/0057542 A1 | 3/2013 | Takenaka et al. | |
| 2013/0063754 A1 | 3/2013 | Saisho et al. | |
| 2013/0235149 A1 | 9/2013 | Tanaka et al. | |
| 2013/0242040 A1 | 9/2013 | Masuda et al. | |
| 2013/0326419 A1 | 12/2013 | Harada et al. | |
| 2014/0036031 A1 | 2/2014 | Tanaka et al. | |
| 2014/0071226 A1 | 3/2014 | Satoh et al. | |
| 2014/0071227 A1 | 3/2014 | Takenaka et al. | |
| 2014/0078247 A1 | 3/2014 | Shohara et al. | |
| 2014/0111686 A1 | 4/2014 | Iikawa et al. | |
| 2014/0119720 A1 | 5/2014 | Iikawa et al. | |
| 2014/0119721 A1 | 5/2014 | Iikawa et al. | |
| 2014/0132709 A1 | 5/2014 | Satoh et al. | |
| 2014/0152852 A1 | 6/2014 | Ito et al. | |
| 2014/0176542 A1 | 6/2014 | Shohara et al. | |
| 2015/0015664 A1 | 1/2015 | Masuda et al. | |
| 2015/0015766 A1 | 1/2015 | Satoh et al. | |
| 2015/0042647 A1 | 2/2015 | Shohara et al. | |
| 2015/0062363 A1 | 3/2015 | Takenaka et al. | |
| 2015/0192762 A1 | 7/2015 | Satoh et al. | |
| 2015/0222816 A1 | 8/2015 | Shohara et al. | |
| 2015/0301316 A1 | 10/2015 | Masuda et al. | |
| 2016/0006907 A1 | 1/2016 | Masuda et al. | |
| 2016/0147045 A1 | 5/2016 | Masuda et al. | |
| 2016/0182825 A1 | 6/2016 | Tanaka et al. | |
| 2016/0266359 A1 | 9/2016 | Amano et al. | |
| 2016/0313541 A1 | 10/2016 | Satoh et al. | |
| 2016/0337584 A1 | 11/2016 | Masuda et al. | |
| 2016/0353020 A1 | 12/2016 | Satoh et al. | |
| 2017/0116704 A1 | 4/2017 | Takenaka et al. | |
| 2017/0270381 A1 | 9/2017 | Itoh et al. | |
| 2017/0310895 A1 | 10/2017 | Masuda et al. | |
| 2017/0315336 A1 | 11/2017 | Masuda et al. | |
| 2018/0024333 A1 | 1/2018 | Satoh et al. | |
| 2018/0213152 A1 | 7/2018 | Masuda et al. | |
| 2019/0262943 A1* | 8/2019 | Asami | B23K 26/244 |
| 2019/0293913 A1* | 9/2019 | Toriumi | G02B 7/022 |

* cited by examiner

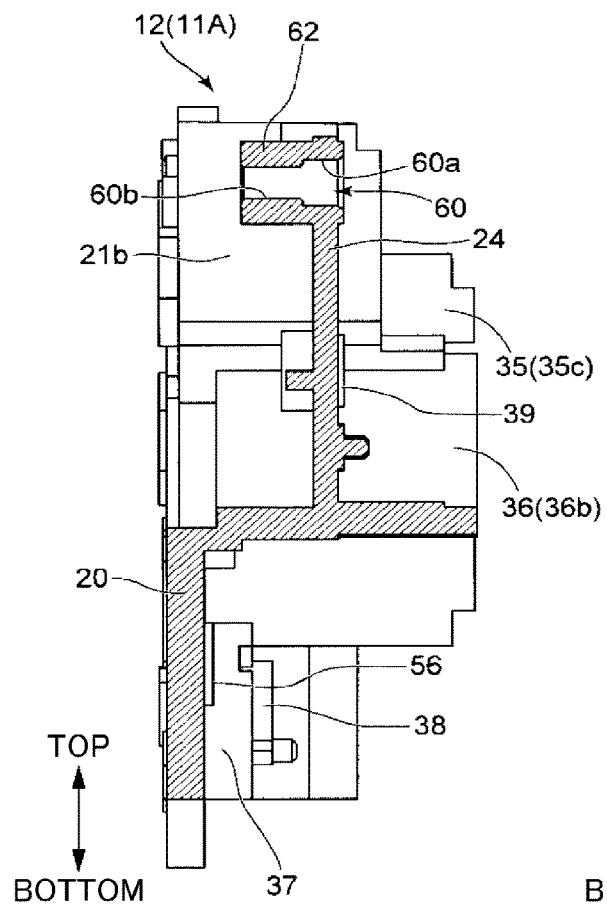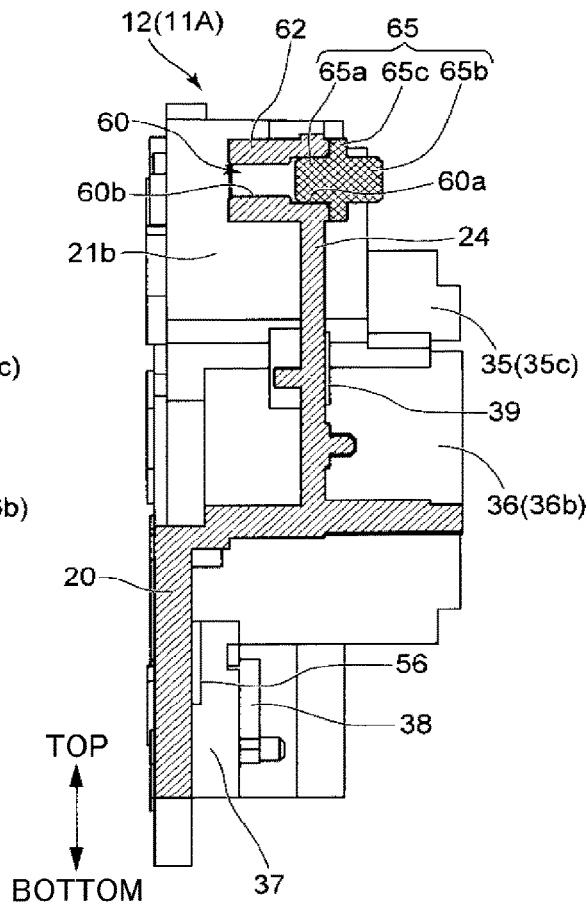
FIG. 20A
FIG. 20B

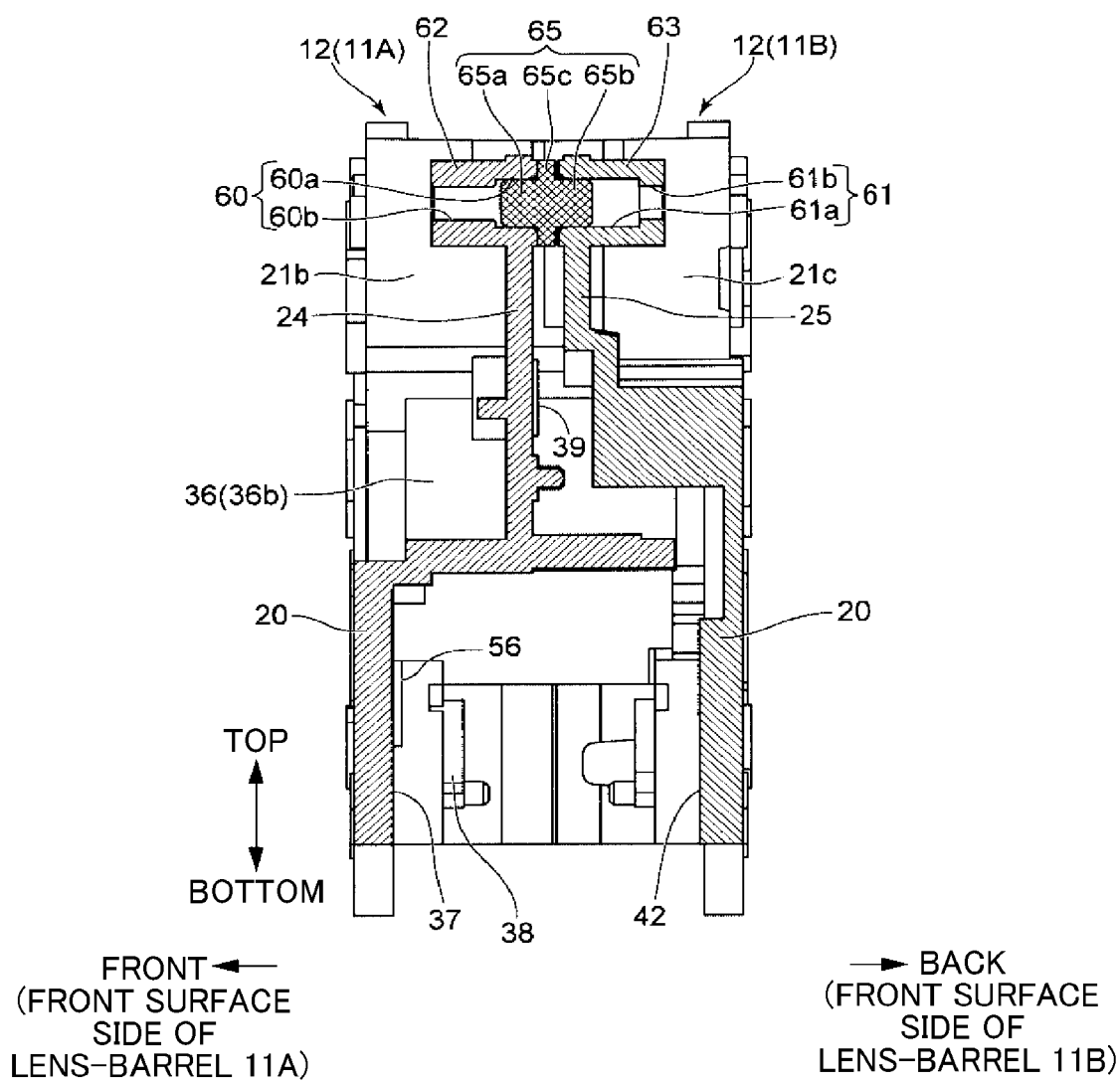

FIG. 22
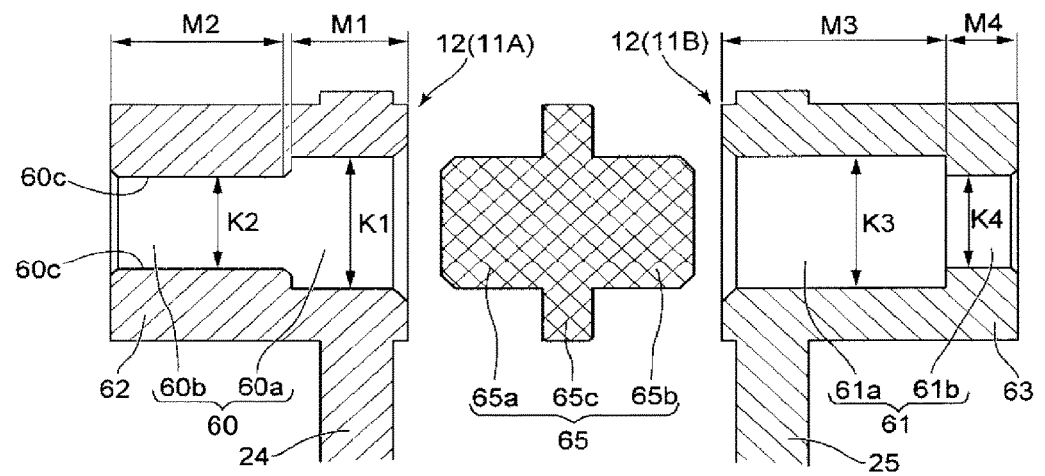
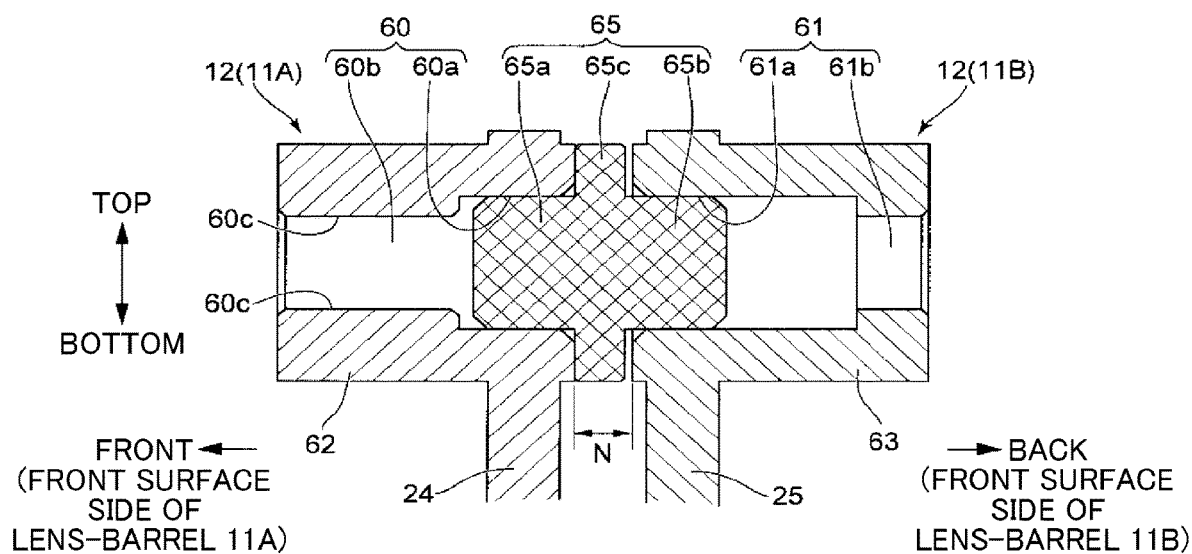

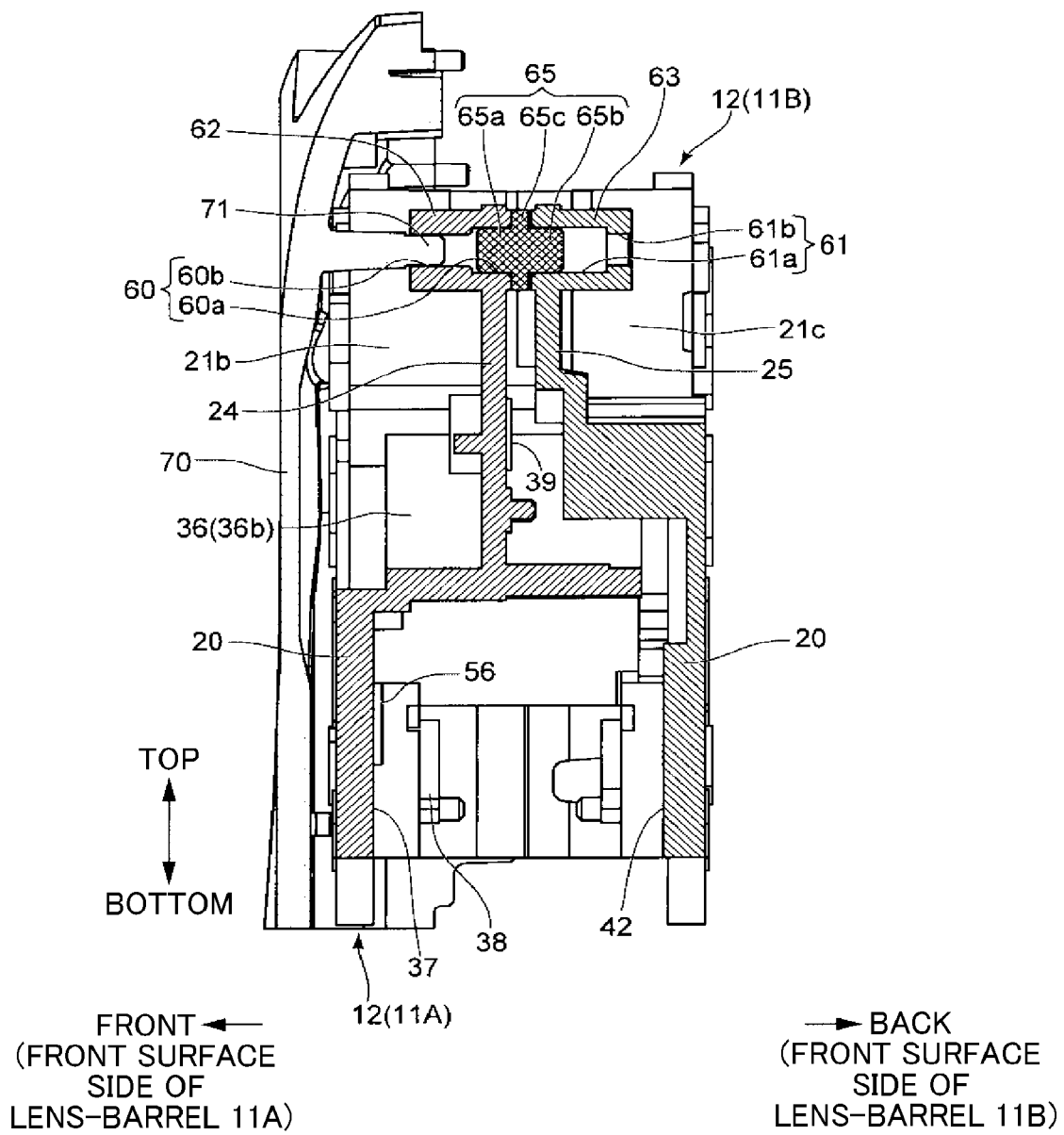

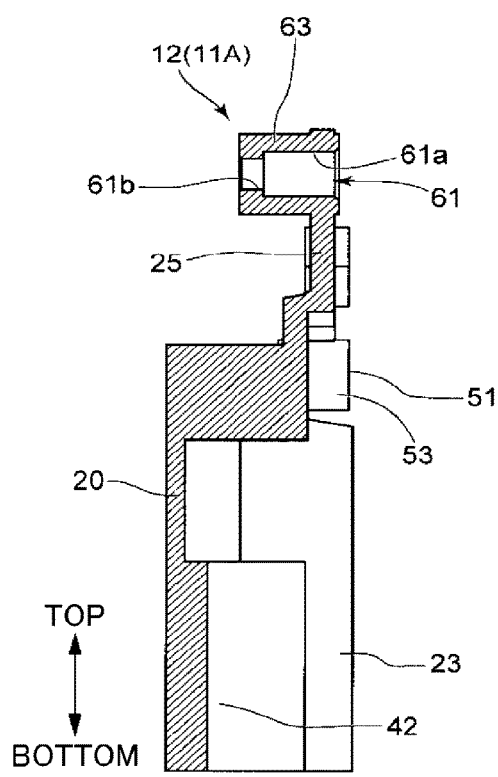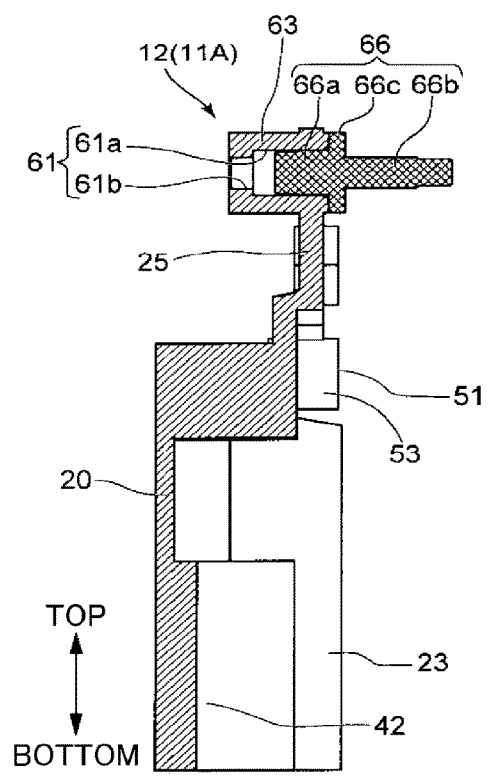

← FRONT SURFACE SIDE OF LENS-BARREL 11A, 11B

REAR SURFACE SIDE OF LENS-BARREL 11A, 11B →

← FRONT SURFACE SIDE OF LENS-BARREL 11A, 11B

REAR SURFACE SIDE OF LENS-BARREL 11A, 11B →

JOINT STRUCTURE

CROSS-REFERENCE TO RELATED APPLICATIONS

This patent application is based on and claims priority pursuant to 35 U.S.C. § 119(a) to Japanese Patent Application No. 2018-053349, filed on Mar. 20, 2018, and 2019-029668, filed on Feb. 21, 2019, in the Japan Patent Office, the entire disclosure of which is hereby incorporated by reference herein.

BACKGROUND

Technical Field

The present invention relates to a joint structure.

Description of the Related Art

It is required in an imaging apparatus that a member for supporting an optical element such as a lens is positioned with high accuracy and attached to the imaging apparatus, for the purpose of achieving predetermined optical performance. For example, while fixing by screws achieves strong fixation, it is difficult to control the amount of mispositioning due to fixing torque. Bonding by adhesives is thus commonly employed to fix components in the imaging apparatus.

Examples of fixing by adhesives include adhesion bonding in which bonded portions contact to each other and filling bonding in which a gap is present between bonded portions and an adhesive is filled in the gap. However, in the bonding structure of the related art, complicated shape machining must be applied to bonded components, which requires the cost and effort.

SUMMARY

Example embodiments of the present invention include a joint structure, including: a plurality of holes open to opposing surfaces of two members that oppose to each other, the holes each being filled with a fluid or powder filler in a state where the holes communicate with each other, such that the two members are relatively fixed by the filler. The holes of the two members each have an inner surface that is wider in cross-sectional direction at a location distant from openings of the holes than at a location close to the openings.

Example embodiments of the present invention include a joint structure, including: a plurality of holes open to opposing surfaces of two members that oppose to each other, the holes each being filled with a fluid or powder filler in a state where the holes communicate with each other, such that the two members are relatively fixed by the filler. The holes of the two members each have a retaining surface that faces opposite to the opposing surfaces. When force for separating the opposing surfaces from each other is applied between the two members, a relative movement of the two members is restricted by a contact between the filler in a solidified state and the retaining surfaces.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 20A is a cross-sectional view taken along a line XX-XX of FIGS. 15 and 16, illustrating a detachment state of the shaft member, according to an embodiment;

FIG. 20B is a cross-sectional view taken along the line XX-XX of FIGS. 15 and 16, illustrating an attachment state of the shaft member, according to an embodiment;

FIG. 21 is a cross-sectional view taken along a line XXI-XXI of FIG. 5, according to an embodiment;

FIG. 22 is a cross-sectional view of a positioning mechanism on a main reference side, according to an embodiment;

FIG. 23 is a cross-sectional view of a state where a front cover of the imaging apparatus is attached to the lens-barrel at a cross-section position illustrated in FIG. 21, according to an embodiment;

FIG. 24A is a cross-sectional view taken along a line XXIV-XXIV of FIGS. 15 and 16, illustrating the detachment state of the shaft member, according to an embodiment;

FIG. 24B is a cross-sectional view taken along the line XXIV-XXIV of FIGS. 15 and 16, illustrating the attachment state of the shaft member, according to an embodiment;

Figure 1:
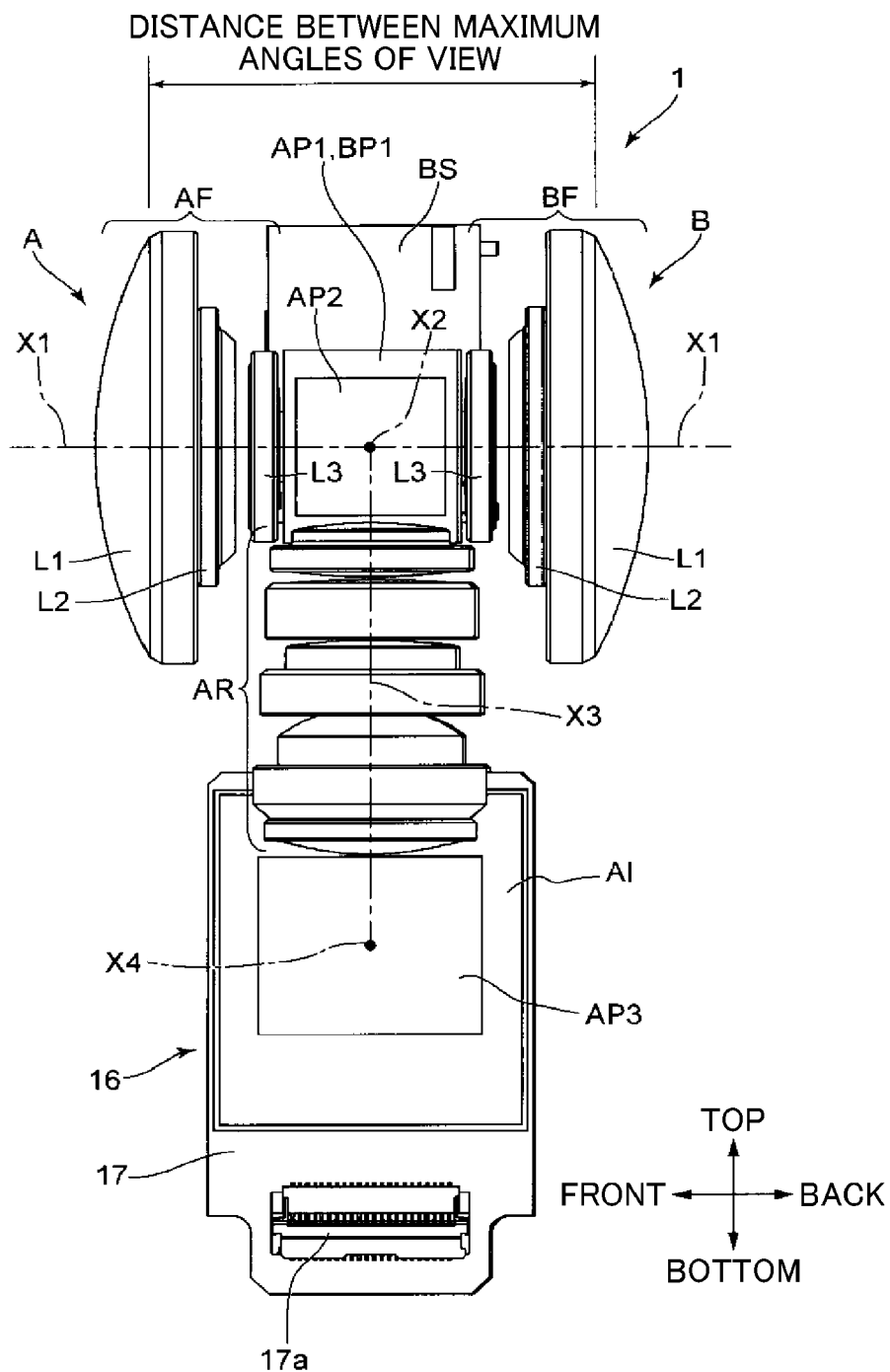
FIG. 1 is a view of an imaging system that configures an imaging apparatus according to the present embodiment, as seen from the left.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

An optical system and an imaging apparatus according to an embodiment, to which the present invention is applied, will be described hereinafter with reference to the drawings. The imaging apparatus of the present embodiment includes a composite lens-barrel 10 (FIGS. 4 through 7) having an imaging system 1 (FIGS. 1 through 3) incorporated therein, and exterior members and other members are attached to the composite lens-barrel 10. The composite lens-barrel 10 is formed by symmetrically combining a lens-barrel 11A and a lens-barrel 11B that have the same structure. The outline of the imaging system 1 will be described first and then the composite lens-barrel 10 will be described. In the following description, front, back, top, bottom, left, and right directions are based on arrow directions indicated in the drawings.

The imaging system 1 includes two wide-angle lens systems (imaging optical systems) A and B that are symmetrically arranged and two image sensors AI and BI in which images from the two wide-angle lens systems A and B are formed. The two wide-angle lens systems A and B have the same specification, and the image sensors AI and BI have also the same specification. The wide-angle lens systems A and B have an angle of view larger than 180°. The imaging system 1 may be an omnidirectional imaging system that combines two images formed by the image sensors AI and BI to obtain an image having a solid angle of less than $4\pi$ radians.

The wide-angle lens systems A and B respectively include negative power front lenses AF and BF, first prisms AP1 and BP1, variable apertures AS and BS, second prisms AP2 and BP2, positive power rear lenses AR and BR, and third prisms AP3 and BP3 in this order from an object side to an image side. The front lenses AF and BF have a function of taking in rays with an angle of view larger than 180°. The rear lenses AR and BR have a function of correcting an aberration of an image formed. The variable aperture AS is conceptually illustrated in FIG. 2.

In the wide-angle lens system A, the front lens AF scatters a subject light beam entering from the front and then emits the subject light beam backward. The first prism AP1 reflects a subject light beam from the front lens AF 90° to the left. The variable aperture AS adjusts (performs light amount adjustment) the transmission amount of a subject light beam reflected by the first prism AP1. The second prism AP2 reflects a subject light beam subjected to the light amount adjustment by the variable aperture AS 90° downward. The rear lens AR converges a subject light beam reflected by the second prism AP2 and emits the subject light beam downward. The third prism AP3 reflects a subject light beam from the rear lens AR 90° to the right and images the subject light beam on an imaging surface of the image sensor AI. The front lens AF and the rear lens AR are respectively constituted by a plurality of lenses.

In the wide-angle lens system B, the front lens BF scatters a subject light beam entering from the back and then emits the subject light beam frontward. The first prism BP1 reflects a subject light beam from the front lens BF 90° to the left. The variable aperture BS adjusts transmittance (a light intensity) of the subject light beam reflected from the first prism BP1. The second prism BP2 reflects a subject light beam subjected to the light amount adjustment by the variable aperture BS 90° downward. The rear lens BR converges a subject light beam reflected by the second prism BP2 and emits the subject light beam downward. The third prism BP3 reflects a subject light beam from the rear lens BR 90° to the left and images the subject light beam on an imaging surface of the image sensor BI. The front lens BF and the rear lens BR are respectively constituted by a plurality of lenses.

The first prism AP1 and the first prism BP1 are arranged so that inclined surfaces of these prisms are back to back and close to each other. The image sensors AI and BI of the wide-angle lens systems A and B are supported so that the imaging surface of the image sensor AI faces left and the imaging surface of the image sensor BI faces right, and back surfaces of the image sensors AI and BI (surfaces opposite to the imaging surfaces) are back to back.

In the wide-angle lens system A and the wide-angle lens system B, optical axes of the front lenses AF and BF are defined as an optical axis X1 (incident optical axis). The optical axes from reflecting surfaces of the first prisms AP1 and BP1 to reflecting surfaces of the second prisms AP2 and BP2 are defined as an optical axis X2. The optical axes of the rear lenses AR and BR are defined as an optical axis X3. The optical axes from reflecting surfaces of the third prisms AP3 and BP3 to the image sensors AI and BI are defined as an optical axis X4. The wide-angle lens system A and the wide-angle lens system B are arranged in a front-back direction so that the optical axes X1 of these lens systems are on the same axis and the front lens AF and the front lens BF are symmetrical to each other in the front-back direction with respect to a predetermined plane perpendicular to the optical axis X1 (a plane opposing the wide-angle lens systems A and B).

The optical axes X2, X3 and X4 of the wide-angle lens system A and the optical axes X2, X3, and X4 of the wide-angle lens system B are placed on the opposing plane described above. More specifically, the optical axis X2 of the wide-angle lens system A and the optical axis X2 of the wide-angle lens system B are on the same optical axis and extend in a left-right direction. In addition, the optical axis X4 of the wide-angle lens system A and the optical axis X4 of the wide-angle lens system B are also on the same optical axis and extend in the left-right direction. The optical axis X3 of the rear lens AR and the optical axis X3 of the rear lens BR are spaced away from each other in the left-right direction and parallel to each other.

Figure 2:
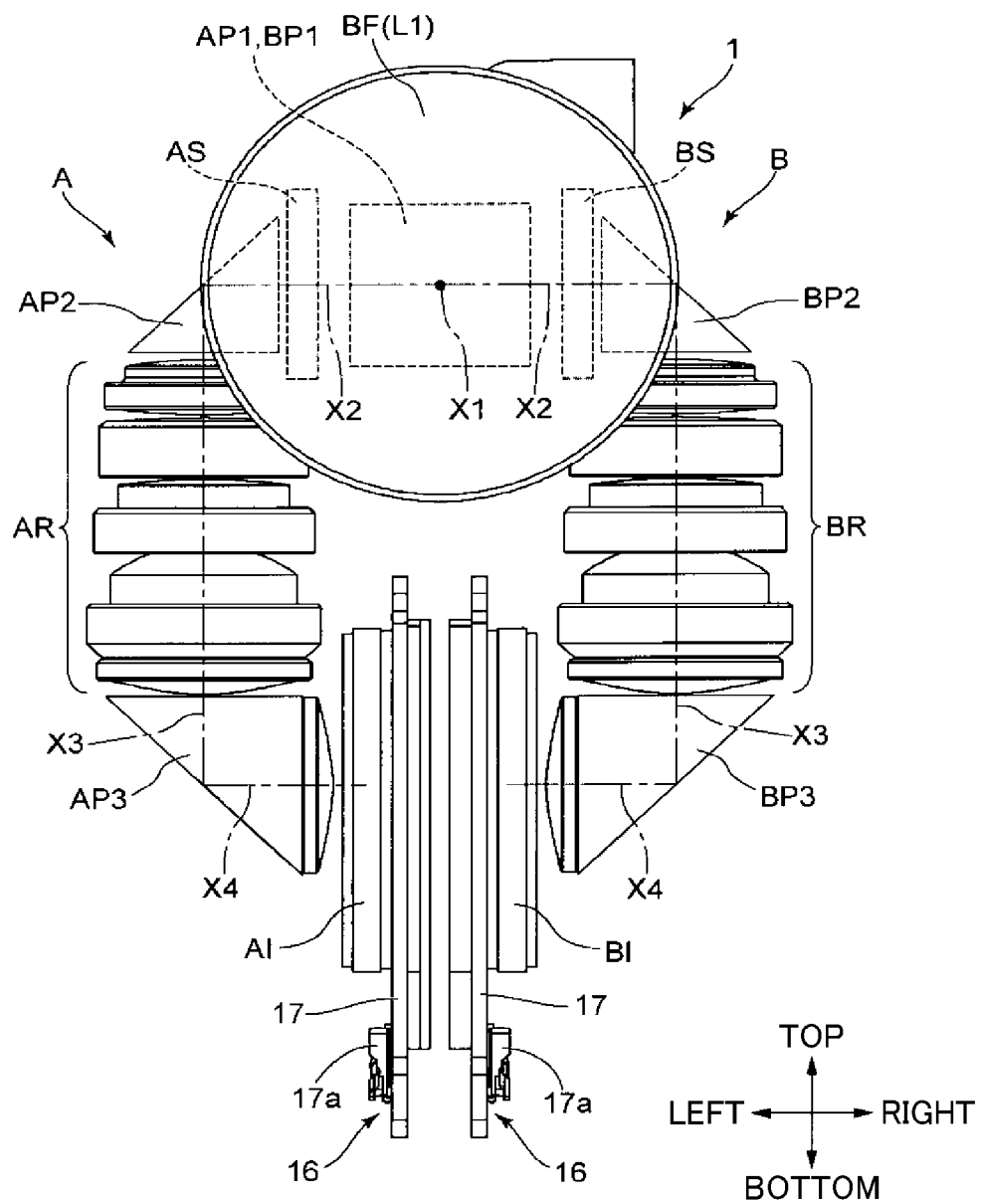
FIG. 2 is a view of the imaging system as seen from the back, according to an embodiment.

As the optical path is bent for a plurality of times in different directions within the plane opposing the wide-angle lens systems A and B, long optical paths of the wide-angle lens systems A and B can be obtained. In addition, it is possible to minimize the distance (the distance between maximum angles of view) between incident positions of a ray with a maximum angle of view on a lens of the wide-angle lens system A closest to an object (a first lens L1 of the front lens AF to be described later) and a lens of the wide-angle lens system B closest to the object (a first lens L1 of the front lens BF to be described later) (The distance between maximum angles of view is illustrated in FIG. 1). As a result, it is possible to increase the image sensors AI and BI in size and at the same time to downsize (reduce in thickness) the imaging system 1. Moreover, it is possible to reduce parallax that is an overlapping amount of two images combined in calibration and to obtain an image with high quality.

The composite lens-barrel 10 is constituted by the lens-barrel 11A that supports the wide-angle lens system A and the image sensor AI and the lens-barrel 11B that supports the wide-angle lens system B and the image sensor BI. The lens-barrel 11A and the lens-barrel 11B have the same shape (configuration), and are arranged symmetrically in the front-back direction and combined with each other. The lens-barrel 11A and the lens-barrel 11B will be described in detail with reference to FIG. 4 and subsequent drawings. Like reference numerals are given to components that are common to the lens-barrel 11A and the lens-barrel 11B. A subject side (An object side) of each of the lens-barrel 11A and the lens-barrel 11B in the front-back direction along the optical axis X1 is defined as "front surface" and a side of each of the lens-barrel 11A and the lens-barrel 11B opposite to the subject side is defined as "rear surface". In the lens-barrel 11A, its front surface side (its subject side) faces the front and its rear surface side faces the back. In the lens-barrel 11B, its front surface side (its subject side) faces the back and its rear surface side faces the front.

The lens-barrel 11A and the lens-barrel 11B according to the present embodiment are an imaging unit that includes an imaging optical system (the wide-angle lens system A, B) and an image sensor (AI, BI) and can independently obtain a subject image. A part of each of the lens-barrels 11A and 11B that is constituted by the imaging optical system (the wide-angle lens system A, B) and members that directly or indirectly hold the imaging optical system (a base frame 12, a front-lens frame 13, a rear-lens frame 14, a third prism frame 15, and the like) is defined as an optical system.

Each of the lens-barrels 11A and 11B includes the base frame 12, the front-lens frame 13, the rear-lens frame 14, the third prism frame 15, and an image sensor unit 16. The base frame 12, the front-lens frame 13, the rear-lens frame 14, and the third prism frame 15 are formed as molded plastic products.

In the lens-barrel 11A, the base frame 12 supports the first prism AP1, the variable aperture AS, and the second prism AP2. The front-lens frame 13 supports the front lens AF. The rear-lens frame 14 supports the rear lens AR. The third prism frame 15 supports the third prism AP3. The image sensor unit 16 is obtained by unitizing the image sensor AI and a board 17.

In the lens-barrel 11B, the base frame 12 supports the first prism BP1, the variable aperture BS, and the second prism BP2. The front-lens frame 13 supports the front lens BF. The rear-lens frame 14 supports the rear lens BR. The third prism frame 15 supports the third prism BP3. The image sensor unit 16 is obtained by unitizing the image sensor BI and the board 17.

As illustrated in FIGS. 15 to 19, the base frame 12 includes a front wall part 20, an upper wall part 21 located on the front wall part 20, and a side wall part 22 and a side wall part 23 on left and right edges of the front wall part 20. The base frame 12 also includes a corner wall part 24 near a boundary of the upper wall part 21 and the side wall part 22 and a corner wall part 25 near a boundary of the upper wall part 21 and the side wall part 23.

Figure 15:
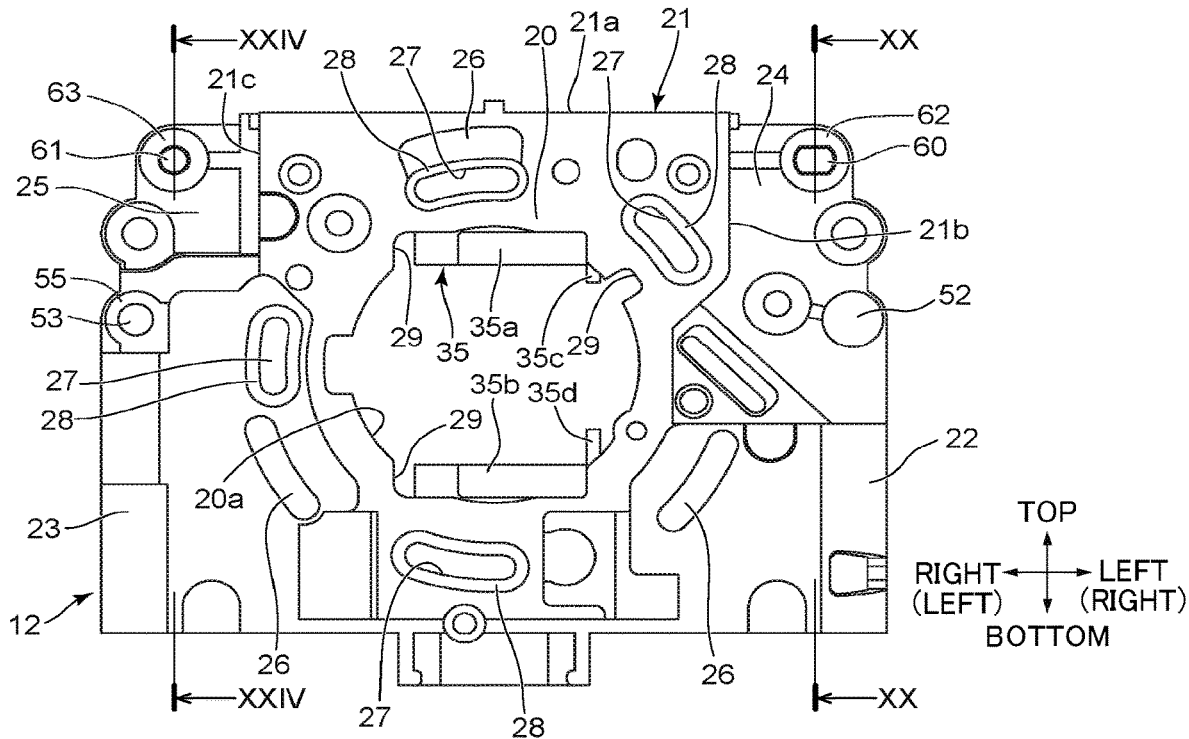
FIG. 15 is a front view of a base frame constituting the lens-barrel, according to an embodiment.

The front wall part 20 is a wall part that substantially faces a subject and includes a front opening 20a that penetrates the base frame 12 in the front-back direction. The optical axis X1 passes near the center of the front opening 20a. As illustrated in FIG. 15, a plurality of (three in the present embodiment) front-lens frame abutting parts 26 are formed on the front surface side of the front wall part 20 so as to surround the front opening 20a. In each of the front-lens frame abutment parts 26, a plane perpendicular to the optical axis X1 is formed on a projection that projects to the front surface side.

The front wall part 20 also includes a plurality of (four in the present embodiment) bonding holes 27 around the front opening 20a. Each bonding hole 27 is an elongated and arc-shaped hole whose longitudinal direction substantially extends along a circumferential direction centered on the optical axis X1. Additionally, each bonding hole 27 penetrates the front wall part 20 in the front-back direction. A joining opposing surface 28 that faces the front surface side is formed around each bonding hole 27. A plurality of bonding recesses 29 are formed in an inner edge portion of the front opening 20a.

Figure 3:
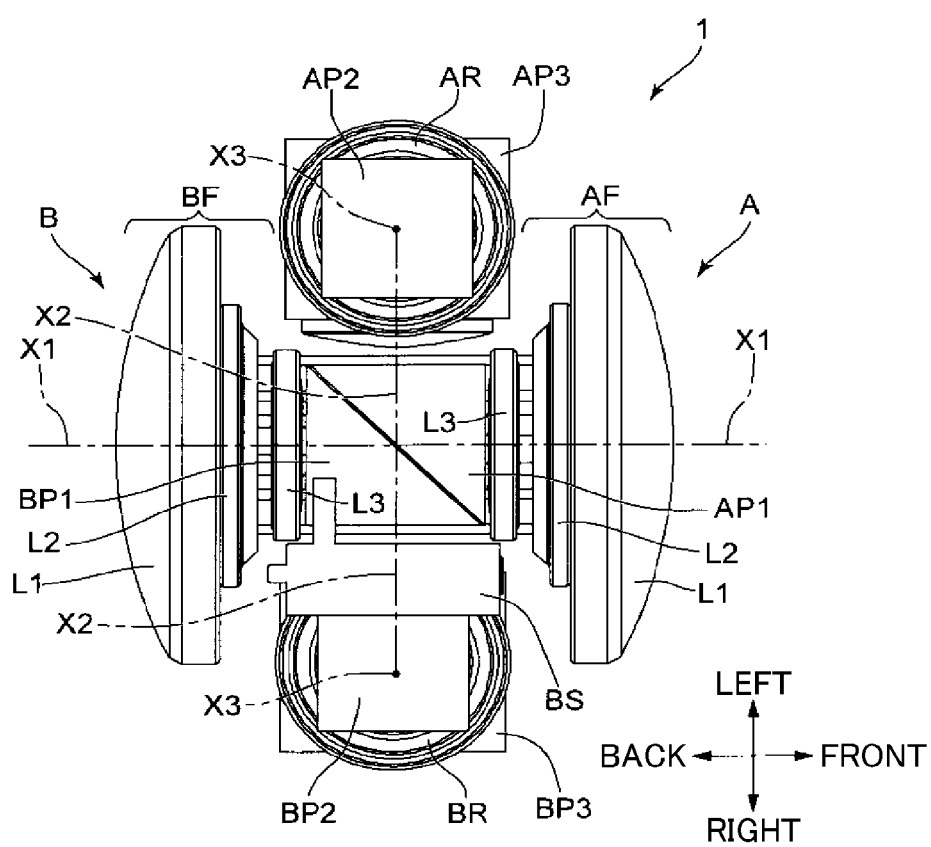
FIG. 3 is a view of the imaging system as seen from the top, according to an embodiment.
Figure 4:
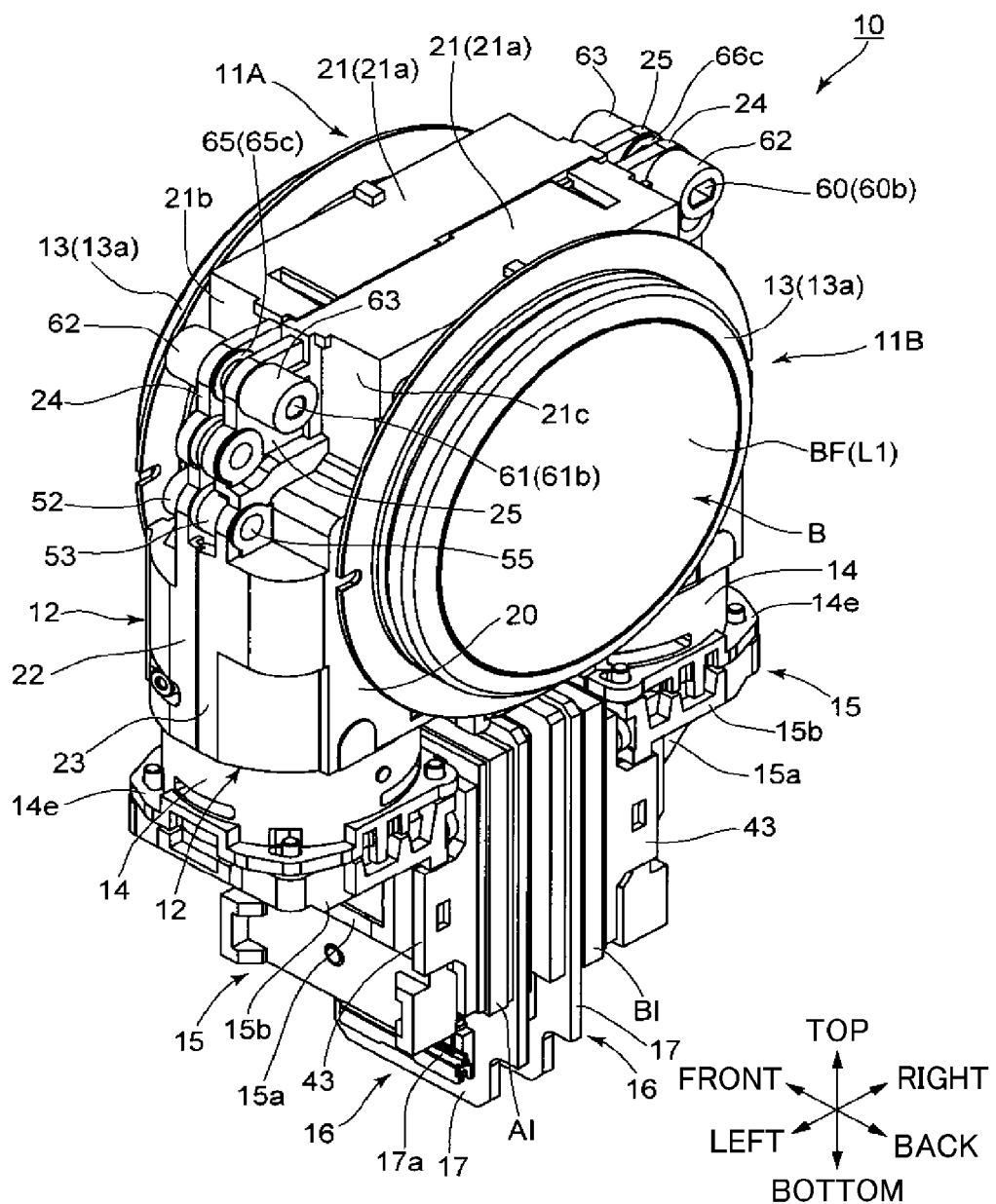
FIG. 4 is a perspective view of a composite lens-barrel including the imaging system, according to an embodiment.
Figure 30:
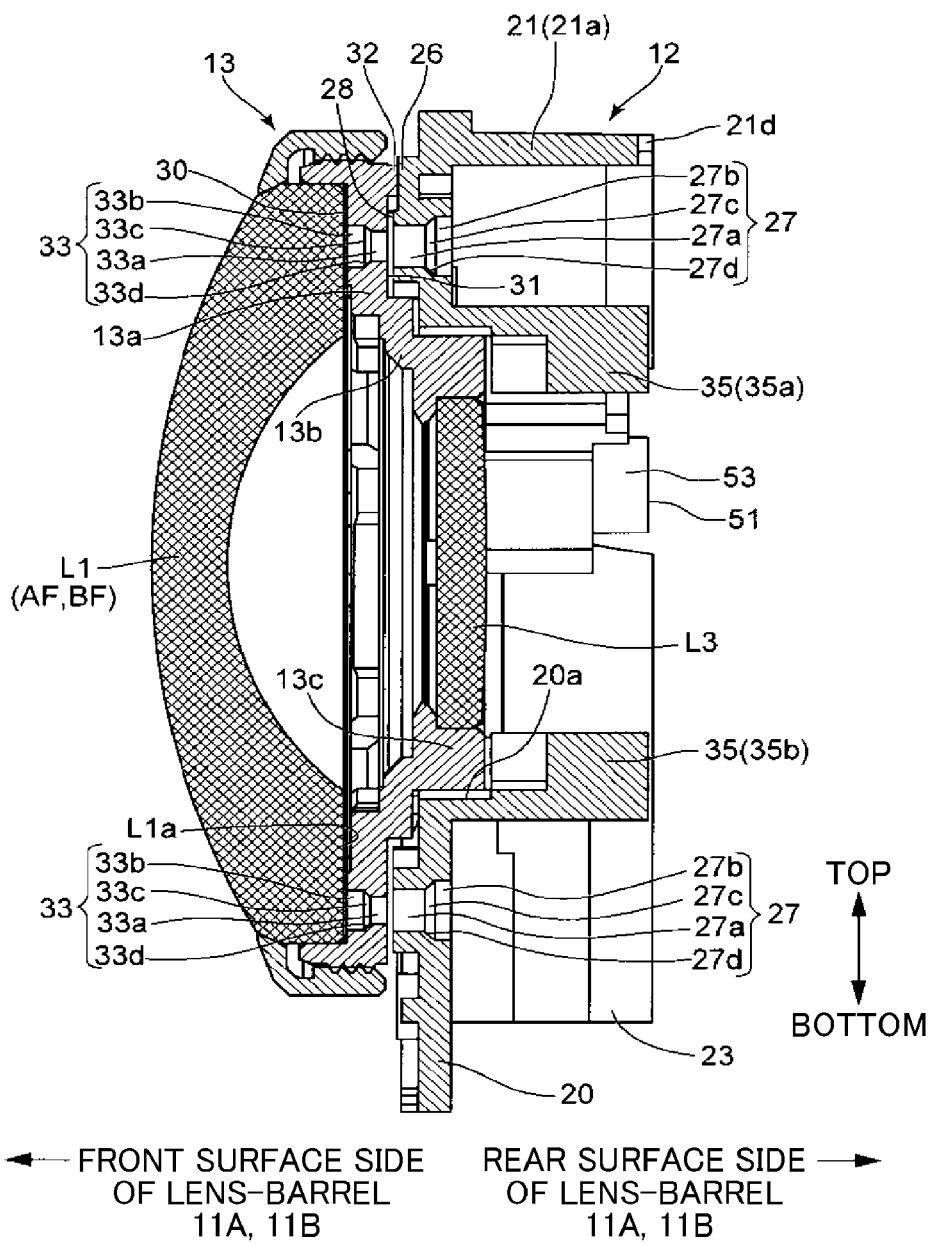
FIG. 30 is a cross-sectional view taken along a line XXX-XXX of FIG. 29, according to an embodiment.
Figure 31:
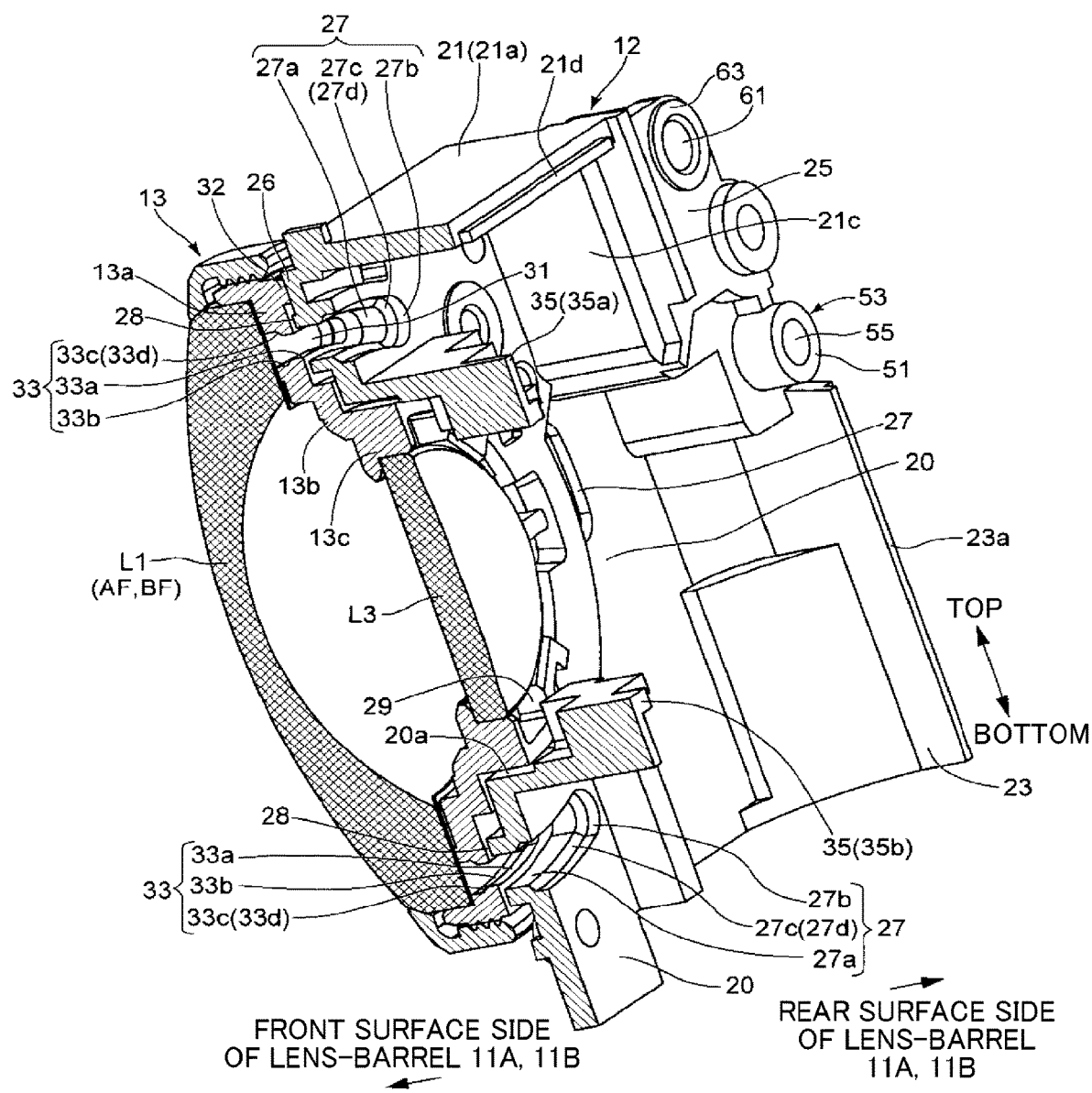
FIG. 31 is a perspective view of the base frame and the front-lens frame, as seen as a cross-section taken along the line XXX-XXX of FIG. 29, according to an embodiment.

As illustrated in FIGS. 1 and 3, each of the front lens AF and the front lens BF is constituted by the first lens L1, the second lens L2, and the third lens L3. As illustrated in FIGS. 30 and 31, the front-lens frame 13 includes a first holding part 13a that has an annular shape and holds the first lens L1, a second holding part 13b that has an annular shape and holds the second lens L2 (not illustrated in FIGS. 30 and 31), and a third holding part 13c that has an annular shape and holds the third lens L3.

As illustrated in FIGS. 30 and 31, the first lens L1 held by the first holding part 13a of the front-lens frame 13 is a negative meniscus lens whose convex surface faces the object side. An annular plane L1a that is perpendicular to the optical axis X1 is formed around a concave surface of the first lens L1, which is an emission surface. The first holding part 13a includes a lens support surface 30 that has an annular shape and supports the plane L1a on the front surface side. On the rear surface side of the lens support surface 30, the first holding part 13a includes a joining opposing surface 31 that opposes the front surface (including the joining opposing surface 28) of the front wall part 20 of the base frame 12 and a plurality of (three in the present embodiment) abutting parts 32 located on a peripheral edge portion of the joining opposing surface 31. In each abutment part 32, a plane perpendicular to the optical axis X1 is formed on a projection that projects from the joining opposing surface 31 to the rear surface side. The abutment part 32 opposes the front-lens frame abutment part 26 of the base frame 12.

The first holding part 13a of the front-lens frame 13 also includes a plurality of (four in the present embodiment) bonding holes 33. Each bonding hole 33 is an elongated and arc-shaped hole whose longitudinal direction substantially extends along the circumferential direction centered on the optical axis X1. Additionally, each bonding hole 33 penetrates the first holding part 13a in the front-back direction. The bonding hole 33 is covered by the plane L1a of the first lens L1 on the side of the lens support surface 30 and is open on the side of the joining opposing surface 31.

Figure 32:
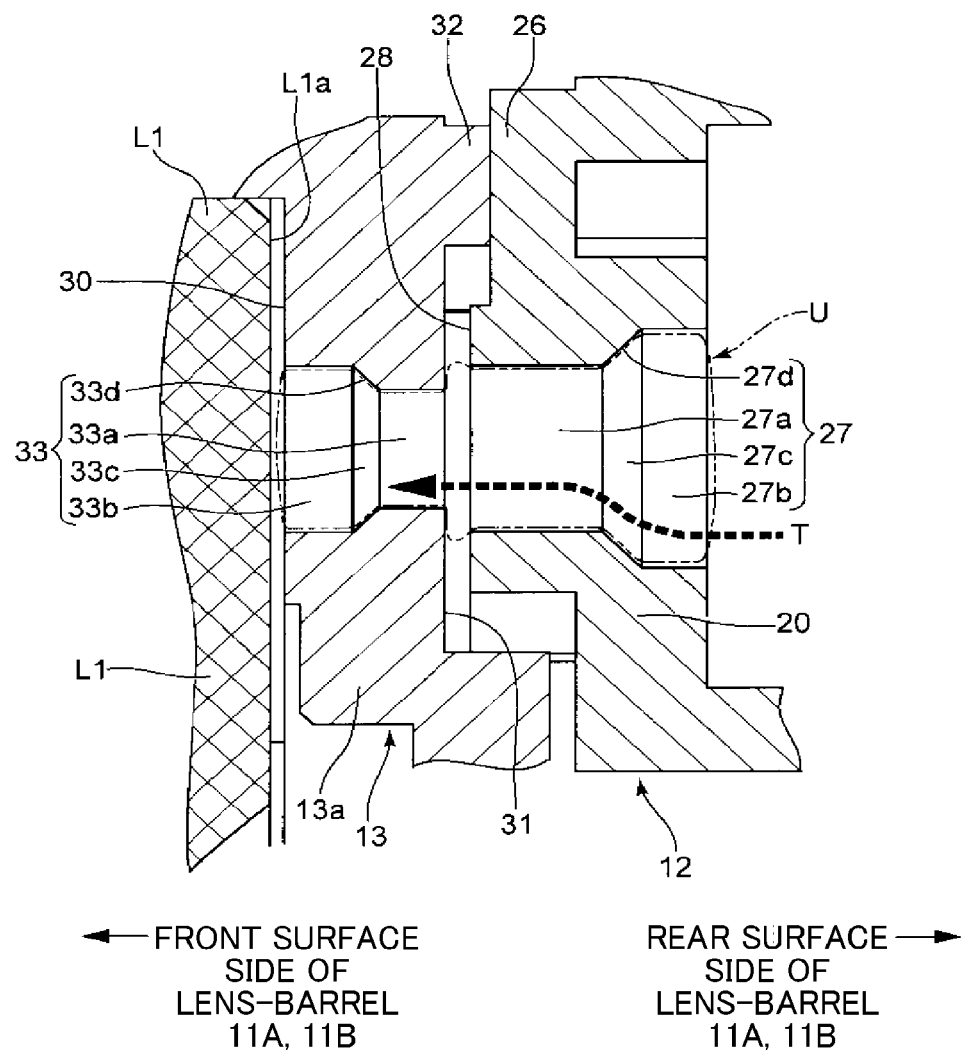
FIG. 32 is a cross-sectional view of a bonding structure in which a part of FIG. 30 is enlarged, according to an embodiment.

As illustrated in FIGS. 30 to 32, the abutment part 32 of the front-lens frame 13 abuts against the front-lens frame abutment part 26 of the base frame 12. The relative position of the front-lens frame 13 with respect to the base frame 12 in the front-back direction is thus determined. The second holding part 13b and the third holding part 13c have a smaller diameter than the first holding part 13a, and enter the front opening 20a. In such a state, a gap is present between the second holding part 13b and the front opening 20a and between the third holding part 13c and the front opening 20a in a radial direction centered on the optical axis X1. Positional adjustment (optical adjustment) of the front-lens frame 13 with respect to the base frame 12 can be performed in a direction perpendicular to the optical axis X1. After the positional adjustment, the front-lens frame 13 is fixed to the base frame 12 by bonding. This bonding structure will be described.

Figure 29:
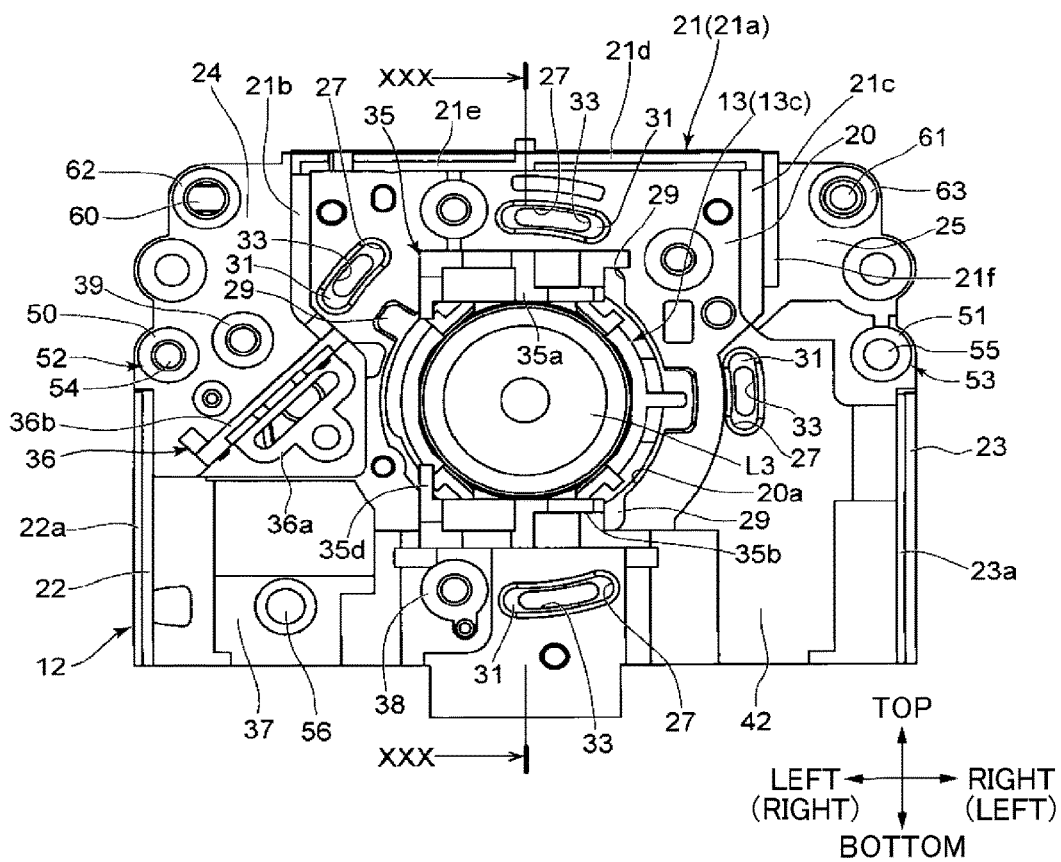
FIG. 29 is a view of the base frame having a front-lens frame attached thereto as seen from the rear, according to an embodiment.

As illustrated in FIG. 29, when a state where the abutment part 32 of the front-lens frame 13 abuts against the front-lens frame abutment part 26 of the base frame 12 is viewed from the rear surface side, four bonding holes 27 communicate with the bonding holes 33, respectively. Further, the rear surface of the third holding part 13c of the front-lens frame 13 is exposed through the bonding recess 29. An adhesive is filled in the bonding holes 27, the bonding holes 33, and the bonding recesses 29. When the adhesive is cured, the front-lens frame 13 is fixed to the base frame 12. For example, in the positional adjustment of the front-lens frame 13, a ultraviolet curing adhesive is filled in the bonding recesses 29 and ultraviolet is irradiated to the adhesive, so that the front-lens frame 13 is temporarily fixed. Next, an adhesive with high adhesive strength is filled in the bonding holes 27 and the bonding holes 33 for final fixing.

FIG. 32 illustrates a cross-sectional structure near the bonding hole 27 and the bonding hole 33 in an enlarged manner. The bonding hole 27 includes a narrow part 27a that is open to the front surface side (the side of the bonding opposing surface 28), a wide part 27b that is open to the rear surface side, and a width-gradually-changing part 27c located between the narrow part 27a and the wide part 27b. The wide part 27b is larger than the narrow part 27a in the width in the radial direction centered on the optical axis X1 and in the circumferential length (The cross-sectional area of the wide part 27b is larger than that of the narrow part 27a). In the width-gradually-changing part 27c, the radial width and circumferential length gradually increase (the cross-sectional area increases) from the narrow part 27a to the wide part 27b. Consequently, when the bonding hole 27 is viewed as a cross-section along the optical axis X1 as illustrated in FIG. 32, the inner surfaces of the narrow part 27a and the wide part 27b are parallel to the optical axis X1. On the other hand, the inner surface of the width-gradually-changing part 27c is an inversely tapered bonding fitting (retaining) surface 27d that increases in diameter toward the rear surface side.

The bonding hole 33 includes a narrow part 33a that is open to the rear surface side (the side of the joining opposing surface 31), a wide part 33b that is open to the front surface side (the side of the lens support surface 30), and a width-gradually-changing part 33c located between the narrow part 33a and the wide part 33b. The wide part 33b is larger than the narrow part 33a in the width in the radial direction centered on the optical axis X1 and in the circumferential length (The cross-sectional area of the wide part 33b is larger than that of the narrow part 33a). In the width-gradually-changing part 33c, the radial width and circumferential length gradually increase (the cross-sectional increases) from the narrow part 33a to the wide part 33b. Consequently, when the bonding hole 33 is viewed as a cross-section along the optical axis X1 as illustrated in FIG. 32, the inner surfaces of the narrow part 33a and the wide part 33b are parallel to the optical axis X1. On the other hand, the inner surface of the width-gradually-changing part 33c is an inversely tapered retaining surface 33d that increases in diameter toward the front surface side.

The bonding holes 27 are larger than the corresponding bonding holes 33 (communicating with the bonding holes 27 in the front-back direction). When the bonding hole 27 is viewed from the rear surface side, the joining opposing surface 31 of the front-lens frame 13 can be seen around the bonding hole 33 (see FIG. 29). More specifically, in the bonding hole 27 and the bonding hole 33, the narrow part 27a and the wide part 33b have substantially the same width in the radial direction centered on the optical axis X1 (have substantially the same vertical width in FIG. 32). The narrow part 33a has the narrowest width and the wide part 27b has the widest width. In addition, each bonding hole 27 is longer than the corresponding bonding hole 33 in the circumferential direction centered on the optical axis X1 (see FIG. 29). If the positional adjustment of the front-lens frame 13 with respect to the base frame 12 is performed within a predetermined range, because of the difference in size between the bonding hole 27 and the bonding hole 33, the bonding hole 33 of the front-lens frame 13 communicates with the bonding hole 27 of the base frame 12 without being covered. It is thus possible to smoothly inject an adhesive from the bonding hole 27 to the bonding hole 33. According to a configuration of using the bonding hole 27 and the bonding hole 33 as bonding targets, if the adjustment amount is larger than or equal to a predetermined amount and some of the narrow parts 33a become larger than the narrow part 27a, it is possible to fill an adjective from the bonding hole 27 to the bonding hole 33. The adjustment amount that can be handled thus becomes larger than that in a structure of inserting a projection into a hole for bonding. As illustrated in FIG. 32, in a state where the abutment part 32 abuts against the front-lens frame abutment part 26, a small gap is present between the joining opposing surface 28 and the joining opposing surface 31 in the front-back direction. The bonding hole 27 and the bonding hole 33 also communicate with the gap.

As indicated by an arrow T in FIG. 32, an adhesive injected from the wide part 27b of the bonding hole 27 flows through the width-gradually-changing part 27c and the narrow part 27a into the bonding hole 33. A thin sheet (not shown) is interposed between the lens support surface 30 and the plane L1b of the first lens L1. This sheet blocks an outflow of the adhesive from the bonding hole 33 and the adhesive is filled in the bonding hole 33 and the bonding hole 27. Depending on the viscosity of the adhesive, a part of the adhesive also enters the gap between the joining opposing surface 28 and the joining opposing surface 31. The adhesive filled in the bonding hole 33 and the bonding hole 27 cures (solidifies) from a fluid state as time advances or by application of energy (for example, heating), so that the base frame 12 is fixed to the front-lens frame 13. An adhesive U that is filled in the bonding hole 27 and the bonding hole 33 and cured is virtually indicated by a two-dot chain line in FIG. 32.

As the adhesive U is filled in the bonding hole 27 and the bonding hole 33, strong fixing force is obtained. If a load acts in the radial direction centered on the optical axis X1 or in the circumferential direction centered on the optical axis X1, it is possible to reliably avoid a relative movement of the base frame 12 and the front-lens frame 13.

Further, if a load in the front-back direction that separates the joining opposing surface 28 and the joining opposing surface 31 from each other is applied to the base frame 12 and the front-lens frame 13 that are bonded and fixed to each other as described above, the cured adhesive U is fitted into both the bonding hole 27 and the bonding hole 33 to avoid separation. More specifically, the bonding hole 27 and the bonding hole 33 have a schematic cross-section with a small opening width on the side of the joining opposing surface 28 and on the side of the joining opposing surface 31 opposing the joining opposing surface 28 (the opening width of the narrow part 27a and the narrow part 33a is small). Further, the bonding hole 27 and the bonding hole 33 have a schematic cross-section obtained by joining distal end portions of two wedges directed in opposite directions. The adhesive U filled in the bonding hole 27 and the bonding hole 33 has also such a schematic cross-section, accordingly.

Accordingly, when a load is applied to the front-lens frame 13 in a direction away from the base frame 12 (to the front surface side), a load of the same direction acts on the adhesive U in a cured state through the retaining surface 33d. The adhesive U acts like a wedge on the retaining surface 27d that faces the opposite side to the retaining surface 33d (the rear surface side) to withstand a load of separating the front-lens frame 13 from the base frame 12. The reverse is also true. When a load is applied to the base frame 12 in a direction away from the front-lens frame 13 (to the rear surface side), a load of the same direction acts on the adhesive U in a cured state through the retaining surface 27d. The adhesive U acts like a wedge on the retaining surface 33d that faces the opposite side to the retaining surface 27d (the front surface side) to withstand a load of separating the base frame 12 from the front-lens frame 13.

As described above, the bonding structure of the present embodiment employs a wedge effect that is achieved between the retaining surface 27d of the bonding hole 27 and the retaining surface 33d of the bonding hole 33 that are respectively inclined in opposite directions and the adhesive U. Specifically, as illustrated in FIG. 32, the bonding hole 27 has the narrow part 27a that extends from the joining opposing surface 28 to the retaining surface 27d (towards the front surface side of the lens-barrel 11A and 11B), and the wide part 28b that extends from the retaining surface 27d to a side away from the joining opposing surface 28 (towards the rear surface side of the lens-barrel 11A and 11B). The cross sectional area of the wide part 27b is larger than that of the narrow part 27a. Similarly, the bonding hole 33 includes the narrow part 33a that extends from the retaining surface 33d to the joining opposing surface 31 (towards the rear surface of the lens-barrel 11A and 11B), and the wide part 33b that extends from the retaining surface 33d to a side away from the joining opposing surface 28 (towards the front surface side of the lens-barrel 11A and 11B). The cross-sectional area of the wide part 33b is larger than that of the narrow part 33a. Further, when force is applied to separate the front-lens frame 13 from the base frame 12, the adhesive U is made in contact with the parts that gradually decrease in cross-sectional diameter of the inner surface (the retaining surfaces 27d and 33d) of the bonding holes 27 and 33. Accordingly, the base frame 12 and the front-lens frame 13 are retained, while keeping their relative positions. That is, bonding strength of the base frame 12 and the front-lens frame 13 can be enhanced as compared to a case where bonding depends only on the adhesion of the adhesive U to the narrow parts 27a and 33a or to the wide parts 27b and 33b, where inner surfaces of these parts extend in the front-back direction. As excellent bonding strength is achieved in each of the bonding holes 27 and the bonding holes 33, it is possible to perform fixing with less bonding portions and boding areas. Further, it is possible to improve space efficiency and the degree of freedom in lens-barrel design. In particular, in the composite lens-barrel 10 of the present embodiment, the first prisms AP1 and BP1 and the second prisms AP2 and BP2 are arranged highly densely on the rear surface side of the base frame 12, the effect of strongly bonding and fixing the front-lens frame 13 in a space-saving manner is highly achieved.

Figure 33:
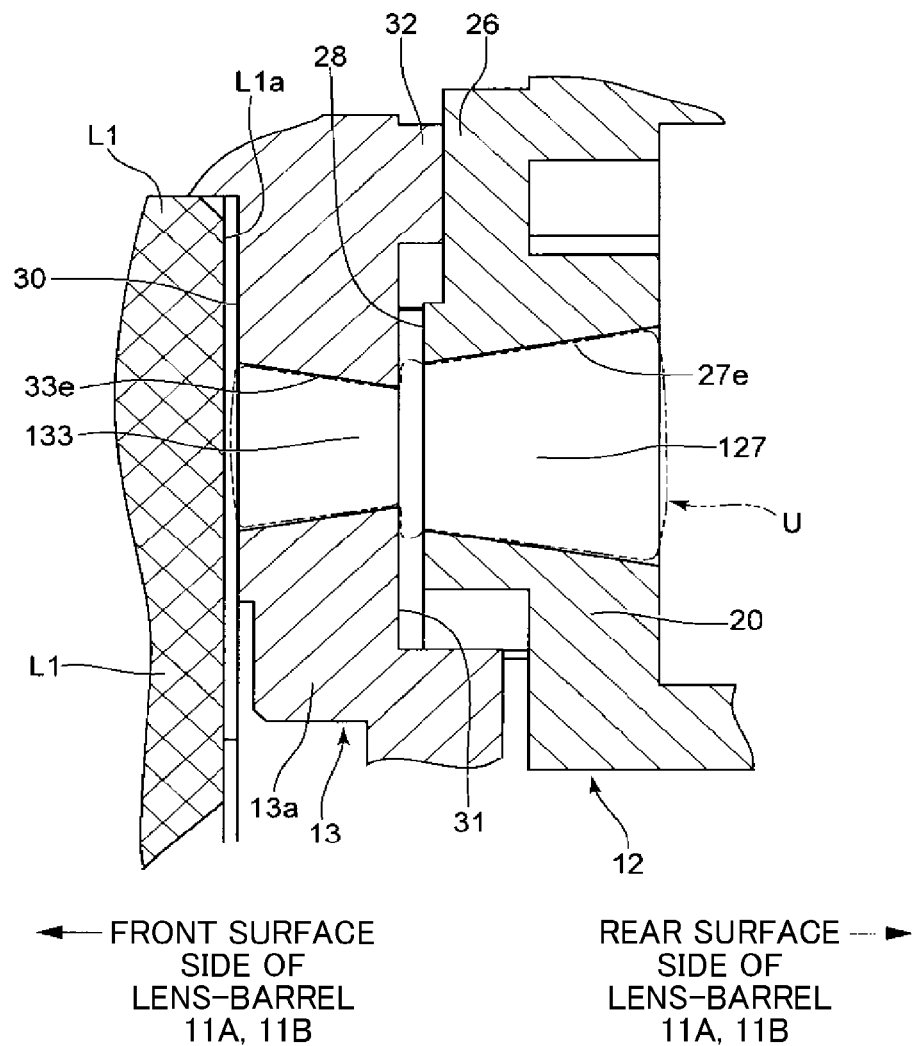
FIG. 33 is a cross-sectional view of a modification of the bonding structure according to an embodiment.
Figure 34:
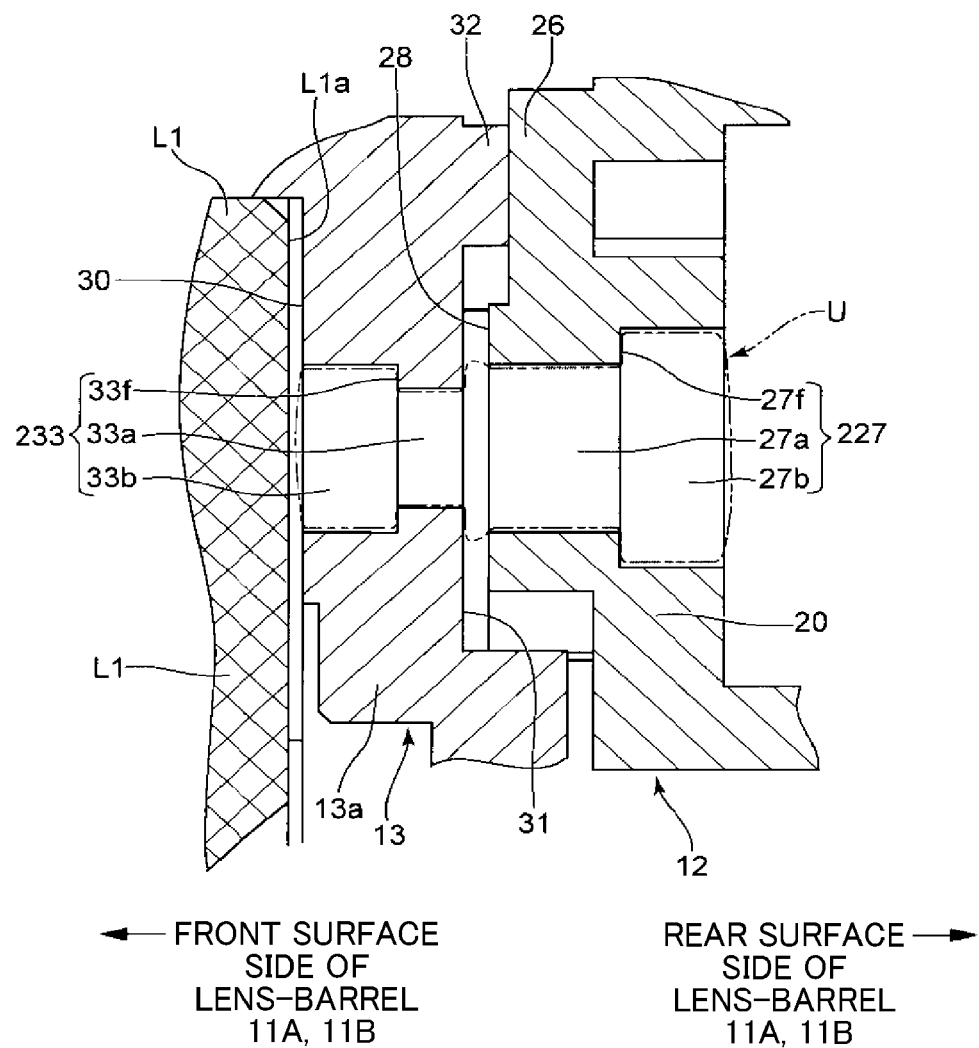
FIG. 34 is a cross-sectional view of another modification of the bonding structure according to an embodiment.

The bonding structure used for fixing the base frame 12 to the front-lens frame 13 is not limited to the above structure. FIGS. 33 and 34 illustrate modifications of the bonding structure. FIG. 33 illustrates a mode in which entire inner faces of a bonding hole 127 of the base frame 12 and a bonding hole 133 of the front-lens frame 13 are formed by tapered retaining surfaces 27e and 33e that decrease in width toward the joining opposing surface 28 and the joining opposing surface 31. FIG. 34 illustrates a mode in which a bonding hole 227 of the base frame 12 and a bonding hole 233 of the front-lens frame 13 include retaining surfaces 27f and 33f that have a planar shape and are perpendicular to the optical axis X1 instead of the retaining surfaces 27d and 33d. These configurations also achieve similar effects to the configuration described above. This is because the retaining surfaces 27e and 33e, and the retaining surfaces 27f and 33f are retaining surfaces that respectively face opposite to each other and form a pair into which the adhesive U is fitted.

In addition, the bonding holes 27 (FIG. 32), 127 (FIG. 33), and 227 (FIG. 34) formed in the base frame 12 and the bonding holes 33 (FIG. 32), 133 (FIG. 33), and 233 (FIG. 34) formed in the front-lens frame 13 may be appropriately interchanged. As a result, a pair of retaining surfaces asymmetrical in the front-back direction may be formed.

The bonding holes 27, 127, and 227 of the base frame 12 and the bonding holes 33, 133, and 233 of the front-lens frame 13 have a shape that can be easily made by molds removable in the front-back direction. Consequently, it is easy to obtain the base frame 12 and the front-lens frame 13 without increasing the manufacturing cost.

The structure of the base frame 12 will be described subsequently. As illustrated in FIGS. 16 to 19, the upper wall part 21 is a wall part extending from an upper edge of the front wall part 20 to the rear surface side. The upper wall part 21 includes an upper surface part 21a that is an upper surface part of the lens-barrels 11A and 11B and a pair of side surface parts 21b and 21c extending downward from left and right end portions of the upper surface part 21a. The upper wall part 21 is formed in a U-shape whose top, left, and right are closed by the upper surface part 21a, the side surface part 21b, and the side surface part 21c, respectively and whose bottom is open.

The side wall parts 22 and 23 are located below the upper wall part 21 and extend from left and right side edges of the front wall part 20 to the rear surface side. The part from the front wall part 20 to the side wall part 22 and the part from the front wall part 20 to the side wall part 23 are curved along the outer surface shape of the rear-lens frame 14 to be described later.

The corner wall part 24 and the corner wall part 25 substantially oppose to each other in the front-back direction, and are disposed to be shifted from the front wall part 20 to the rear surface side of the front wall part 20. The corner wall part 24 projects sideward from the side surface part 21b of the upper wall part 21, and a lower end of the corner wall part 24 is coupled to the upper portion of the side wall part 22. The corner wall part 25 projects sideward from the side surface part 21c of the upper wall part 21, and a lower end of the corner wall part 25 is coupled to the upper portion of the side wall part 23. As the corner wall part 24 and the corner wall part 25 are coupled to a plurality of wall parts extending in different directions, the corner wall parts 24 and 25 have high support strength and thus are hardly deformed.

The base frame 12 also includes a first prism holding part 35 and a second prism holding part 36 on a rear surface portion of the front wall part 20. The first prism holding part is a part for holding the first prism AP1 or the first prism BP1 behind the front opening 20a. The second prism holding part 36 is a part for holding the second prism AP2 or the second prism BP2.

The first prism holding part 35 includes an upper wall 35a located on the upper edge side of the front opening 20a and a lower wall 35b located on the lower edge side of the front opening 20a. A vertical wall 35c projecting downward is formed at one end of the upper wall 35a in the left-right direction, and a vertical wall 35d projecting upward is formed at one end of the lower wall 35b in the left-right direction.

The first prisms AP1 and BP1 are inserted between the upper wall 35a, the lower wall 35b, the vertical wall 35c, and the vertical wall 35d. There is a clearance between these walls 35a, 35b, 35c, 35d and the first prisms AP1 and BP1, and the first prisms AP1 and BP1 are positioned using an assembly jig and then fixed to the first prism holding part 35 by bonding.

As described above, in a completed state of the composite lens-barrel 10, the first prism AP1 and the first prism BP 1 are arranged so that inclined surfaces of these prisms are back to back and close to each other. The first prism holding part 35 is thus shaped so as not to cover the back side of the inclined surfaces of the first prism AP1 and the first prism BP1, that is, to expose the back side of the inclined surface.

The second prism holding part 36 is located below the side surface part 21b of the upper wall part 21 and the corner wall part 24, and includes a support seat 36a that faces the rear surface side and a support wall 36b that projects to the rear surface side of the support seat 36a. The side surfaces of the second prisms AP2 and BP2 abut against the support seat 36a. The inclined surfaces of the second prisms AP2 and BP2 abut against the support wall 36b. The second prisms AP2 and BP2 are positioned using the assembly jig in a direction along each inclined surface. The second prisms AP2 and BP2, which are positioned, are then fixed to the second prism holding part 36 by bonding.

Figure 9:
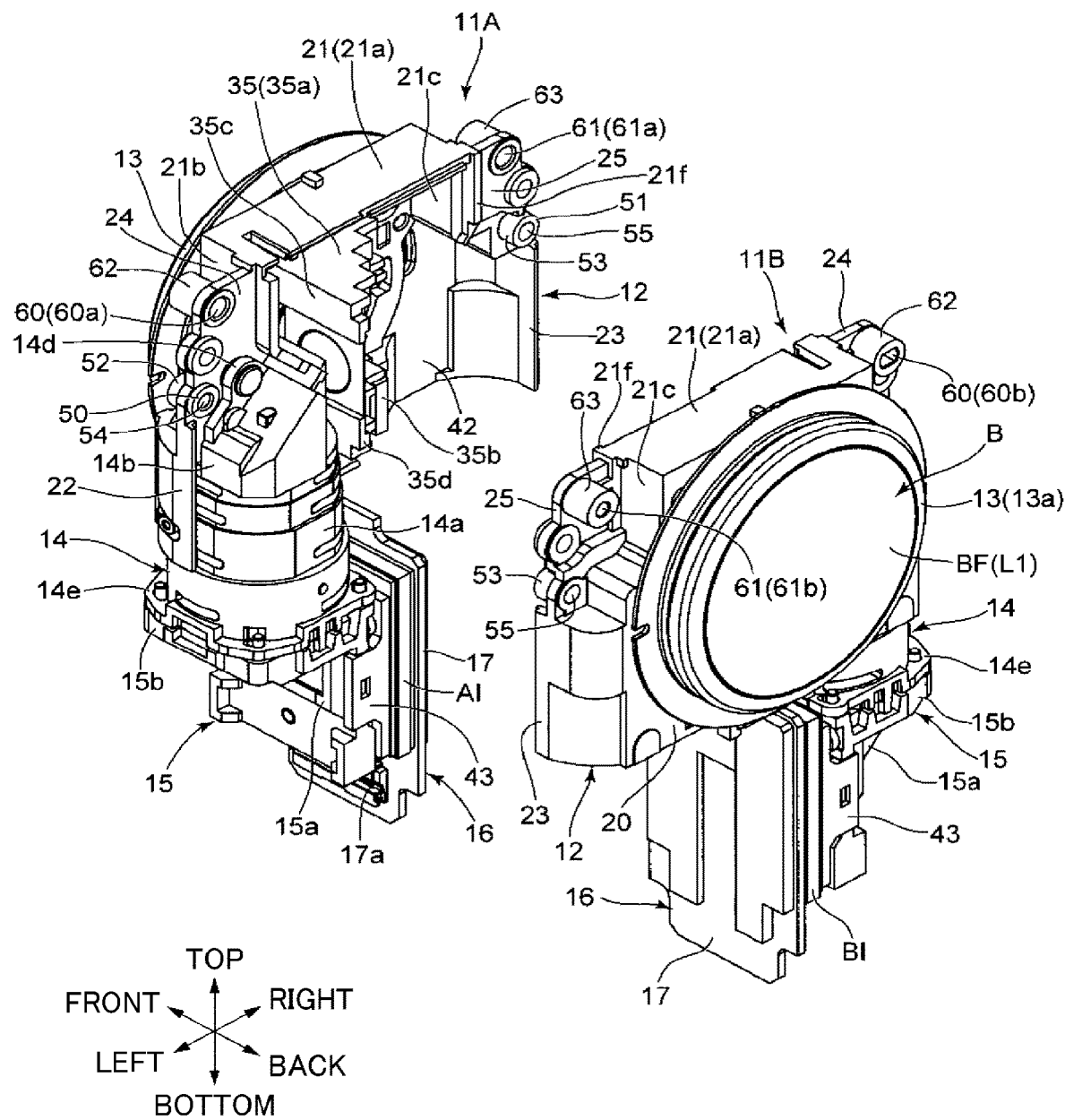
FIG. 9 is a perspective view of a state where two lens-barrels constituting the composite lens-barrel are split, according to an embodiment.
Figure 13:
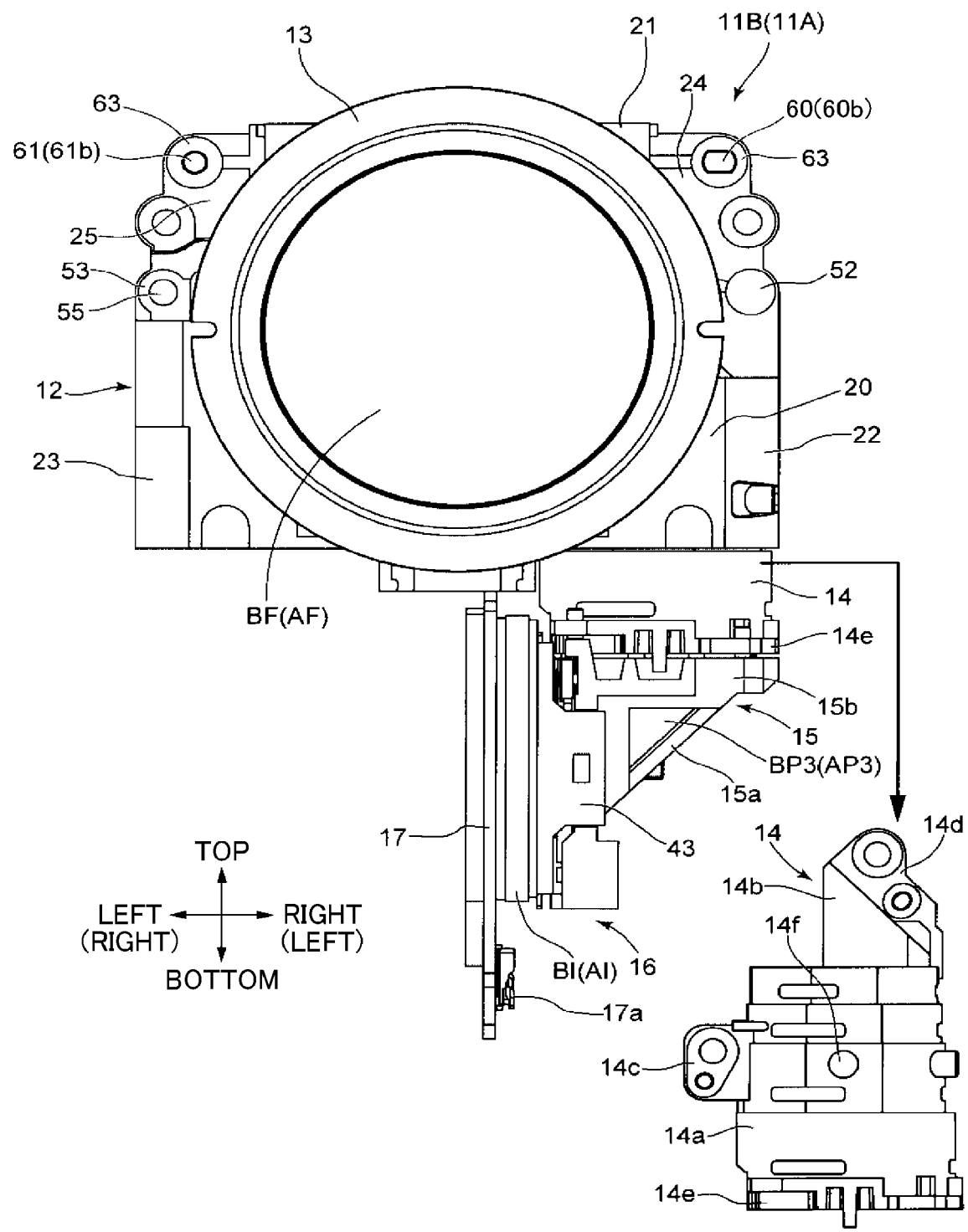
FIG. 13 is a front view of one of the two split lens-barrels, according to an embodiment.
Figure 14:
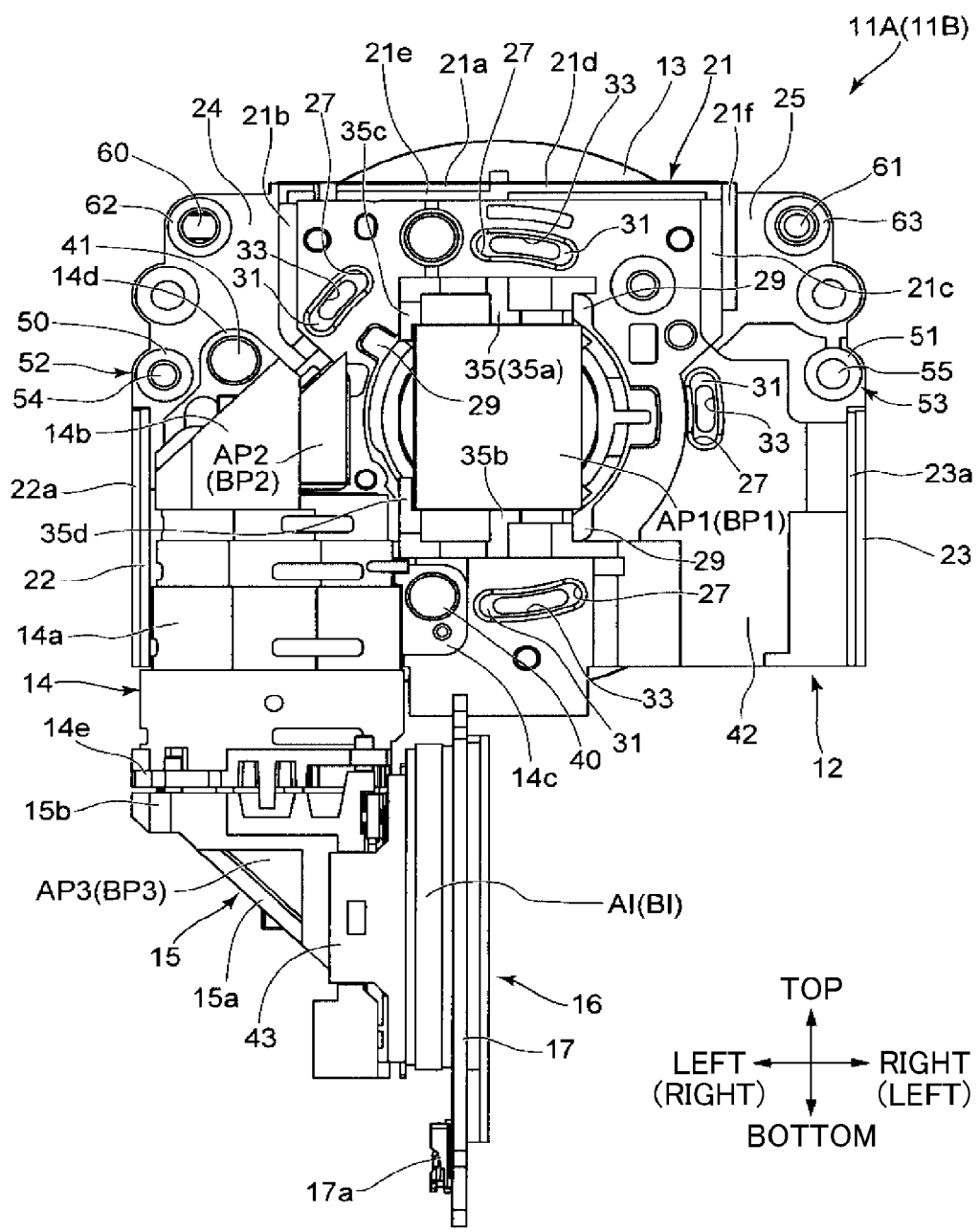
FIG. 14 is a rear view of one of the two split lens-barrels, according to an embodiment.

FIG. 13 illustrates the rear-lens frame 14 itself that is not attached to the base frame 12. As illustrated in FIGS. 9, 13, 14, and the like, the rear-lens frame 14 includes a tubular part 14a that has a substantially cylindrical shape centered on the optical axis X3 extending in the vertical direction. A plurality of lenses constituting the rear lens AR or the rear lens BR are fixedly supported in the tubular part 14a. The rear-lens frame 14 also includes a prism cover 14b above the tubular part 14a. A support tab 14c projects sideward from the tubular part 14a, and a support tab 14d projects upward from the prism cover 14b. A joint flange 14e is formed at a lower end of the tubular part 14a.

As illustrated in FIGS. 16 to 19, on the rear surface side of the base frame 12, a rear-lens frame holding part 37 is formed below the corner wall part 24 and the second prism holding part 36. The rear-lens frame holding part 37 is a recess surrounded by the front wall part 20 and the side wall part 22, and is shaped to accommodate a substantially half portion of the tubular part 14a of the rear-lens frame 14, which is located on the front surface side. In a state where the tubular part 14a is accommodated in the rear-lens frame holding part 37, the prism cover 14b covers a part of the second prisms AP2 and BP2 supported by the second prism holding part 36 of the base frame 12 from the rear surface side.

A support seat 38 is formed on the side of the rear-lens frame holding part 37 (below the lower wall 35b of the first prism holding part 35), and a support seat 39 is formed above the second prism holding part 36. The support seat 38 and the support seat 39 have an annular plane perpendicular to the optical axis X1, and a screw hole is formed in the center of the annular plane. In a state where the tubular part 14a of the rear-lens frame 14 is accommodated in the rear-lens frame holding part 37, the support tab 14c abuts against the support seat 38 and the support tab 14d abuts against the support seat 39. A through-hole (not shown) is formed in the support tab 14c and the support tab 14d. The fixing screw 40 is screwed into the screw hole of the support seat 38 through the through-hole of the support tab 14c. The fixing screw 41 is also screwed into the screw hole of the support seat 39 through the through-hole of the support tab 14d. By tightening the fixing screw 40 and the fixing screw 41, the rear-lens frame 14 is positioned with respect to the base frame 12 and then fixed to the base frame 12 (see FIG. 14).

On the rear surface side of the base frame 12, a rear-lens frame accommodating part 42 is formed below the corner wall part 25. The rear-lens frame accommodating part 42 is a recess surrounded by the front wall part 20 and the side wall part 23, and is shaped to accommodate a substantially half portion of the tubular part 14a of the rear-lens frame 14, which is located on the rear surface side. In a state before the lens-barrel 11A is combined with the lens-barrel 11B, the rear-lens frame accommodating part 42 is a vacant space (see FIGS. 9 and 14). When the lens-barrel 11A is combined with the lens-barrel 11B, the rear-lens frame holding part 37 of one base frame 12 opposes the rear-lens frame accommodating part 42 of the other base frame 12 in the front-back direction, so that a space for accommodating the tubular part 14a of the rear-lens frame 14 is formed.

The third prism frame 15 has a prism support wall 15a for supporting side surfaces and inclined surfaces of the third prisms AP3 and BP3, and the third prisms AP3 and BP3 are fixed to the third prism frame 15 by bonding. A joint flange 15b is formed on the third prism frame 15. The joint flange 15b can be fitted into the joint flange 14e of the rear-lens frame 14 from below. The third prism frame 15 is positioned in such a fitting state and then fixed to the rear-lens frame 14 by bonding.

The image sensor unit 16 has a pair of fitting pieces 43 at edges in the front-back direction. Each of the pair of fitting pieces 43 is fitted into a recess formed in the prism support wall 15a of the third prism frame 15. Such fitting enables the position of the image sensor unit 16 to be set with respect to the third prism frame 15. The image sensor unit 16 is fixed to the third prism frame 15 by bonding. In this fixed state, the imaging surfaces of the image sensors AI and BI are perpendicular to the optical axis X4, the imaging surface of the image sensor AI opposes the emission surface of the third prism AP3, and the imaging surface of the image sensor BI opposes the emission surface of the third prism BP3.

The image sensor unit 16 includes the boards 17 having the image sensors AI and BI on one side. The board 17 is formed in a substantially rectangular shape. In a state where the image sensor unit 16 is fixed to the third prism frame 15, the longitudinal direction of the board 17 extends along the vertical direction and the lateral direction of the board 17 extends along the front-back direction. Further, the thickness direction of the board 17 extends in the left-right direction. A connector 17a to be connected to a control circuit (not shown) of the imaging apparatus is disposed near the lower end of the board 17. The connector 17a is disposed on the same side of the board 17 as the image sensors AI and BI.

By combining the components described above, the lens-barrel 11A and the lens-barrel 11B are completed. FIGS. 9 to 12 illustrate the lens-barrel 11A and the lens-barrel 11B in a split state, FIG. 13 illustrates only the lens-barrel 11A, and FIG. 14 illustrates only the lens-barrel 11B. As can be seen from these drawings, the lens-barrels 11A and 11B have the same structure.

Figure 10:
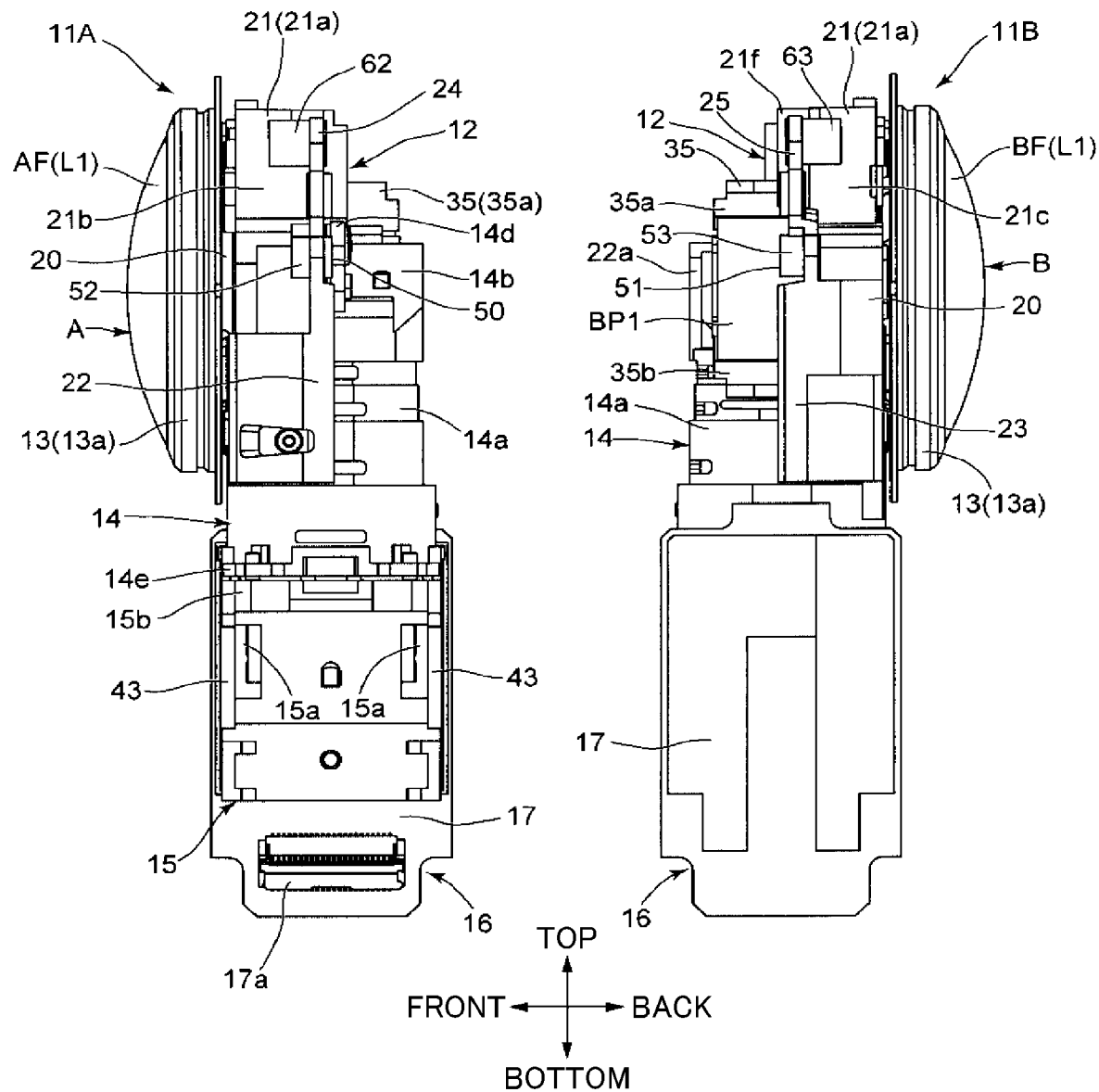
FIG. 10 is a view of the two split lens-barrels as seen from the left, according to an embodiment.

As illustrated in FIG. 10, the lens-barrel 11A and the lens-barrel 11B in the front-back direction are accommodated in the lateral width of the board 17 except for portions where the front lenses AF and BF and the front-lens frame 13 project to the front surface side. The wide-angle lens systems A and B are configured as a bending optical system that bends an optical path in a plane perpendicular to the optical axis X1 (in a plane opposing the wide-angle lens systems A and B) using a plurality of prisms. As a result, the lens-barrels 11A and 11B are reduced in thickness in the front-back direction.

As the lens-barrel 11A and the lens-barrel 11B having the same structure oppose to each other to be symmetrical in the front-back direction (FIGS. 9 to 12), are moved in the front-back direction to be close to each other, and combined with each other, the composite lens-barrel 10 in a completes state as illustrated in FIGS. 4 to 8 is obtained. As illustrated in FIGS. 9 to 12, as the lens-barrel 11A and the lens-barrel 11B are moved in the front-back direction to be close to each other and thus recesses and projections of the lens-barrels 11A and 11B are engaged with each other, the lens-barrels 11A and 11B are combined with each other with high space efficiency.

Figure 11:
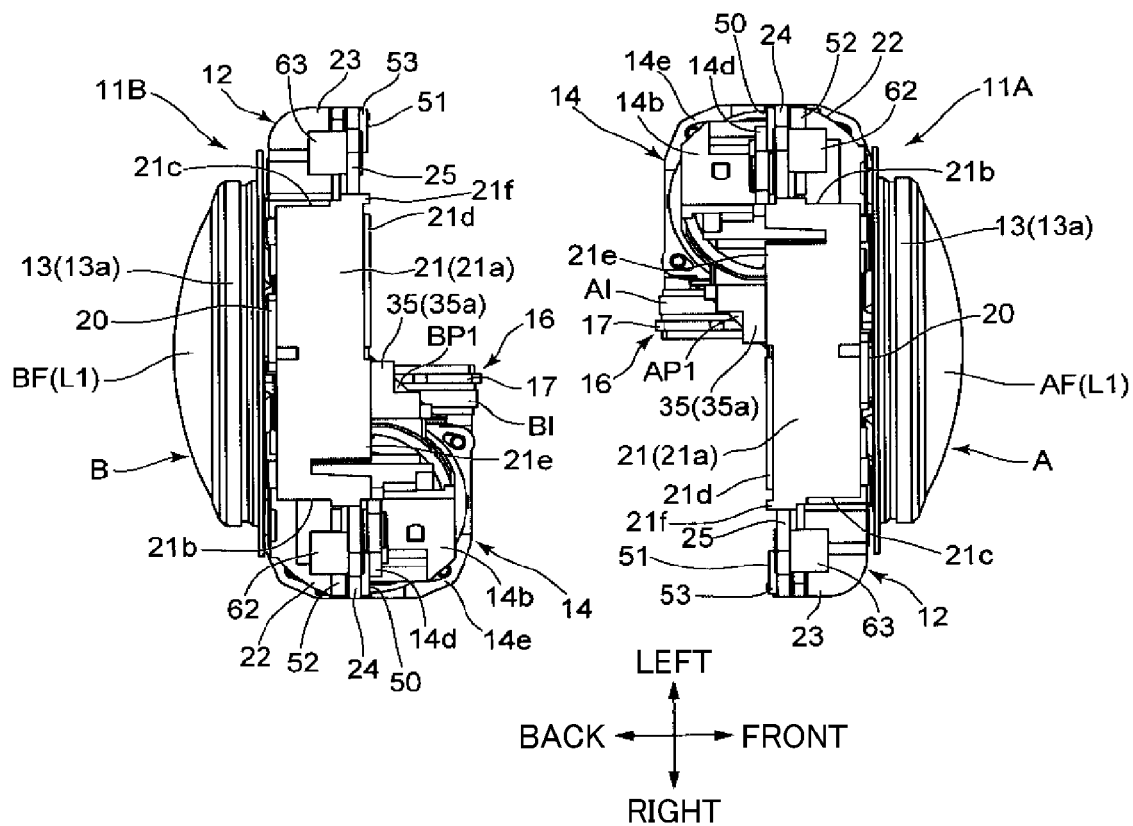
FIG. 11 is a view of the two split lens-barrels as seen from the top, according to an embodiment.
Figure 12:
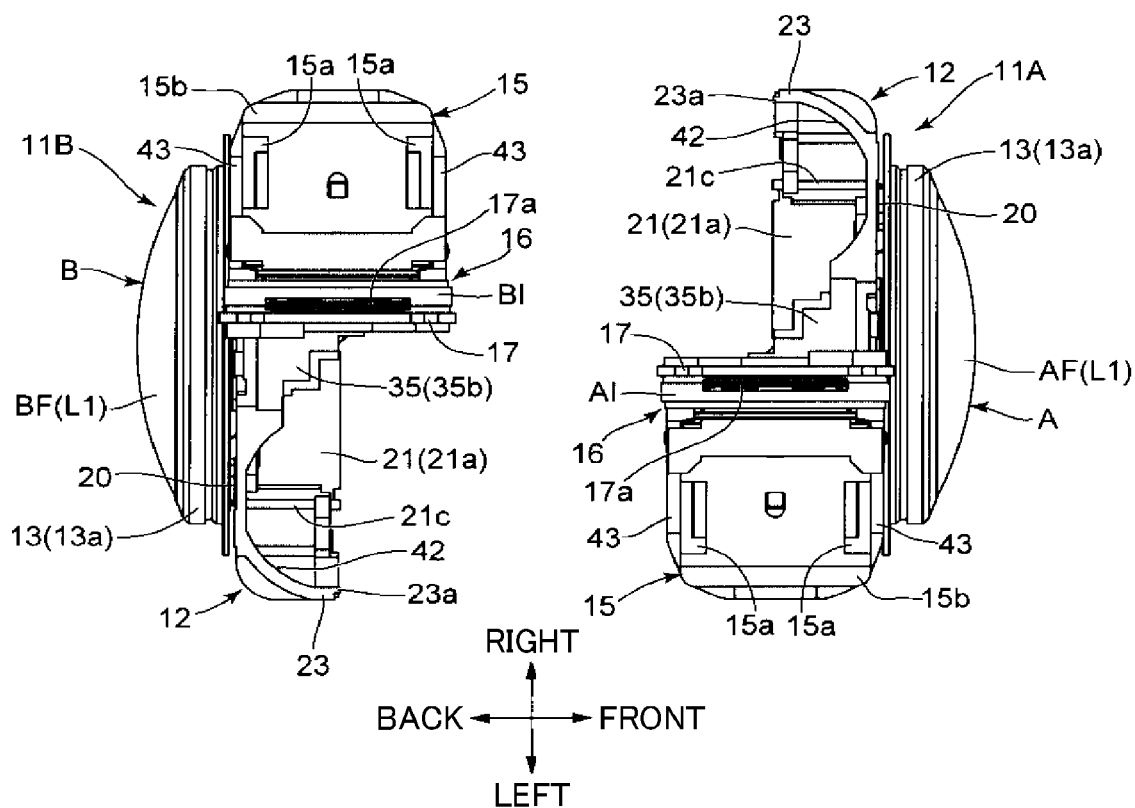
FIG. 12 is a view of the two split lens-barrels as seen from the bottom, according to an embodiment.

Here, a virtual plane Q1 (FIG. 5) that contains the optical axis X1 and extends vertically and a virtual plane Q2 (FIG. 5) that is perpendicular to the virtual plane Q1 and passes near the lower end of the base frame 12 are defined. In the lens-barrel 11A, the optical path of light having being bent by the first prism AP1, from the second prism AP2 to the image sensor AI is intensively placed in a left area of the virtual plane Q1. In the lens-barrel 11B, the optical path of light having been bent by the first prism BP1, from the second prism BP2 to the image sensor BI is intensively placed in a right area of the virtual plane Q1. As illustrated in FIGS. 11 and 12, on the left side of the virtual plane Q1, the components of the lens-barrel 11A project rearward from the base frame 12. On the other hand, the components of the lens-barrel 11B do not project forward from the base frame 12. Similarly, on the right side of the virtual plane Q1, the components of the lens-barrel 11B project frontward from the base frame 12. On the other hand, the components of the lens-barrel 11A do not project rearward from the base frame 12. Consequently, when the lens-barrel 11A is combined with the lens-barrel 11B, the rear-lens frame 14, the third prism frame 15, and the image sensor unit 16 on the side of the lens-barrel 11A, and the rear-lens frame 14, the third prism frame 15, and the image sensor unit 16 on the side of the lens-barrel 11B are arranged symmetrically with the virtual plane Q1 interposed therebetween without interfering with each other.

In each of the wide-angle lens systems A and B, a subject light beam that is split left or right by the first prism AP1 or BP1 is reflected by the third prism AP3 or BP3 to travel in a direction of approaching the virtual plane Q1, and is incident on the image sensor AI. As a result, the distance in the left-right direction between the image sensor unit 16 on the side of the lens-barrel 11A and the image sensor unit 16 on the side of the lens-barrel 11B is reduced. In particular, the boards 17 are close to each other with the virtual plane Q1 being disposed therebetween. In the central areas of the lens-barrels 11A and 11B in the left-right direction, the first prisms AP1 and BP1 are disposed above the virtual plane Q2. The two image sensor units 16 are arranged back to back below the virtual plane Q2. The board 17 on the side of the lens-barrel 11A and the board 17 on the side of the lens-barrel 11B each have a flat plate shape substantially parallel to the virtual plane Q1, and a clearance is secured in the left and right direction between these boards. Consequently, when the lens-barrel 11A and the lens-barrel 11B are brought close to each other in the front-back direction, the two boards 17 do not interfere with each other.

The first prism AP1 and the first prism BP1 are arranged such that the inclined surfaces of the prisms are back to back and close to each other. For this reason, the two prisms are arranged in the front-back direction, but the thickness in the front-back direction substantially corresponds to the thickness of a single prism (see FIG. 3). In addition, the image sensor unit 16 of the lens-barrel 11A and the image sensor unit 16 of the lens-barrel 11B are substantially at the same position in the front-back direction and are side by side in the left-right direction. Consequently, if there is enough space to accommodate the lateral width of a single board 17, the two image sensor units 16 can be disposed below the first prisms AP1 and BP1. Therefore, it is possible to reduce the thickness in the front-back direction not only near both edges in the left-right direction where the components (the rear-lens frame 14 and the third prism frame 15) of the lens-barrel 11A and the lens-barrel 11B are individually arranged but also near the center in the left-right direction where the components (the first prisms AP1 and BP1 and the image sensor unit 16) of the lens-barrel 11A and the lens-barrel 11B are arranged in an overlapping manner.

As described above, in the composite lens-barrel 10, the components of the lens-barrel 11A and the lens-barrel 11B are arranged with high space efficiency in the front-back direction, the left-right direction, and the vertical direction. In spite of having the two lens-barrels 11 A and 11B, the composite lens-barrel 10 achieves a compact structure.

As described above, the lens-barrel 11A and the lens-barrel 11B are arranged symmetrically in the front-back direction, brought close to each other in the front-back direction, and then combined with each other. The lens-barrel 11A and the lens-barrel 11B need to be combined to each other in a stable positional relationship in which the optical systems (the wide-angle lens systems A and B) of the lens-barrels 11A and 11B are appropriately directed. Specifically, it is necessary to perform positioning in the front-back direction along the optical axis X1 and positioning along a plane perpendicular to the optical axis X1 (the vertical direction and the left-right direction). In order to cause the imaging system 1 having two optical systems (the wide-angle lens systems A and B) to function, it is required to have high bonding strength that does not change the relative positional relationship between the lens-barrel 11A and the lens-barrel 11B due to external force or the like after the lens-barrel 11A and the lens-barrel 11B are combined with each other (more specifically, after the imaging system 1 including the wide-angle lens systems A and B is calibrated).

Firstly, the structure of positioning the lens-barrel 11A and the lens-barrel 11B in the front-back direction will be described. In the base frame 12, an abutment surface 50 is provided on the rear surface side of the corner wall part 24. An abutment surface 51 is provided on the rear surface side of the corner wall part 25. The abutment surface 50 is formed as an end surface of a boss 52 that has a cylindrical shape and projects from the corner wall part 24 in the front-back direction. The abutment surface 51 is formed as an end surface of a boss 53 that has a cylindrical shape and projects from the corner wall part 25 in the front-back direction. The abutment surface 50 and the abutment surface 51 are annular planes perpendicular to the optical axis X1 and have a symmetrical shape in the front-back direction.

A screw hole 54 whose axial line extends in the front-back direction is formed in the boss 52. The screw hole 54 is open to the abutment surface 50 at an end portion on the rear surface side and is closed at an end portion on the front surface side opposite to the rear surface side. A screw insertion hole 55 that penetrates the base frame 12 in the front-back direction is formed in the boss 53.

FIGS. 9 to 12 illustrate a state where the abutment surface 50 and the abutment surface 51 of the lens-barrel 11A oppose the abutment surface 51 and the abutment surface 50 of the lens-barrel 11B, respectively. When the lens-barrel 11A and the lens-barrel 11B are brought close to each other in the front-back direction in such a positional relationship, the abutment surface 50 abuts against the abutment surface 51 and the relative position of the lens-barrel 11A and the lens-barrel 11B is determined in the front-back direction. The abutment surface 50 and the abutment surface 51 are surfaces that become parallel to each other, and symmetrical to each other, when they are in contact. By fixing the lens-barrel 11A to the lens-barrel 11B in this state where the abutment surface 50 and the abutment surface 51 are in contact, the composite lens-barrel 10 in which the positional accuracy of the lens-barrel 11A and the lens-barrel 11B in the front-back direction is controlled is obtained.

The lens-barrel 11A is fixed to the lens-barrel 11B by screws. In fixing by screws, a fixing screw (not shown) is inserted into the screw insertion hole 55 of the lens-barrel 11A from the front to be screwed into the screw hole 54 of the lens-barrel 11B. In addition, a fixing screw (not shown) is inserted into the screw insertion hole 55 of the lens-barrel 11B from the back to be screwed into the screw hole 54 of the lens-barrel 11B. By fastening the fixing screws, the lens-barrel 11A is fixed to the lens-barrel 11B.

The base frame 12 of each of the lens-barrels 11A and 11B holds a plurality of prisms (the first prisms AP1 and BP1, and the second prisms AP2 and BP2). The base frame 12 is a target to which the front-lens frame 13 and the rear-lens frame 14 are assembled and is also a member functioning as a reference for supporting all the optical elements. Since the assembling accuracy of the base frame 12 has a particularly large influence on optical performance, the base frame 12 includes the abutment surfaces 50 and 51 that are the reference of the relative position of the lens-barrels 11A and 11B in the front-back direction.

The abutment surface 50 and the abutment surface 51 are located near both edges of the base frame 12 in the left-right direction. In spite of dimensional restrictions of the base frame 12, the distance between the abutment surfaces 50 and 51 is maximized. As the distance between the two abutment surfaces 50 and 51 functioning as the position reference is increased, it is possible to effectively prevent inclination of the two base frames 12, thus enhancing the positioning accuracy of the lens-barrels 11A and 11B. As illustrated in FIG. 14, the abutment surface 50 is disposed in the space behind the inclined surface of the second prism AP2 and BP2 and thus achieves excellent space efficiency. In addition, the abutment surface 50 is provided above the rear-lens frame holding part 37 that holds the rear-lens frame 14. The abutment surface 51 is provided above the rear-lens frame accommodating part 42 that covers the rear-lens frame 14 from the rear surface side. It is thus possible to dispose the abutment surfaces 50 and 51 without overlapping the holding positions of the rear lenses AR and BR, the first prisms AP1 and BP1, and the second prisms AP2 and BP2 that are held on the rear surface side of the base frames 12. In addition, it is possible to dispose the abutment surface 50 and the abutment surface 51 with a large space therebetween.

The corner wall part 24 including the abutment surface 50 and the corner wall part 25 including the abutment surface 51 are coupled to a plurality of wall parts facing different directions near the upper wall part 21 and the side wall parts 22 and 23, the corner wall parts 24 and 25 have high rigidity in spite of having a flat plate shape. Consequently, the abutment surface 50 and the abutment surface 51 have high plane accuracy, and the corner wall parts 24 and 25 are hardly deformed when the abutment surface 50 abuts against the abutment surface 51. As a result, it is possible to perform positioning with high accuracy.

Figure 5:
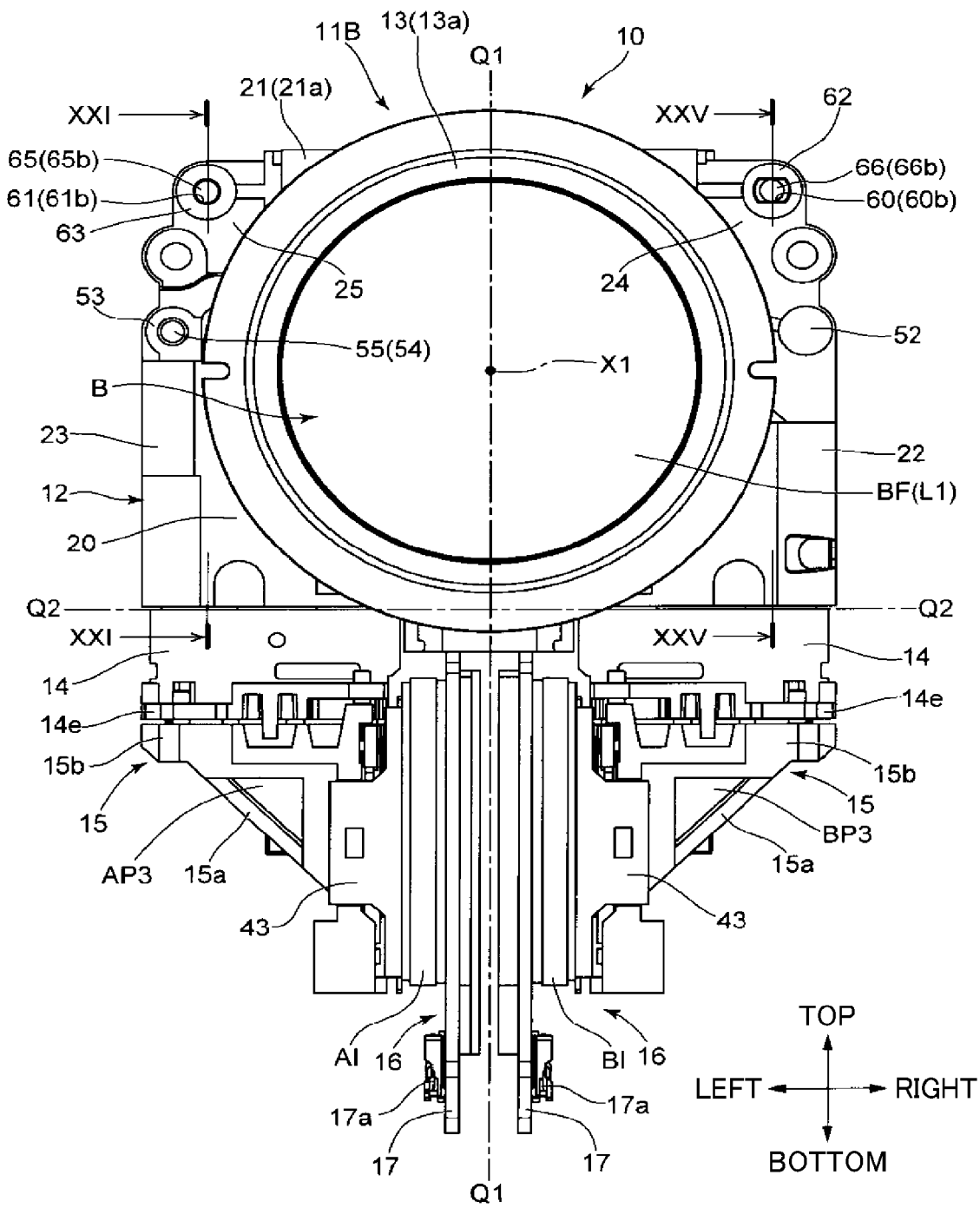
FIG. 5 is a view of the composite lens-barrel as seen from the back, according to an embodiment.
Figure 6:
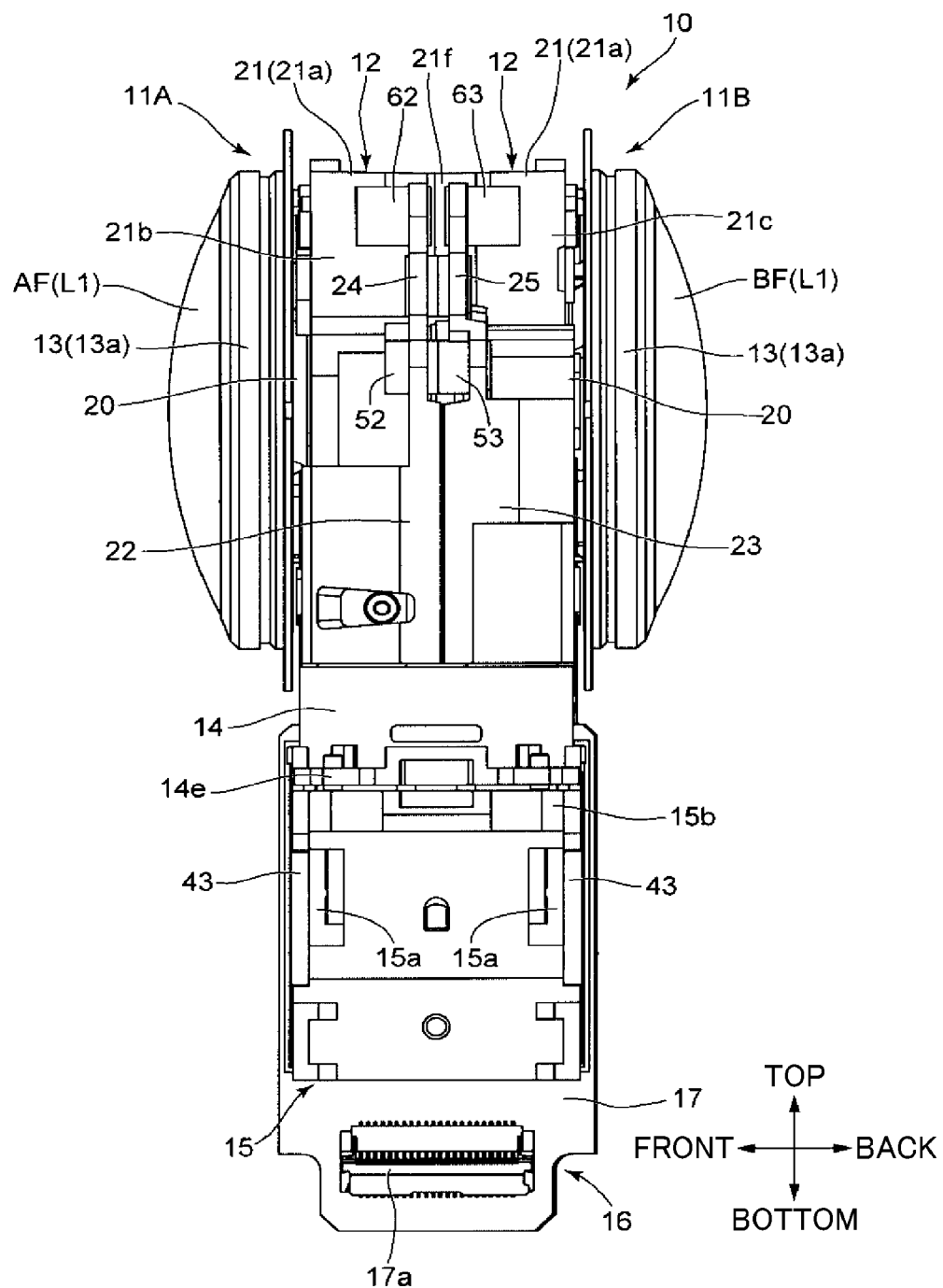
FIG. 6 is a view of the composite lens-barrel as seen from the left, according to an embodiment.

Further, as illustrated in FIG. 5, the boss 52 having the abutment surface 50 and the boss 53 having the abutment surface 51 are arranged to be substantially symmetrical to each other in the left-right direction with respect to the optical axis X1. As a result, it is easy to obtain uniform positioning accuracy in the front-back direction on the left and right sides of the optical axis X1. This is particularly advantageous to achieve the positional accuracy of the front lenses AF and BF and the first prisms AP1 and BP1 that are arranged on the optical axis X1. Since the abutment surfaces 50 and 51 have high positioning accuracy and high positioning stability, the lens-barrel 11A can be combined with the lens-barrel 11B without any interference therebetween.

For example, when the lens-barrel 11A is combined with the lens-barrel 11B are combined, the tubular part 14a of the rear-lens frame 14 constituting the lens-barrel 11A or 11B enters the rear-lens frame accommodating part 42 formed on the rear surface side of the base frame 12, and the tubular part 14a (the rear lens AR or BR) is placed between the rear-lens frame holding part 37 and the rear-lens frame accommodating part 42 opposing to each other. At this time, the rear-lens frame 14 (the rear-lens frame 14 on the side of the lens-barrel 11A) that holds the rear lens AR is covered by the rear-lens frame accommodating part 42 formed in the base frame 12 of the lens-barrel 11B from the rear surface side (back). However, the rear-lens frame accommodating part 42 on the side of the lens-barrel 11B does not contact the rear-lens frame 14 on the side of the lens-barrel 11A (there is a clearance in the front-back direction). Consequently, the rear-lens frame 14 on the side of the lens-barrel 11A is correctly positioned in the rear-lens frame holding part 37 on the base frame 12 of the lens-barrel 11A. Similarly, the rear-lens frame 14 (the rear-lens frame 14 on the side of the lens-barrel 11B) that holds the rear lens BR is covered by the rear-lens frame accommodating part 42 formed in the base frame 12 of the lens-barrel 11A from the rear surface side (front). However, the rear-lens frame accommodating part 42 on the side of the lens-barrel 11A does not contact the rear-lens frame 14 on the side of the lens-barrel 11B (there is a clearance in the front-back direction). Consequently, the rear-lens frame 14 on the side of the lens-barrel 11B is positioned in the rear-lens frame holding part 37 on the base frame 12 of the lens-barrel 11B. As described above, as the base frames 12 are positioned stably and highly accurately by the abutment surfaces 50 and 51, each rear-lens frame 14 can be appropriately accommodated in each rear-lens frame accommodating part 42 of each base frame 12 without any interference.

The abutment surface 50 and the abutment surface 51 are planes perpendicular to the optical axis X1 and are symmetrical to each other in the front-back direction. When the lens-barrel 11A and the lens-barrel 11B are brought close to each other along the optical axis X1 in the front-back direction and the abutment surface 50 abuts against the abutment surface 51, positioning can be performed reliably and highly accurately in the front-back direction without excessive component force being generated.

The boss 52 having the abutment surface 50 and the boss 53 having the abutment surface 51 are easily manufactured by molds apart in the front-back direction. It is thus possible to easily obtain the base frame 12 without increasing the manufacturing cost.

When the lens-barrel 11A is fixed to the lens-barrel 11B in a state where the abutment surface 50 abuts against the abutment surface 51, the upper wall part 21, the side wall part 22, and the side wall part 23 of one base frame 12 are combined with those of the other base frame 12. As a result, an outer wall part of the composite lens-barrel 10 that is continuous in the front-back direction is formed. More specifically, on the upper surface of the composite lens-barrel 10, the edge portion of the upper wall part 21 (the upper surface part 21a) of the lens-barrel 11A contacts the edge portion of the upper wall part 21 of the lens-barrel 11B. On the left side surface of the composite lens-barrel 10, the edge portion of the side wall part 22 of the lens-barrel 11A contacts the edge portion of the side wall part 23 of the lens-barrel 11B. On the right side surface of the composite lens-barrel 10, the edge portion of the side wall part 23 of the lens-barrel 11A contacts the edge portion of the side wall part 22 of the lens-barrel 11B. These edge portions oppose to each other with a slight clearance therebetween in a state where the abutment surface 50 abuts against the abutment surface 51 so that the accuracy of positioning in the front-back direction by the abutment between the abutment surface 50 and the abutment surface 51 is not affected. A light shielding structure is formed on the edge portions of the upper wall part 21, the side wall part 22, and the side wall part 23. The light shielding structure prevents harmful light from externally entering the composite lens-barrel 10 even though the clearance is present.

Figure 7:
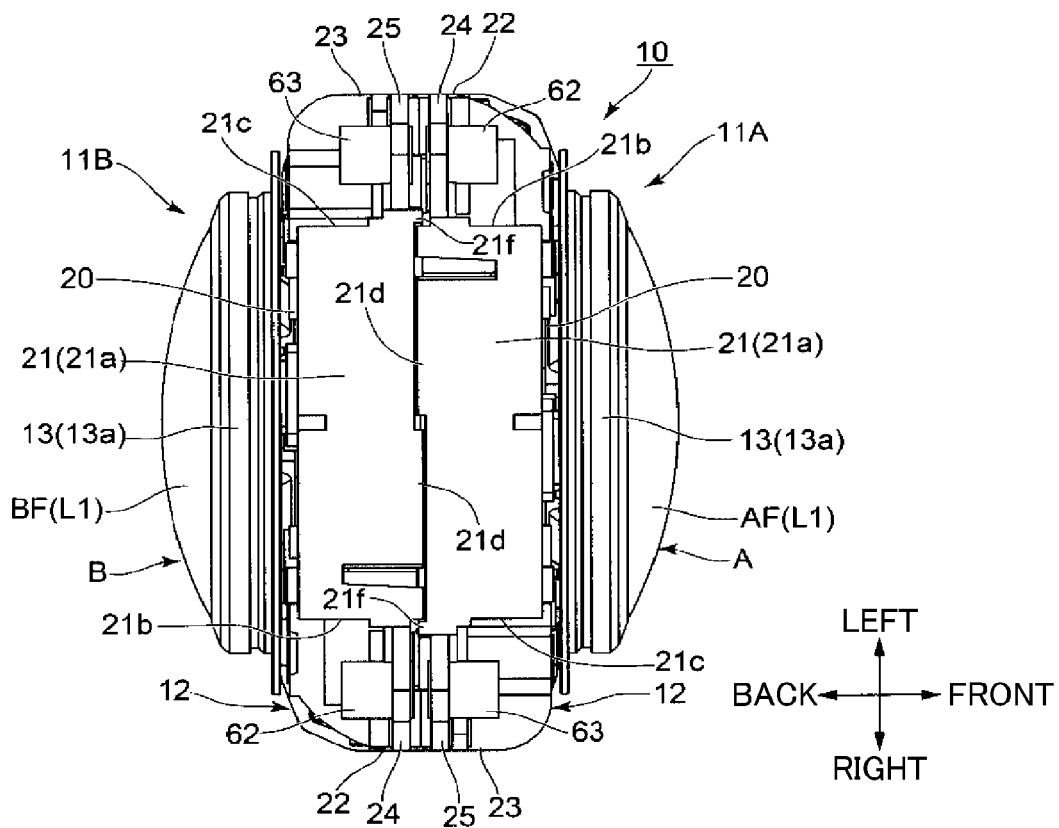
FIG. 7 is a view of the composite lens-barrel as seen from the top, according to an embodiment.
Figure 8:
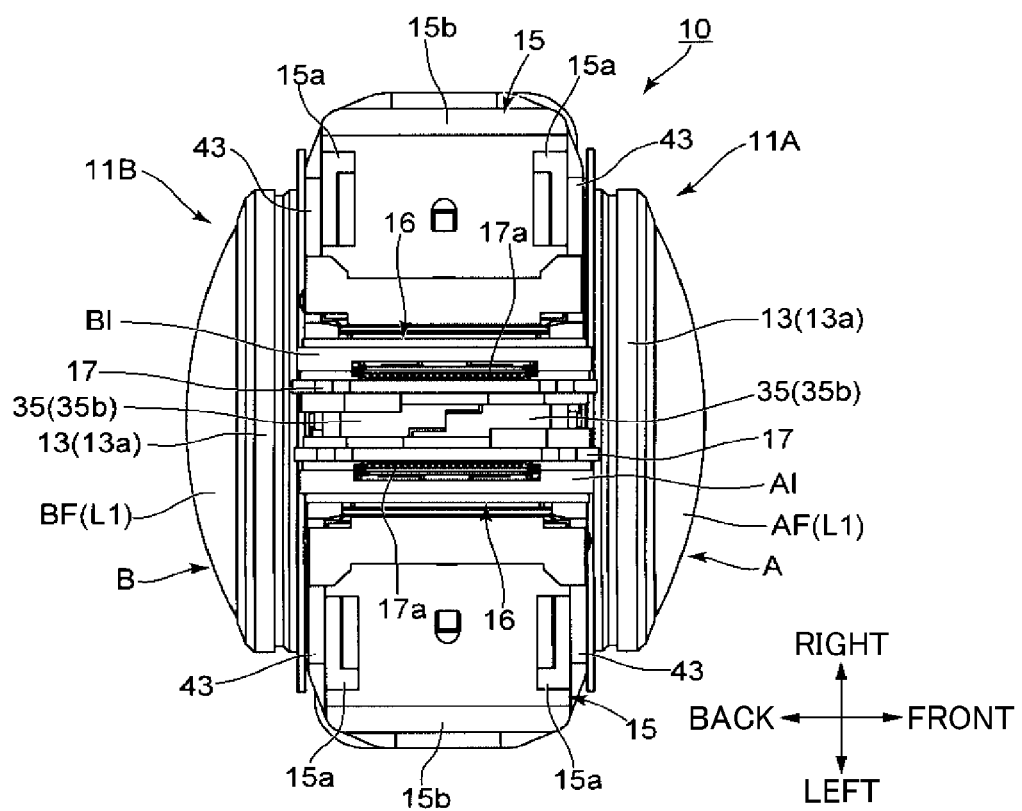
FIG. 8 is a view of the composite lens-barrel as seen from the bottom, according to an embodiment.
Figure 16:
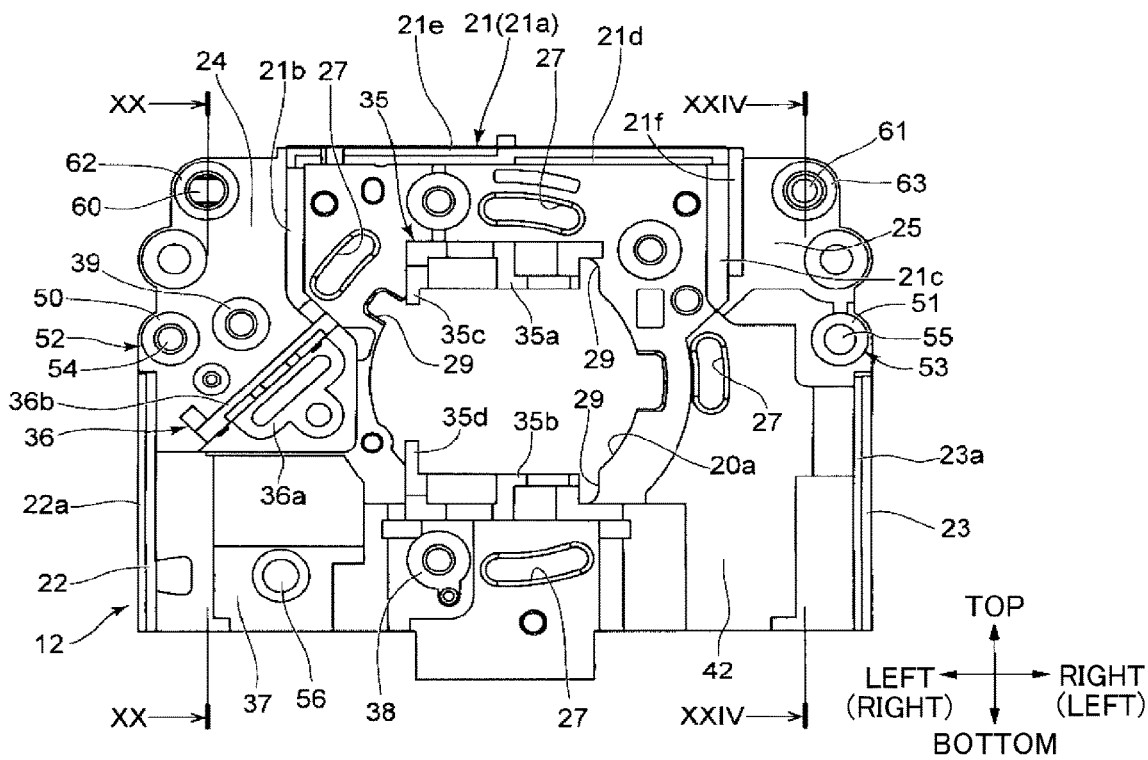
FIG. 16 is a rear view of the base frame, according to an embodiment.
Figure 17:
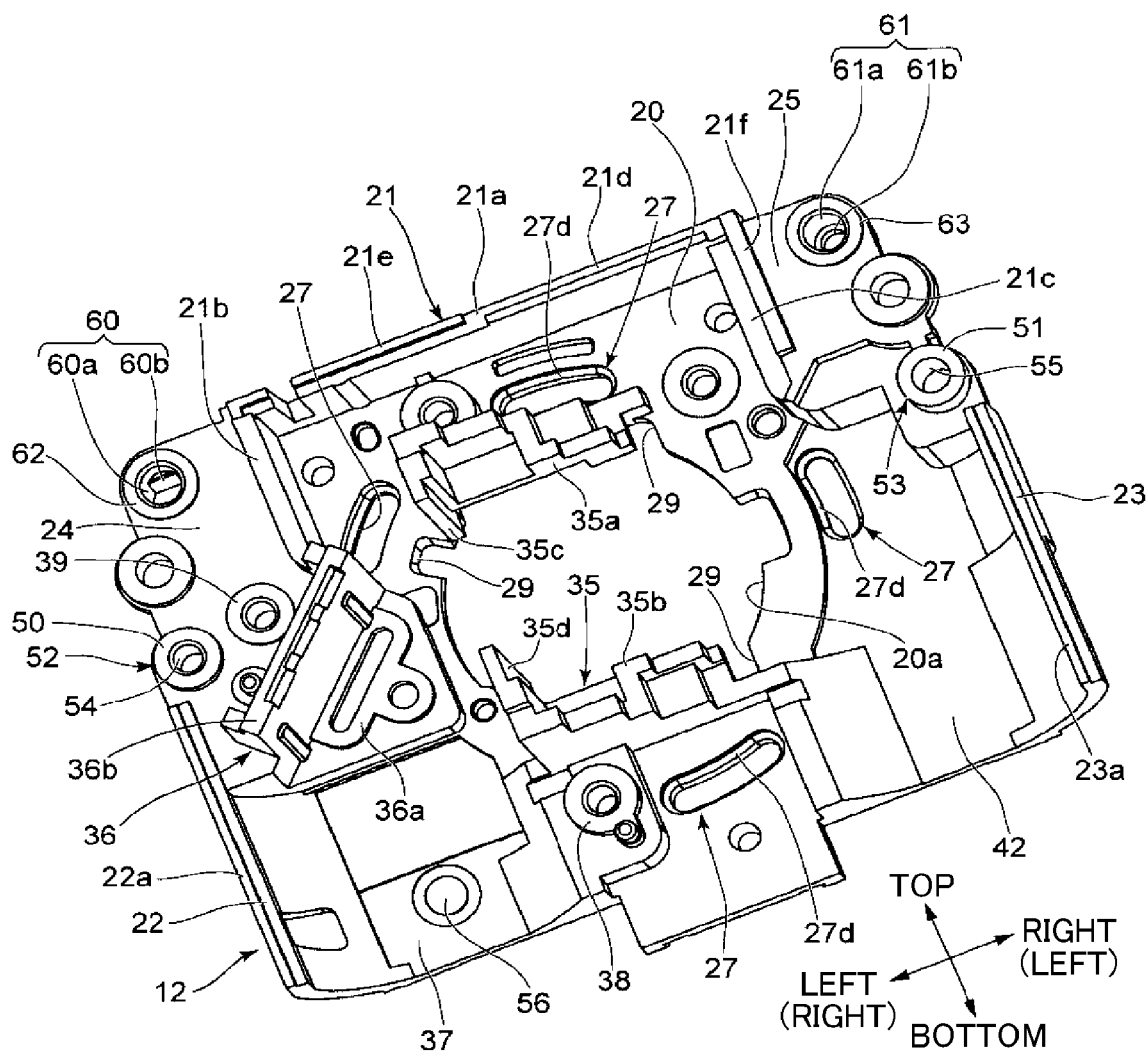
FIG. 17 is a perspective view of the base as seen from the rear, according to an embodiment.
Figure 18:
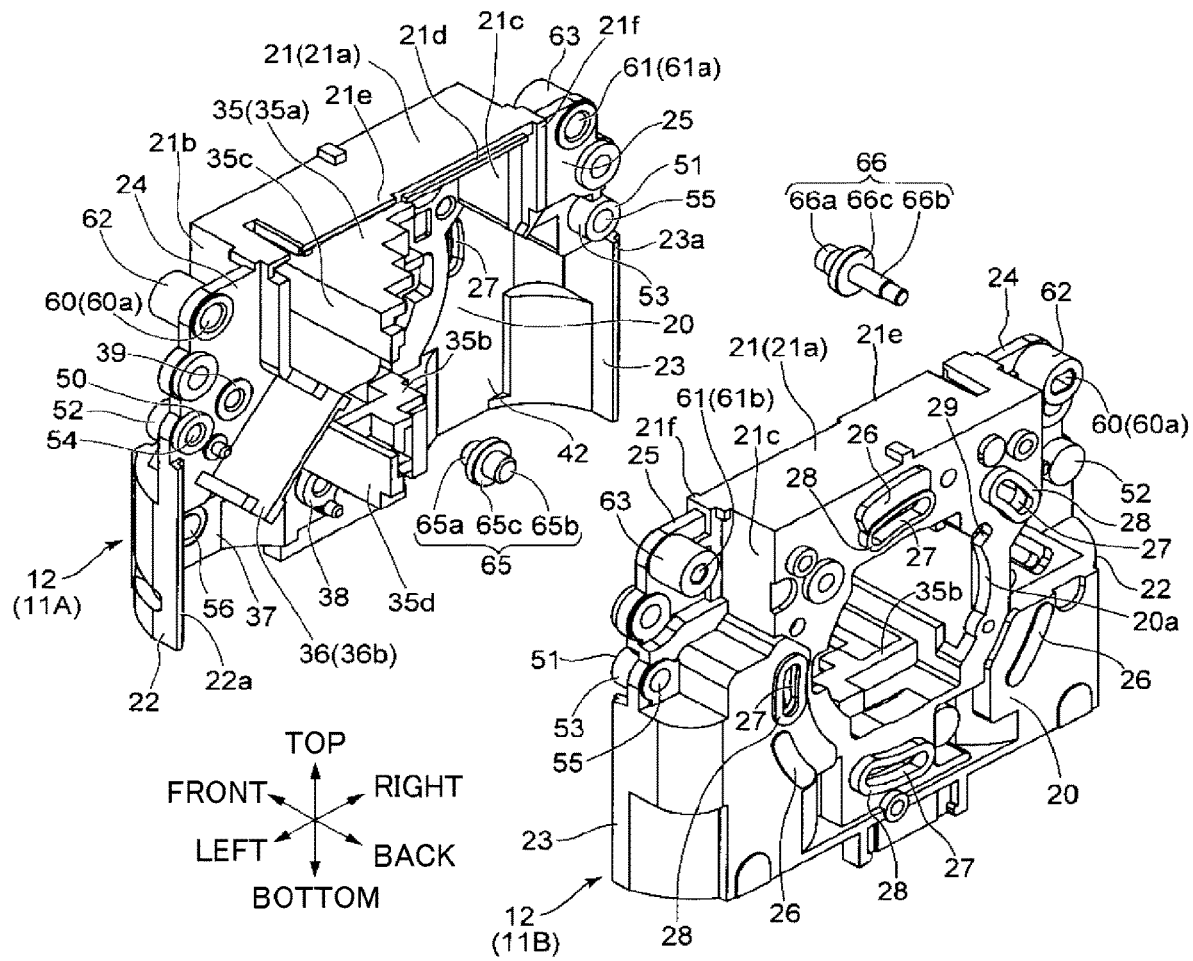
FIG. 18 is a perspective view of a state where the base frame of the two lens-barrels is split, according to an embodiment.

Specifically, as illustrated in FIGS. 16 and 17, ribs 21d and 21e are formed on the edge portion of the upper surface part 21a. When the lens-barrel 11A is combined with the lens-barrel 11B, the ribs 21d and the ribs 21e respectively overlap in the vertical direction. Ribs 22a and ribs 23a are formed on the edge portions of the side wall part 22 and the side wall part 23. When the lens-barrel 11A is combined with the lens-barrel 11B, the ribs 22a and the ribs 23a respectively overlap in the left-right direction. As the ribs 21d, the ribs 21e, the ribs 22a, and the ribs 23a respectively overlap, external light can be blocked. As illustrated in FIGS. 7, 11, 17 and the like, a rib 21f that projects to the rear surface side further than the upper surface part 21a is formed so as to be continuous with side surface part 21c. When the lens-barrel 11A is combined with the lens-barrel 11B, the rib 21f of one lens-barrel overlaps a part of the side surface part 21b of the other lens-barrel in the left-right direction (see FIG. 7). As the rib 21f overlaps the side surface part 21b, external light can be blocked.

As the abutment surface 50 abuts against the abutment surface 51 as described above, the relative position of the lens-barrel 11A and the lens-barrel 11B in the front-back direction is determined. For portions other than the abutment surface 50 and the abutment surface 51, a predetermined clearance is set in the front-back direction.

In each of the upper wall 35a and the lower wall 35b of the first prism holding part 35, an edge portion facing the rear surface side has a step shape in which a plane perpendicular to the optical axis X1 is continuous with a plane parallel to the optical axis X1. When the lens-barrel 11A is combined with the lens-barrel 11B, the stepped edge portion of the upper wall 35a of one lens-barrel opposes the stepped edge portion of the lower wall 35b of the other lens-barrel with a slight clearance therebetween. When an excessive load (an excessive load in a direction of bringing the lens-barrel 11A and the lens-barrel 11B close to each other) is applied to the lens-barrel 11A and the lens-barrel 11B in the front-back direction, the edge portions of the upper walls 35a and the lower walls 35b abut to each other and thus the load can be received. That is, opposing portions of the upper wall 35a and the lower wall 35b are used as auxiliary abutment surfaces and the load is distributed between the lens-barrel 11A and the lens-barrel 11B. As a result, it is possible to secure the strength of the composite lens-barrel 10 as a whole. In the edge portions of the upper wall 35a and the lower wall 35b, planes perpendicular to the optical axis X1 oppose to each other. For this reason, when the planes abut to each other, the planes can reliably receive a load without unnecessary component force being generated. In particular, the first prism holding part 35 is placed at a position that is intermediate between the abutment surface 50 and the abutment surface 51, which are largely apart from each other in the left-right direction, and the first prisms AP1 and BP1 that greatly influences the optical performance are held at this position. The front and rear first prism holding part 35 is formed to be capable of supplementally receiving a load at this position. This contributes to an enhancement in the overall strength of the composite lens-barrel 10 and securing of the optical performance.

As described above, when the lens-barrel 11A is combined with the lens-barrel 11B, the tubular part 14a of the rear-lens frame 14 is accommodated in the space between the rear-lens frame holding part 37 and the rear-lens frame accommodating part 42 that oppose to each other in the front-back direction. On the rear surface side of the base frame 12, a rear-lens frame opposing part 56 is formed in the rear-lens frame holding part 37 (see FIGS. 16 to 19). The rear-lens frame opposing part 56 is a plane perpendicular to the optical axis X1. As illustrated in FIG. 13, the rear-lens frame 14 includes an opposing projection part 14f on the front surface side that opposes the rear-lens frame holding part 37 of the base frame 12. The opposing projection part 14f is provided at a position that opposes the rear-lens frame opposing part 56 of the base frame 12 in a state where the rear-lens frame 14 is assembled to the base frame 12. In design, the opposing projection part 14f is set to abut against the rear-lens frame opposing part 56. If an accuracy error is present and thus the opposing projection part 14f and the rear-lens frame opposing part 56 are apart from each other, a flexible member may be inserted between the base frame 12 and the rear-lens frame 14 to apply urging force to the rear-lens frame 14. Consequently, the opposing projection part 14f can stably abut against the rear-lens frame opposing part 56. Specifically, when the opposing projection part 14f of the rear-lens frame 14 is apart from the rear-lens frame opposing part 56 on the side of the lens-barrel 11A, a flexible member is placed on the inner surface of the rear-lens frame accommodating part 42 of the base frame 12 on the side of the lens-barrel 11B. As a result, the rear-lens frame 14 of the lens-barrel 11A can be urged forward and the opposing projection part 14f can abut against the rear-lens frame opposing part 56. In this way, the position of the rear-lens frame 14 can be controlled with high accuracy in the lens-barrels 11A and 11B. The positioning of the rear-lens frame 14 does not hinder the overall positioning of the lens-barrels 11A and 11B using the abutment surface 50 and the abutment surface 51.

Next, the structure of positioning the lens-barrel 11A and the lens-barrel 11B in a direction perpendicular to the optical axis X1 will be described. A first hole 60 and a second hole 61 are formed in the base frame 12 of each of the lens-barrel 11A and the lens-barrel 11B. The first hole 60 is formed in a boss 62 that has a cylindrical shape and projects from the corner wall part 24 in the front-back direction. The second hole 61 is formed in a boss 63 that has a cylindrical shape and projects from the corner wall part 25 in the front-back direction. The boss 62 is located above the boss 52 having the abutment surface 50, and the boss 63 is located above the boss 53 having the abutment surface 51. The first hole 60 and the second hole 61 are through-holes that penetrate the base frame 12 in the front-back direction. The first hole 60 and the second hole 61 are formed at positions substantially symmetrical with respect to the virtual plane Q1 (FIG. 5) including the optical axis X1 and extending in the vertical direction (positions apart from each other in the left-right direction by the same distance from the virtual plane Q1).

Figure 26:
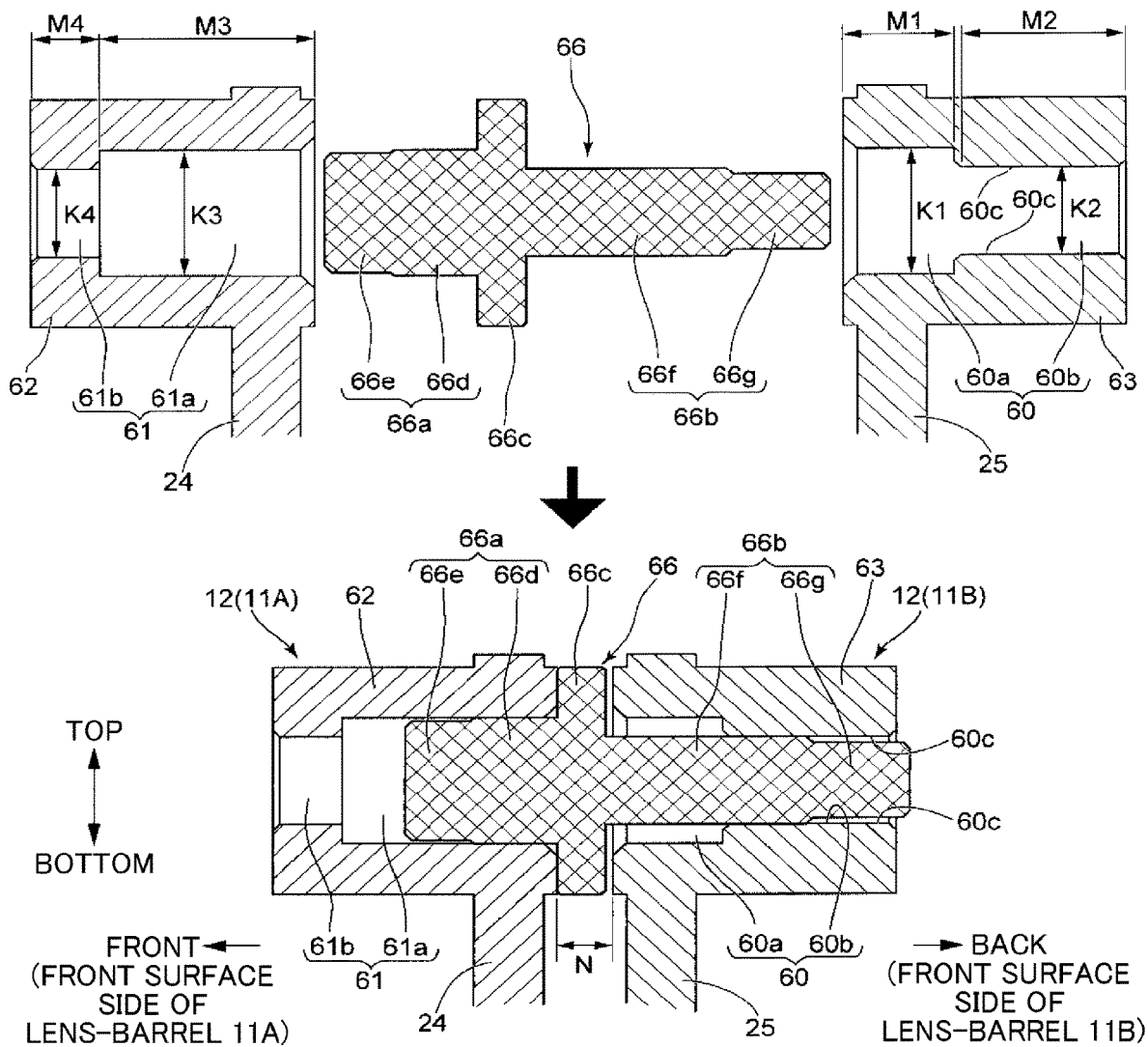
FIG. 26 is a cross-sectional view of the positioning mechanism on a sub-reference side, according to an embodiment.

The first hole 60 has a circular hole part 60a and an elongated hole part 60b that communicate with each other in the front-back direction. The circular hole part 60a is located on the rear surface side of the base frame 12, and the elongated hole part 60b is located on the front surface side of the base frame 12. The circular hole part 60a is a circular hole having a cylindrical inner circumferential surface centered on an axis extending in the front-back direction. The elongated hole part 60b is an elongated hole whose longitudinal direction is along the left-right direction (a radial direction of the circular hole part 60a), and has a pair of parallel flat surfaces 60c opposing to each other in the vertical direction. Each flat surface 60c is parallel to the optical axes X1, X2, and X4 and is perpendicular to the optical axis X3. The paired flat surfaces 60c are formed at positions symmetrical to each other in the vertical direction with respect to the axis of the circular hole part 60a. As illustrated in FIGS. 22 and 26, a vertical width (a distance between the paired flat surfaces 60c) K2 of the elongated hole part 60b is less than an inner diameter K1 of the circular hole part 60a. In addition, a length M2 of the elongated hole part 60b in the front-back direction is larger than a length M1 of the circular hole part 60a in the front-back direction.

The second hole 61 has a circular hole part 61a and a small-diameter hole part 61b that communicate with each other in the front-back direction. The circular hole part 61a is located on the rear surface side of the base frame 12, and the small-diameter hole part 61b is located on the front surface side of the base frame 12. The circular hole part 61a and the small-diameter hole part 61b are circular holes having cylindrical inner peripheral surfaces centered on the same axial line extending in the front-back direction, and have different inner diameters. As illustrated in FIGS. 22 and 26, an inner diameter K4 of the small-diameter hole part 61b is less than an inner diameter K3 of the circular hole part 61a. In addition, a length M3 of the circular hole part 61a in the front-back direction is longer than a length M4 of the elongated hole part 60b in the front-back direction.

Regarding the relationship between the first hole 60 and the second hole 61, the inner diameter K1 of the circular hole part 60a is substantially equal to the inner diameter K3 of the circular hole part 61a. In addition, the vertical width K2 of the elongated hole part 60b is substantially equal to the inner diameter K4 of the small-diameter hole part 61b. The length in the front-back direction decreases in the order of the length M3 of the circular hole part 61a, the length M2 of the elongated hole part 60b, the length M1 of the circular hole part 60a, and the length M4 of the small-diameter hole part 61b.

The entire length of the first hole 60 in the front-back direction is substantially equal to the entire length of the second hole 61 in the front-back direction. The hole 60 has a tapered portion that gradually decreases in inner diameter from the side of the circular hole part 60a to the side of the elongated hole part 60b between the circular hole part 60a and the elongated hole part 60b. The entire length of the first hole 60 contains the length of the tapered portion.

A shaft member 65 and a shaft member 66 are respectively inserted into the first hole 60 and the second hole 61 of the base frame 12 of each of the lens-barrels 11A and 11B. The shaft member 65 and the shaft member 66 are made of metal. FIGS. 22 and 26 illustrate the shaft member 65 and the shaft member 66, respectively.

The shaft member 65 has a shaft part 65a and a shaft part 65b that are aligned in the front-back direction, and a flange 65c located between the shaft part 65a and the shaft part 65b. The shaft part 65a and the shaft part 65b have cylindrical outer circumferential surfaces centered on the same axial line extending in the front-back direction, and the outer diameter of the shaft part 65a is substantially equal to the outer diameter of the shaft part 65b. The flange 65c is an annular portion that has a diameter larger than the outer diameter of the shaft part 65a and the shaft part 65b and projects from outer circumferential surface of the shaft part 65a and the shaft part 65b.

The length of the shaft part 65a in the front-back direction is equal to the length of the shaft part 65b in the front-back direction, and is slightly shorter than the length M1 of the circular hole part 60a in the first hole 60. Since the shaft part 65a and the shaft part 65b have a symmetrical shape in the axial direction with respect to the flange 65c (the outer diameter and length of the shaft part 65a are equal to the outer diameter and length of the shaft part 65b), the same structure is obtained if the shaft member 65 illustrated is reversed in the front-back direction so that the shaft part 65a is directed rearward and the shaft part 65b is direction forward.

The outer diameter of the shaft part 65a and the shaft part 65b is substantially equal to the inner diameter K1 of the circular hole part 60a and the inner diameter K3 of the circular hole part 61a. More specifically, the outer diameter of the shaft part 65a and the shaft part 65b is set to be slightly larger than the inner diameters K1 and K3, and the shaft part 65a and the shaft part 65b can be inserted into the circular hole part 60a and the circular hole part 61a in a light press-fit state.

The shaft member 66 has a large-diameter shaft part 66a and a small-diameter shaft part 66b that are aligned in the front-back direction, and a flange 66c located between the large-diameter shaft part 66a and the small-diameter shaft part 66b. The large-diameter shaft part 66a and the small-diameter shaft part 66b have cylindrical outer circumferential surfaces centered on the same axial line extending in the front-back direction, and the outer diameter of the large-diameter shaft part 66a is larger than the outer diameter of the small-diameter shaft part 66b. In addition, the length of the small-diameter shaft part 66b in the front-back direction is longer than the length of the large-diameter shaft part 66a in the front-back direction.

The large-diameter shaft part 66a has a proximal end part 66d close to the flange 66c and a distal end part 66e far away from the flange 66c, and the proximal end part 66d has a slightly larger outer diameter than the distal end part 66e. The length of the entire large-diameter shaft part 66a including the proximal end part 66d and the distal end part 66e in the front-back direction is longer than the length M1 of the circular hole part 60a and the length M4 of the small-diameter hole part 61b and is less than the length M2 of the elongated hole part 60b and the length M3 of the circular hole part 61a. The length of the proximal end part 66d in the front-back direction is longer than the length of the distal end part 66e in the front-back direction.

The small-diameter shaft part 66b has a proximal end part 66f close to the flange 66c and a distal end part 66g far away from the flange 66c, and the proximal end part 66f has a slightly larger outer diameter than the distal end part 66g. The length of the entire small-diameter shaft part 66b including the proximal end part 66f and the distal end part 66g in the front-back direction is slightly longer than the length of the entire circular hole part 60a and the length of the entire circular hole part 61a. The length of the proximal end part 66f in the front-back direction is longer than the length of the distal end part 66g in the front-back direction. The length of the proximal end part 66f is longer than the length M1 of the circular hole part 60a, the length M2 of the elongated hole part 60b, and the length M4 of the small-diameter hole part 61b, and is slightly less than and the length M3 of the circular hole part 61a. The length of the distal end part 66g is slightly longer than the length M4 of the small-diameter hole part 61b and is slightly less than the length M1 of the circular hole part 60a.

The outer diameter of the large-diameter shaft part 66a is substantially equal to the inner diameter K1 of the circular hole part 60a and the inner diameter K3 of the circular hole part 61a. More specifically, the outer diameter of the proximal end part 66d of the large-diameter shaft part 66a is set to be slightly larger than the inner diameters K1 and K3, and the outer diameter of the distal end part 66e is set to be slightly smaller than the inner diameters K1 and K3. Consequently, the proximal end part 66d of the large-diameter shaft part 66a can be inserted into the circular hole part 60a or the circular hole part 61a in a light press-fit state.

The outer diameter of the small-diameter shaft part 66b is substantially equal to the vertical width K2 of the elongated hole part 60b and the inner diameter K4 of the small-diameter hole part 61b. More specifically, the outer diameter of the proximal end part 66f of the small-diameter shaft part 66b is set to be slightly larger than the vertical width K2 and the inner diameter K4, and the outer diameter of the distal end part 66g is set to be slightly smaller than the vertical width K2 and the inner diameter K4. Consequently, the proximal end part 66f of the small-diameter shaft part 66b can be inserted into the elongated hole part 60b or the circular hole part 61b in a light press-fit state. However, insertion of the proximal end part 66f into the small-diameter hole part 61b is practically limited by the flange 66c (see FIG. 28).

The drawings of the present embodiment illustrate a case where the lens-barrel 11B is positioned with respect to the lens-barrel 11A. That is, the drawings illustrate a case where the lens-barrel 11A is a reference support lens-barrel and the lens-barrel 11B is a supported lens-barrel to be positioned.

As illustrated in FIGS. 20A and 20B, the shaft part 65a of the shaft member 65 is inserted into the first hole 60 of the lens-barrel 11A from the rear surface side. Insertion of the shaft member 65 is restricted at a position where the flange 65c abuts against an end face of the boss 62 on the rear surface side. Since the length of the shaft part 65a is less than the length M1 of the circular hole part 60a, the shaft part 65a is inserted into the circular hole part 60a and does not reach the elongated hole part 60b (See FIG. 22). Since the outer diameter of the shaft part 65a is slightly larger than the inner diameter K1 of the circular hole part 60a, the shaft part 65a is lightly press-fitted into the circular hole part 60a, and the shaft member 65 is stably attached to the base frame 12 of the lens-barrel 11A without rattling.

As illustrated in FIGS. 24A and 24B, the large-diameter shaft part 66a of the shaft member 66 is inserted into the second hole 61 of the lens-barrel 11A from the rear surface side. Insertion of the shaft member 66 is restricted at a position where the flange 66c abuts against an end face of the boss 63 on the rear surface side. Since the length of the large-diameter shaft part 66a is less than the length M3 of the circular hole part 61a, the large-diameter shaft part 66a is inserted into the circular hole part 61a and does not reach the elongated hole part 61b (See FIG. 26). Since the outer diameter of the proximal end part 66d of the large-diameter shaft part 66a is slightly larger than the inner diameter K3 of the circular hole part 61a, the large-diameter shaft part 66a is lightly press-fitted into the circular hole part 61a, and the shaft member 66 is stably attached to the base frame 12 of the lens-barrel 11A without rattling.

Since the outer diameter of the distal end part 66e of the large-diameter shaft part 66a is slightly smaller than the inner diameter K3 of the circular hole part 61a, at the initial stage of inserting the large-diameter shaft part 66a into the circular hole part 61a, the large-diameter shaft part 66a is not press-fitted into the circular hole part 61a but is smoothly inserted into the circular hole part 61a. In other words, as the large-diameter shaft part 66a is formed to be press-fitted only at the final stage of the insertion that requires stable support, insertion workability is improved.

Figure 19:
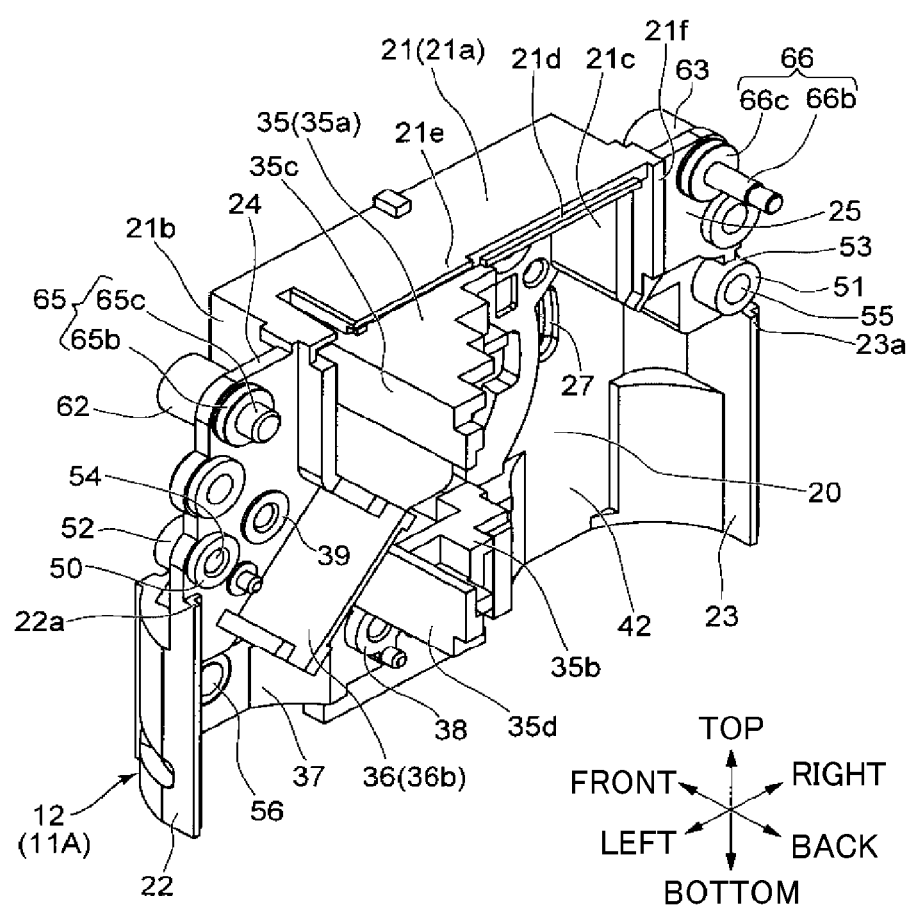
FIG. 19 is a perspective view of a state where two positioning shaft members are attached to the base frame of a front lens-barrel, according to an embodiment.

FIG. 19 illustrates a state where the shaft member 65 and the shaft member 66 are assembled to the base frame 12 of the lens-barrel 11A as described above. As can be seen from FIG. 19, the shaft part 65b of the shaft member 65 and the small-diameter shaft part 66b of the shaft member 66 project rearward (to the rear surface side of the lens-barrel 11A).

The timing of assembling the shaft member 65 and the shaft member 66 to the lens-barrel 11A can be freely selected. For example, as illustrated in FIG. 19, the shaft member 65 and the shaft member 66 may be assembled in advance to a single base frame 12, and then various members (the rear-lens frame 14, the third prism frame 15, the image sensor unit 16, and the like) may be assembled to the base frame 12. Alternatively, after the lens-barrel 11A is completed by assembling various members to the base frame 12, the shaft member 65 and the shaft member 66 may be assembled to the base frame 12. In both cases, the shaft member 65 and the shaft member 66 are press-fitted to the base frame 12, and thus the shaft member 65 and the shaft member 66 may not fall accidentally after assembling. In addition, the first hole 60 and the second hole 61 that are insertion targets of the shaft member 65 and the shaft member 66 are located on the upper edge side of the base frame 12 that is apart from the first prism holding part 35, the second prism holding part 36, the rear-lens frame holding part 37, the rear-lens frame accommodating part 42, and the like. It is thus easy to access the first hole 60 and the second hole 61 even after various members are assembled to the base frame 12. Consequently, it is easy to assemble the shaft member 65 and the shaft member 66 to the base frame 12.

Figure 25:
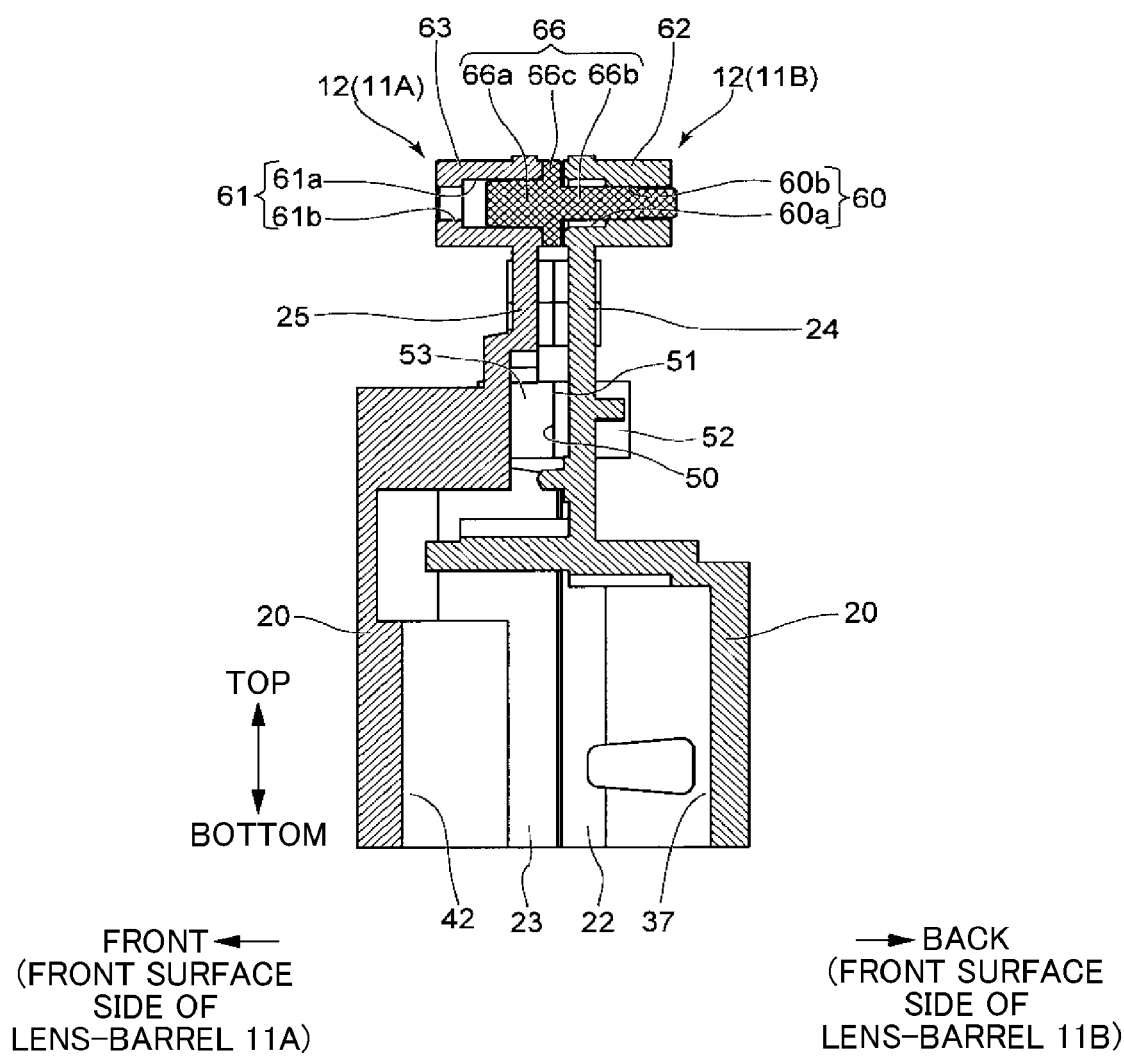
FIG. 25 is a cross-sectional view taken along a line XXV-XXV of FIG. 5, according to an embodiment.

The lens-barrel 11B is then assembled to the lens-barrel 11A having the shaft member 65 and the shaft member 66 assembled thereto. The second hole 61 (the circular hole part 61a) of the lens-barrel 11B opposes the shaft part 65b of the shaft member 65, and the first hole 60 (the circular hole part 60a) of the lens-barrel 11B opposes the small-diameter shaft part 66b of the shaft member 66. When the lens-barrel 11A and the lens-barrel 11B are brought close to each other in the front-back direction, the shaft part 65b is inserted into the second hole 61 of the lens-barrel 11B (FIG. 21), and the small-diameter shaft part 66b is inserted into the first hole 60 of the lens-barrel 11B (FIG. 25).

As described above, the abutment surfaces 50 and 51 abut to each other, and thus further approach of the lens-barrels 11A and 11B is restricted (the lens-barrels 11A and 11B are positioned in the front-back direction). As illustrated in FIGS. 22 and 26, at the time when the abutment surfaces 50 and 51 abut to each other, a gap N is present in the front-back direction between opposing end surfaces of the boss 62 and the boss 63 formed in the respective base frames 12 of the lens-barrels 11A and 11B. The thicknesses of the flange 65c of the shaft member 65 and the flange 66c of the shaft member 66 are slightly less than the gap N. Consequently, the shaft member 65 and the shaft member 66 do not hinder positioning in the front-back direction by the abutment surfaces 50 and 51.

The length of the shaft part 65a is less than the length M3 of the circular hole part 61a as illustrated in FIG. 22. Consequently, when the shaft part 65b is inserted into the second hole 61 formed in the lens-barrel 11B, the shaft part 65b is inserted into the circular hole part 61a but does not reach the small-diameter hole part 61b. Since the shaft part 65b having a cylindrical outer surface is fitted into the circular hole part 61a having a cylindrical inner surface, the movement of the base frame 12 of the lens-barrel 11B in a radial direction of the shaft part 65b (in all directions perpendicular to the optical axis X1) is limited. The relative position of the lens-barrel 11A and the lens-barrel 11B in a plane perpendicular to the optical axis X1 is set.

As the outer diameter of the shaft part 65b is slightly larger than the inner diameter K3 of the circular hole part 61a, the shaft part 65b is lightly press-fitted into the circular hole part 61a. Consequently, in a state where the lens-barrel 11A is combined with the lens-barrel 11B, it is possible to prevent the shaft member 65 from rattling and generating a strange noise.

As illustrated in FIG. 26, the small-diameter shaft part 66b is inserted into the first hole 60 of the lens-barrel 11B from a side of the circular hole part 60a to a side of the elongated hole part 60b. Since the outer diameters of the proximal end part 66f and the distal end part 66g are smaller than the inner diameter K1 of the circular hole part 60a, the small-diameter shaft part 66b does not contact the inner surface of the first hole 60 in initial insertion.

As the small-diameter shaft part 66b is further inserted into the first hole 60, the distal end part 66g enters the elongated hole part 60b. Since the outer diameter of the distal end part 66g is smaller than the vertical width K2 of the elongated hole part 60b, no load is generated between the shaft member 66 and the first hole 60 at this stage. When the small-diameter shaft part 66b is further inserted into the first hole 60, the proximal end part 66f enters the elongated hole part 60b. Then, the paired flat surfaces 60c of the elongated hole part 60b sandwich the proximal end part 66f from above and below, and the vertical movement of the base frame 12 of the lens-barrel 11B with respect to the small-diameter shaft part 66b is limited. As a result, the relative rotation of the lens-barrel 11A and the lens-barrel 11B about the shaft member 65 is restricted.

Meanwhile, as the length of the elongated hole part 60b in the left-right direction is larger than the outer diameter of the proximal end part 66f, the small-diameter shaft part 66b does not restrict the position of the lens-barrel 11B in the left-right direction. That is, the elongated hole part 60b of the lens-barrel 11B can move relative to the small-diameter shaft part 66b only in a specific direction (the left-right direction) within a plane perpendicular to the optical axis X1. It is thus possible to absorb variations in the assembling accuracy between the lens-barrel 11A and the lens-barrel 11B by the space between the small-diameter shaft part 66b and the first hole 60.

As the outer diameter of the proximal end part 66f is slightly larger than the vertical width K2 of the elongated hole part 60b, the small-diameter shaft part 66b is lightly press-fitted into the elongated hole part 60b. Consequently, in a state where the lens-barrel 11A is combined with the lens-barrel 11B, it is possible to prevent the shaft member 66 from rattling and generating a strange noise. Since the distal end part 66g is formed at the distal end of the small-diameter shaft part 66b as described above, there is no press-fit before the small-diameter shaft part 66b is inserted into the elongated hole part 60b to a certain extent. With this configuration, the timing of press-fitting the small-diameter shaft part 66b (the proximal end part 66f) of the shaft member 66 into the elongated hole part 60b of the first hole 60 substantially matches the timing of press-fitting the shaft part 65b of the shaft member 65 into the circular hole part 61a of the second hole 61. As a result, the lens-barrel 11B can be assembled to the lens-barrel 11A without being inclined. If the distal end part 66g is not formed and the entire small-diameter shaft part 66b has a diameter corresponding to that of the proximal end part 66f unlike the present embodiment, the timing of press-fitting the small-diameter shaft part 66b into the elongated hole part 60b of the first hole 60 is much faster than the timing of press-fitting the shaft part 65b into the circular hole part 61a of the second hole 61. The lens-barrel 11B tends to be inclined with respect to the lens-barrel 11A at the shaft member 66 and the first hole 60 functioning as a fulcrum.

As illustrated in FIG. 26, since the length of the small-diameter shaft part 66b is slightly larger than the length of the entire first hole 60, the small-diameter shaft part 66b passes through the first hole 60 of the lens-barrel 11B and the distal end part 66g slightly projects rearward from the boss 63. The lens-barrel 11A and the lens-barrel 11B are symmetrical to each other in the front-back direction and have the same shape. However, when the shaft member 66 projects from the front surface side of the lens-barrel 11B, the lens-barrel 11B is easy to be identified and thus workability is improved.

As described above, each of the shaft member 65 and the shaft member 66 is press-fitted into the first hole 60 and the second hole 61. However, if a press-fit load is too large, workability may be degraded or the base frame 12 may be deformed, which may affect the positioning accuracy. For this reason, the relative diameters of the first hole 60, the second hole 61, and the shaft members 65 and 66 are set such that light press-fit that does not degrade the positioning accuracy is achieved.

The position where positioning is performed by the shaft member 65 and the shaft member 66 is close to the position where positioning in the front-back direction is performed by the abutment surfaces 50 and 51. The shaft member 65 and the shaft member 66 are disposed to be substantially symmetrical to each other with respect to the virtual plane Q1 (FIG. 5) containing the optical axis X1 and extending in the vertical direction. As the distance between the shaft member 65 and the shaft member 66 in the left-right direction is set to be large and the shaft member 65 and the shaft member 66 are disposed to be symmetrical to each other with respect to the front lenses AF and BF and the first prisms AP1 and BP1, it is possible to achieve high positioning accuracy.

The first hole 60 and the second hole 61 into which the shaft member 65 and the shaft member 66 are inserted are located in the corner wall part 24 and the corner wall part 25 of the base frame 12, respectively. Consequently, it is possible to locate the holes with high space efficiency without interfering with other members constituting the lens-barrels 11A and 11B. Not only the corner wall parts 24 and 25 themselves have high rigidity, but also the first hole 60 and the second hole 61 are reinforced by the thickness of the boss 62 having the first hole 60 and the boss 63 having the second hole 61, the first hole 60 and the second hole 61 are hardly deformed when positioning is performed by the shaft member 65 and the shaft member 66.

Figure 27:
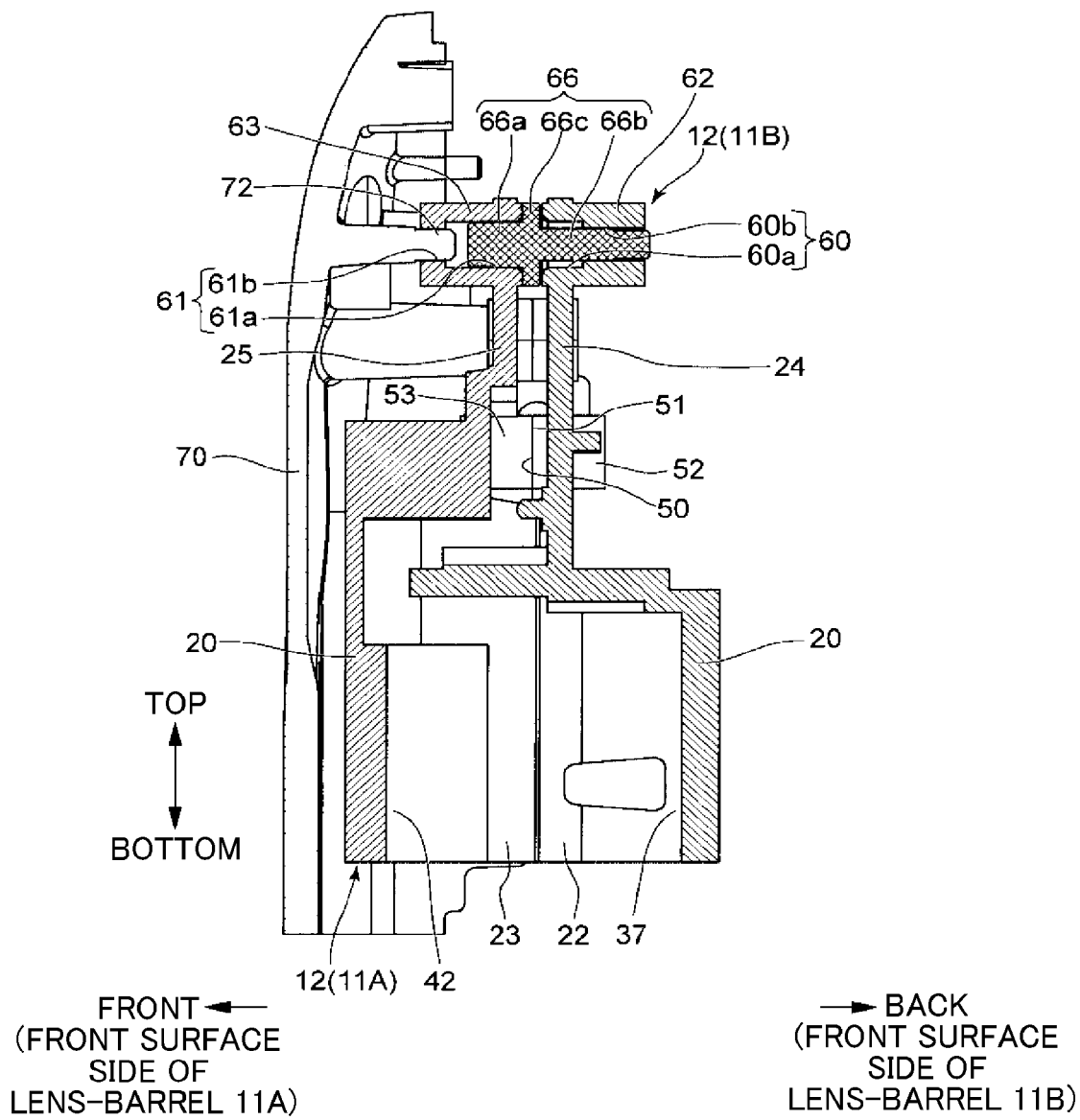
FIG. 27 is a cross-sectional view of a state where the front cover of the imaging apparatus is attached to the lens-barrel at a cross-section position illustrated in FIG. 25, according to an embodiment.

The first hole 60 and the second hole 61 are also used for attachment of an exterior member constituting the outer surface of an imaging apparatus. A front cover 70 illustrated in FIGS. 23 and 27 is an exterior member that covers the front surface side of the imaging apparatus. The front cover 70 includes a support projection 71 (FIG. 23) and a support projection 72 (FIG. 27) that project rearward on an inner surface side. The support projection 71 and the support projection 72 correspond to the first hole 60 and the second hole 61 of the base frame 12, respectively. The support projection 71 includes a cylindrical outer surface portion having a constant outer diameter near its distal end. The outer diameter of the cylindrical outer surface portion is substantially equal to the vertical width K2 of the elongated hole part 60b of the first hole 60. The support projection 72 includes a cylindrical outer surface portion having a constant outer diameter near its distal end. The outer diameter of the cylindrical outer surface portion is substantially equal to the inner diameter K4 of the small-diameter hole part 61b of the second hole 61.

When the front cover 70 is assembled to the composite lens-barrel 10, the distal end portion (the cylindrical outer surface portion) of the support projection 71 is inserted into the elongated hole part 60b of the first hole 60 in the lens-barrel 11A from the front side. The distal end portion (the cylindrical outer surface portion) of the support projection 72 is inserted into the small-diameter hole part 61b of the second hole 61 formed in the lens-barrel 11A from the front side. In the lens-barrel 11A, since the shaft part 65a of the shaft member 65 does not enter the elongated hole part 60b and the large-diameter shaft part 66a of the shaft member 66 does not enter the small-diameter hole part 61b either, the support projection 71 and the support projection 72 can be inserted into the first and second holes 60 and 61 without interfering with the shaft member 65 and the shaft member 66.

As the cylindrical outer surface of the support projection 72 is fitted into the cylindrical inner surface of the small-diameter hole part 61b, the position of the front cover 70 is set within a plane perpendicular to the optical axis X1. In addition, the support projection 71 is sandwiched between the paired flat surfaces 60c of the elongated hole part 60b, and thus rotation of the front cover 70 about the support projection 72 is restricted. Since the length of the elongated hole part 60b in the left-right direction is larger than the outer diameter of the support projection 71, the elongated hole part 60b does not restrict the position of the support projection 71 in the left-right direction. It is thus possible to absorb variations in the accuracy of assembling the front cover 70 to the composite lens-barrel 10 between the support projection 71 and the first hole 60. As described above, the first hole 60 and the second hole 61 are used not only for positioning by the shaft member 65 and the shaft member 66 but also for assembling and positioning the front cover 70.

In the lens-barrel 11B, the small-diameter shaft part 66b of the shaft member 66 penetrates the entire first hole 60 (see FIG. 26), but the shaft member 65 does not enter the small-diameter hole part 61b of the second hole 61 (see FIG. 22). Consequently, another member (for example, a rear cover constituting the exterior of an imaging apparatus with the front cover 70) may be inserted into the small-diameter hole part 61b of the lens-barrel 11B from rearward and positioning of another member may be performed.

Since the shaft member 65 has a symmetrical shape in the axial direction, the shaft part 65a and the shaft part 65b can be reversed. On the other hand, the shaft member 66 is asymmetrical in the axial direction. If the large-diameter shaft part 66a and the small-diameter shaft part 66b are reversed, an assembling failure occurs and the apparatus does not function correctly. The imaging apparatus of the present embodiment has a structure for preventing reverse assembling of the shaft member 66.

Figure 28:
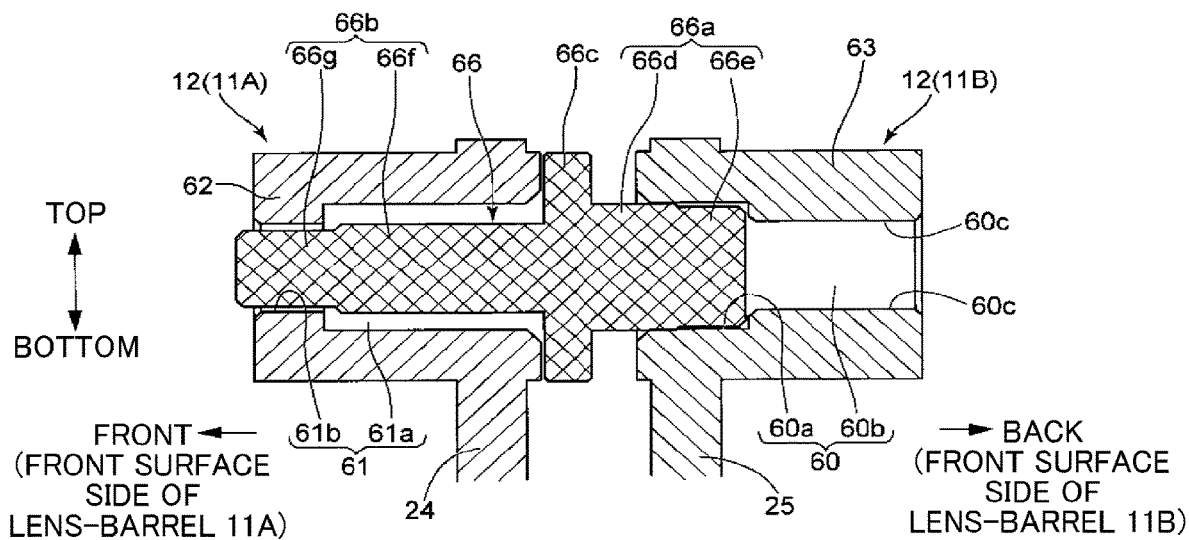
FIG. 28 is a cross-sectional view of an error state where the shaft member is reversely assembled to the positioning mechanism on the sub-reference side, according to an embodiment.

FIG. 28 illustrates a case where the shaft member 66 is assembled in reverse. The small-diameter shaft part 66b is inserted into the second hole 61 of the lens-barrel 11A. The outer diameter of the proximal end part 66f of the small-diameter shaft part 66b is smaller than the inner diameter K3 of the circular hole part 61a, and the outer diameter of the distal end part 66g is smaller than the inner diameter K4 of the small-diameter hole part 61b. The small-diameter shaft part 66b can thus be inserted into the second hole 61 until the flange 66c abuts against the end surface of the boss 62 on the rear surface side.

On the other hand, the length of the large-diameter shaft part 66a is longer than the length M1 of the circular hole part 60a of the first hole 60. When the large-diameter shaft part 66a is inserted into the first hole 60 of the lens-barrel 11B, before the abutment surfaces 50 and 51 abut to each other, the distal end of the large-diameter shaft part 66a abuts against a step at the boundary portion between the circular hole part 60a and the elongated hole part 60b and further insertion is restricted. In this state, a large gap is present in the front-back direction between the flange 66c and the boss 63. It is thus possible to recognize that the lens-barrels 11A and 11B are prevented from approaching to each other due to a failure in assembling the shaft member 66.

If the front cover 70 (FIGS. 23 and 26) is assembled in the state of FIG. 28, the support projection 72 abuts against the small-diameter shaft part 66b and thus cannot be inserted into the second hole 61 (the small-diameter hole part 61b) of the second hole 61. That is, the front cover 70 is unsteady in the front direction, and thus the failure in assembling the shaft member 66 can also be recognized at this state.

The present embodiment describes an example of positioning the lens-barrel 11B by using the lens-barrel 11A as a reference. However, the lens-barrel 11A and the lens-barrel 11B have the same shape and thus the lens-barrel 11B may be the reference. That is, the support lens-barrel functioning as a positioning reference and the supported lens-barrel that is positioned by the support lens-barrel may be reversed. Specifically, the shaft member 65 (or the shaft part 65a, or the shaft part 65b) is inserted into the first hole 60 (the circular hole part 60a) of the lens-barrel 11B, and the large-diameter shaft part 66a of the shaft member 66 is inserted into the second hole 61 (the circular hole part 61a) of the lens-barrel 11B. The shaft member 65 (one of the shaft part 65a and the shaft part 65b that is not inserted into the first hole 60 of the lens-barrel 11B) is inserted into the second hole 61 of the lens-barrel 11A (the circular hole part 61a), and the small-diameter shaft part 66b of the shaft member 66 is inserted into the first hole 60 (the elongated hole part 60b) of the lens-barrel 11A.

Figure 35:
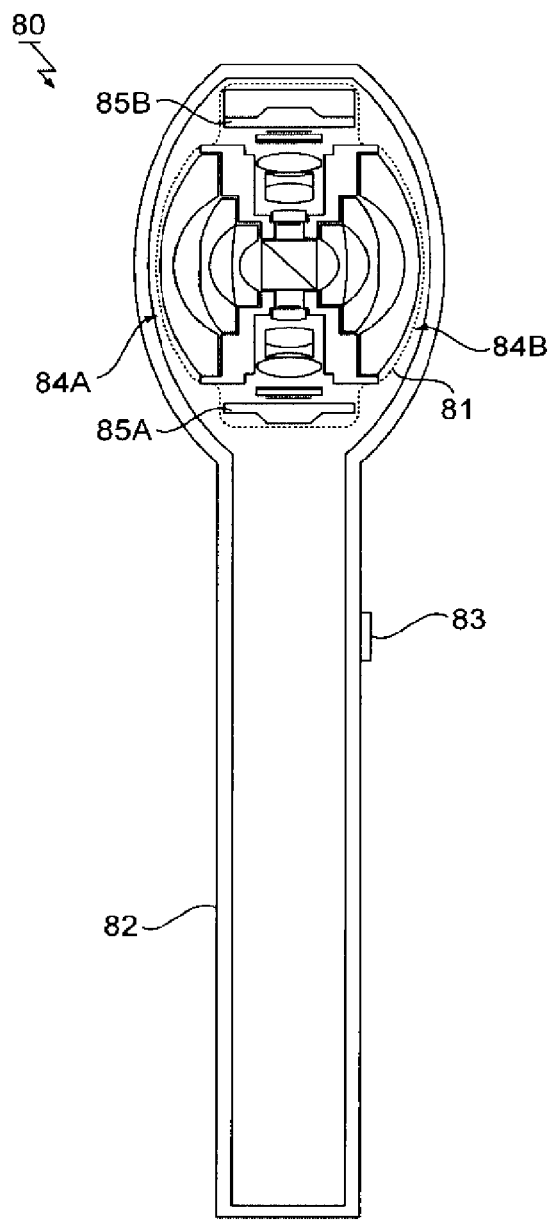
FIG. 35 is a cross-sectional view of the imaging apparatus according to the present embodiment.
Figure 36:
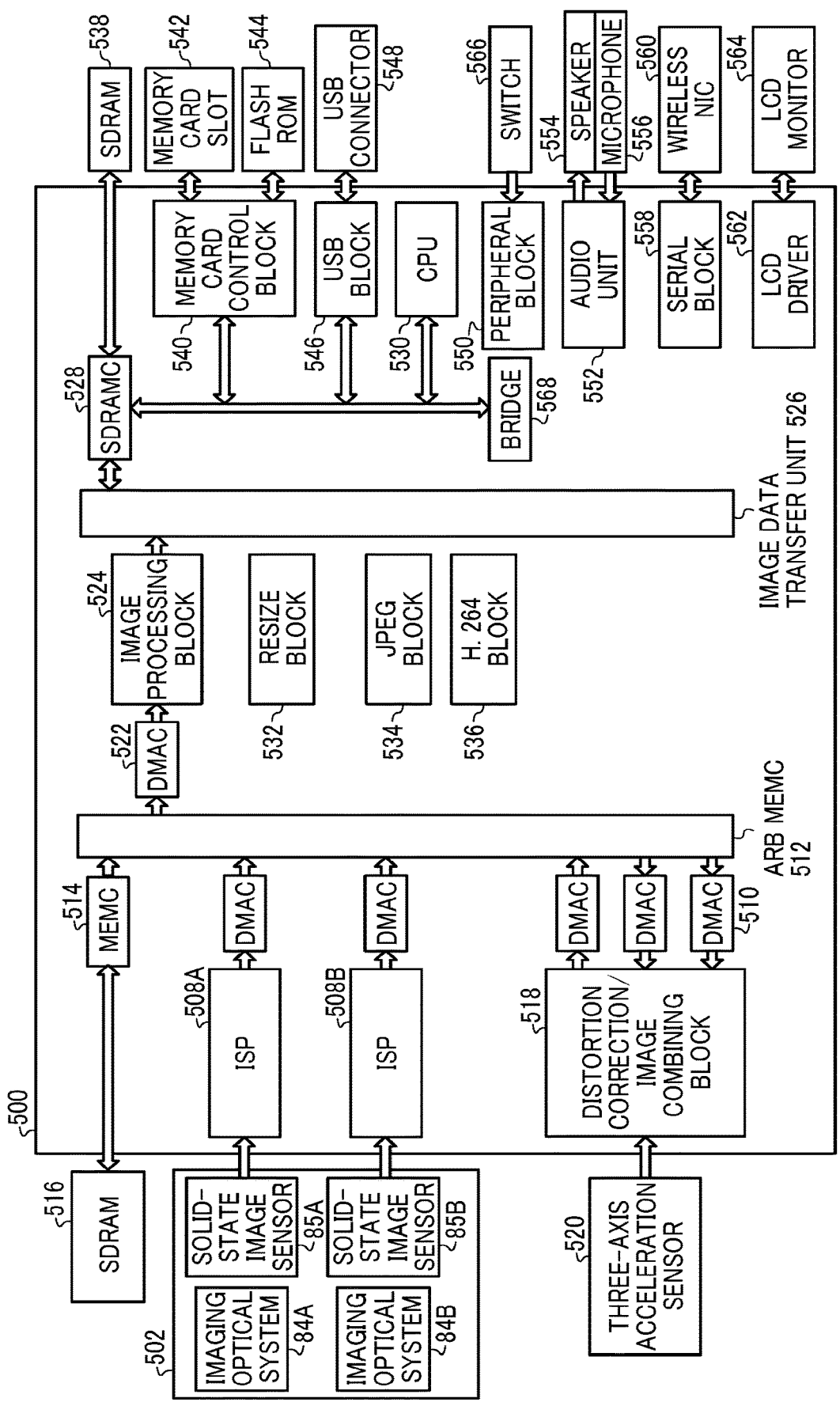
FIG. 36 is a diagram illustrating an example of a hardware configuration of the imaging apparatus according to the present embodiment.

The overall configuration in a case where the imaging system 1 and the composite lens-barrel 10 according to the present embodiment are used in an omnidirectional imaging apparatus will be described with reference to FIGS. 35 and 36. While arrangements of the two wide-angle lens systems A and B and the image sensors AI and BI in the composite lens-barrel 10 described above are slightly different from those of the omnidirectional imaging system, FIGS. 35 and 36 illustrate a common configuration of the omnidirectional imaging system. Characteristic configurations of the imaging optical system (optical system), the imaging system, and the imaging apparatus are disclosed in the above embodiment (FIGS. 1 to 34).

As illustrated in FIG. 35, the imaging apparatus 80 includes an imaging body 81, a casing 82 that holds the imaging body 81 and components including a controller and a battery therein, and a shutter button 83 disposed on an outer surface of the casing 82. The casing 82 includes an exterior member corresponding to the front cover 70 of the above embodiment. FIG. 35 illustrates only imaging optical systems 84A and 84B and solid-state image sensors 85A and 85B in the casing 82 of the imaging apparatus 80. In practice, however, the configuration corresponding to the composite lens-barrel 10 of the above embodiment (FIGS. 1 to 34) is incorporated in the casing 82.

The imaging body 81 illustrated in FIG. 35 corresponds to the imaging system 1 in the composite lens-barrel 10 described above, and includes two imaging optical systems 84A and 84B and two solid-state image sensors 85A and 85B such as CCD (Charge Coupled Device) sensors and CMOS (Complementary Metal Oxide Semiconductor) sensors. The imaging system is constituted by a combination of one imaging optical system 84 and one solid-state image sensor 85. Each imaging optical system 84 may be constituted by a six-group seven-lens fish-eye lens, for example. In the embodiment illustrated in FIG. 35, the fish-eye lens has a total angle of view more than 180° (=360°/n; n=2), preferably a total angle of view of 185° or more, and more preferably a total angle of view of 190° or more.

Optical elements of the two imaging optical systems 84A and 84B (lenses, prisms, filters, and apertures) are positioned with respect to the solid-state image sensors 85A and 85B. Positioning is performed so that the optical axes of the optical elements of the imaging optical systems 84A and 84B are orthogonal to the center of the light receiving areas of the corresponding solid-state image sensors 85A and 85B, and the light receiving area is the imaging surface of the corresponding fisheye lens. Each of the solid-state image sensors 85A and 85B is a two-dimensional solid-state image sensor whose area corresponds to the light receiving area, and converts light collected by each of the imaging optical systems 84A and 84B into an image signal.

In the imaging apparatus 80 illustrated in FIG. 35, the imaging optical systems 84A and 84B have the same specification, and are combined in opposite directions so that their optical axes are aligned with each other. The solid-state image sensors 85A and 85B convert a light distribution received into an image signal and outputs the image signal to an image processor in a controller (not shown). In the image processor, partial images input from the solid-state image sensors 85A and 85B are combined into an image having a solid angle of 4π radian (hereinafter, referred to as "omnidirectional image"). Details will be described later. The omnidirectional image is captured from a capturing point in all directions. While the omnidirectional image is generated in the embodiment illustrated in FIG. 35, a so-called panoramic image in which only a 360° horizontal plane is captured may be generated.

Further, as the scanning direction of the solid-state image sensor 85A matches the scanning line of the solid-state image sensor 85B, captured images can be easily joined to each other. That is, as the scanning direction and order of the solid-state image sensor 85A matches the scanning direction and order of the solid-state image sensor 85B at a joining portion, it is effective in joining objects on the boundary between the respective cameras, in particular in joining moving objects. For example, when the upper left portion of a captured image captured by the solid-state image sensor 85A matches the lower left portion of a captured image captured by the solid-state image sensor 85B as a joining portion of these images, the solid-state image sensor 85A scans from right to left and from top to bottom of the solid-state image sensor. On the other hand, the solid-state image sensor 85B scans from bottom to top and from right to left of the solid-state image sensor. As described above, control is executed based on an image joining portion so that the scanning directions of the solid-state image sensors 85 match, and thus it is easy to join images.

As described above, the fisheye lens has a total angle of view exceeding 180°. For this reason, when an omnidirectional image is formed, overlapping image portions of images captured by imaging systems are used as reference data indicating the same image and referred to as the reference for image joining. The omnidirectional image generated is output to a display device included in or connected to the imaging body 81, a printer, or an external storage medium such as an SD (Registered Trademark) card and a compact flash (Registered Trademark).

FIG. 36 illustrates an example of a hardware configuration of the imaging apparatus 80. The imaging apparatus 80 is configured by a digital still camera processor (hereinafter, simply referred to as "processor") 500, a lens-barrel unit 502 (corresponding to the composite lens-barrel 10 described above), and various components connected to the processor 500. The lens-barrel unit 502 includes the imaging optical systems 84A and 84B and solid-state image sensors 85A and 85B, which are described above. The solid-state image sensors 85A and 85B are controlled by a control command from a CPU 530 in the processor 500, which will be described later.

The processor 500 includes an ISPs (Image Signal Processors) 508A and 508B, DMACs (Direct Memory Access Controllers) 510, an arbiter (ARBMEMC) 512 for arbitrating memory access, a MEMC (Memory Controller) 514 for controlling memory access, and a distortion correction/image combining block 518. The ISPs 508A and 508B perform white balance setting and gamma setting on image data input after being subjected to signal processes by the solid-state image sensors 85A and 85B, respectively. An SDRAM 516 is connected to the MEMC 514. The SDRAM 516 temporarily stores data when processes are performed in the ISPs 508A and 508B and the distortion correction/image combining block 518. The distortion correction/image combining block 518 performs distortion correction and vertical correction on two partial images obtained from the two imaging systems using information from a three-axis acceleration sensor 520, thus combining images.

The processor 500 further includes a DMAC 522, an image processing block 524, the CPU 530, an image data transfer unit 526, an SDRAMC 528, a memory card control block 540, a USB block 546, a peripheral block 550, an audio unit 552, a serial block 558, an LCD (Liquid Crystal Display) driver 562, and a bridge 568.

The CPU 530 controls the operation of each unit in the imaging apparatus 80. The image processing block 524 performs various image processes on image data using a resize block 532, a JPEG block 534, an H.264 block 536, and the like. The resize block 532 is a block for enlarging or reducing the size of image data by an interpolation process. The JPEG block 534 is a codec block that performs JPEG compression and decompression. The H.264 block 536 is a codec block that compresses and decompresses moving images such as H.264. The image data transfer unit 526 transfers an image subjected to the image process in the image processing block 524. The SDRAMC 528 controls an SDRAM 538 connected to the processor 500, and the SDRAM 538 temporarily stores image data when various processes are performed on the image data in the processor 500.

The memory card control block 540 controls read and write of data from and in a memory card inserted in a memory card slot 542 and a flash ROM 544. The memory card slot 542 is a slot for removably attaching a memory card to the imaging apparatus 80. The USB block 546 controls USB communication with an external apparatus such as a personal computer connected thereto via a USB connector 548. A power supply switch 566 is connected to the peripheral block 550. The audio unit 552 is connected to a microphone 556 to which a sound signal is input by a user and a speaker 554 that outputs the recorded sound signal, and controls audio input and output. The serial block 558 controls serial communication with an external apparatus such as a personal computer, and a wireless NIC (Network Interface Card) 560 is connected to the serial block 558. The LCD driver 562 is a drive circuit for driving an LCD monitor 564 and converts a signal into a signal for displaying various states on the LCD monitor 564.

A control program described with a code that can be decoded by the CPU 530 and various parameters are stored in the flash ROM 544. When the power supply is turned on by an operation of the power supply switch 566, the control program is loaded into the main memory. The CPU 530 controls operations of units in the apparatus according to the program read into the main memory, and temporarily stores the data required for control in the SDRAM 538 and a local SRAM.

As described above, the imaging apparatus of the present embodiment includes, as the structure for joining the front-lens frame 13 to the base frame 12 constituted by the lens-barrels 11A and 11B, the retaining surface 27d (27e and 27f) and the retaining surface 33d (33e and 33f) in the bonding hole 27 (127 and 227) and the bonding hole 33 (133 and 233) used for filling bonding. Each of the retaining surface 27d (27e and 27f) and the retaining surface 33d (33e and 33f) has a shape that has an undercut structure to the adhesive U filled (that is opposite to the joining opposing surface 28 or 31). As a result, strong fixation is achieved not only in a direction perpendicular to the optical axis X1, but also in a direction parallel to the optical axis X1. While the structure is simple and space-saving, the structure can achieve high adhesion strength in all directions.

In particular, in the imaging system 1 of the above embodiment, the front lenses AF and BF supported by the front-lens frame 13 has high sensitivity. For this reason, it is necessary to strictly position the front-lens frame 13 with respect to the base frame 12 and to strongly fix the front-lens frame 13 to the base frame 12. The bonding structure described above can achieve a very excellent effect in securing the fixing strength of the front-lens frame 13 in a limited space.

As described above, the present invention is particularly useful for a precision apparatus that requires high-precision joining like a lens-barrel of an imaging apparatus, but is applicable to a joint structure for apparatuses other than the imaging apparatus. The present invention can be also used for joining other members other than a member for supporting lenses in the imaging apparatus.

While the imaging apparatus of the above embodiment is of a type that the lens-barrels 11A and 11B, which have the same shape, are combined with each other, the present invention is applicable to other types of imaging apparatuses and optical apparatuses.

Fillers other than adhesives can be selected as a filler used for joining. As an example, a melting resin or a powder resin may be filled in holes formed in two members that satisfy the requirements of the present invention and solidified, so that the two members can be joined to each other.

While FIGS. 32 to 34 illustrate variations for the cross-sectional shape of a bonding hole, the shape of a joining hole according to the present invention is not limited to these holes. For example, the bonding holes 27 (127 and 227) of the above embodiment has a cross-sectional shape whose opening area on a side of injecting an adhesive is large and whose opening area on an inner side that is open to the joining opposing surface 28 is small. This makes it easier for the adhesive to flow into the bonding hole 27 (127 and 227). However, if at least the condition that the retaining surface to the adhesive such as the retaining surface 27d (27e and 270 is formed at least inside the hole is satisfied, the present invention is applicable to a hole whose opening area on the adhesive injection side is partially small. The retaining surface 27d is any surface the prevents sliding, for example, as the adhesive is made in contact with such surface.

According to one or more embodiments of the present invention, it is possible to provide a joint structure that achieves high joint strength in all directions with a simple configuration.

With the simple configuration, complicated shape machining is not needed. This is advantageous, as it is sometimes difficult to secure sufficient bonding portions or areas for an imaging apparatus in small size, or ay precision apparatus that is desires to achieve downsizing and high joint strength between components at the same time.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

In one embodiment, a joint structure includes: a plurality of holes (27, 33) open to opposing surfaces (28, 31) of two members (12, 13) that oppose to each other, the holes (27, 33) each being filled with a fluid or powder filler (U) in a state where the holes (27, 33) communicate with each other, such that the two members (12, 13) are relatively fixed by the filler. The holes (27, 33) of the two members (12, 13) each have an inner surface that is wider in cross-sectional direction at a location distant from openings of the holes than at a location close to the openings.

In the joint structure, the holes (27, 33) of the two members (12, 13) each have a retaining surface (27d, 27e, 27f, 33d, 33e, 330 that faces opposite to the opposing surfaces. The retaining surface (27d, 27e, 27f, 33d, 33e, 330 has an inclined shape in which the inner surface of the hole (27, 33) becomes wider in cross-sectional direction toward a direction away from the opposing surfaces (28, 31).

In one embodiment, a joint structure includes: a plurality of holes (27, 33) open to opposing surfaces (28, 31) of two members (12, 13) that oppose to each other, the holes (27, 33) each being filled with a fluid or powder filler (U) in a state where the holes (27, 33) communicate with each other, such that the two members (12, 13) are relatively fixed by the filler. The holes (27, 33) of the two members (12, 13) each have a retaining surface that faces opposite to the opposing surfaces. When force for separating the opposing surfaces from each other is applied between the two members, a relative movement of the two members is restricted by a contact between the filler in a solidified state and the retaining surfaces.

The invention claimed is:

1. A joint structure, comprising:
a plurality of holes open to opposing surfaces of two frames that oppose each other, wherein
each hole of the plurality of holes is filled with a filler in a state that the plurality of holes communicate with each other and the two frames are fixed by the filler,
each hole of the plurality of holes has an inner surface that is wider in a cross-sectional direction at a location distant from an opening of the hole than at a location close to the opening,
at least one frame of the two frames supports an optical system, and
a direction of positioning of the optical system is a direction perpendicular to an optical axis that passes through the optical system.

2. The joint structure according to claim 1, wherein the filler is an adhesive.

3. The joint structure according to claim 1, wherein each hole of the plurality of holes has a retaining surface that faces opposite to the opposing surfaces, and the retaining surface has an inclined shape in which the inner surface of the hole becomes wider in the cross-sectional direction toward a direction away from the opposing surfaces.

4. The joint structure according to claim 3, wherein the retaining surface is a plane that faces the direction opposite to the opposing surfaces.

5. The joint structure according to claim 1, wherein positions of the two frames are adjustable in a direction along the opposing surface before being joined by the filler.

6. The joint structure according to claim 1, wherein the plurality of holes have openings that are different in size from each other on the opposing surfaces.

7. The joint structure according to claim 1, wherein the plurality of holes are elongated holes.

8. An apparatus, comprising:
the joint structure according to claim 1; and
the two frames.

9. An apparatus, comprising:
two frames that oppose each other; and
a plurality of holes open to opposing surfaces of the two frames, wherein
each hole of the plurality of holes is filled with a filler in a state that the plurality of holes communicate with each other and the two frames are fixed by the filler,
each hole of the plurality of holes has a retaining surface that faces opposite to the opposing surfaces, and
in a case that force for separating the opposing surfaces from each other is applied between the two frames, a relative movement of the two frames is restricted by a contact between the filler and the retaining surfaces of the plurality of holes.

10. The joint structure according to claim 1, wherein the optical system includes a lens.

11. The joint structure according to claim 1, wherein one frame of the two frames supports the optical system and another frame of the two frames supports another optical system, and a direction of positioning of the optical system and the another optical system is a direction perpendicular to an optical axis that passes through the optical system and the another optical system.

12. The joint structure according to claim 1, wherein the filler is a fluid.

13. The joint structure according to claim 1, wherein the filler is a powder.

14. The apparatus according to claim 9, wherein the filler is an adhesive.

15. The apparatus according to claim 9, wherein in each hole of the plurality of holes, the retaining surface has an inclined shape in which an inner surface of the hole becomes wider in the cross-sectional direction toward a direction away from the opposing surfaces.

16. The apparatus according to claim 15, wherein the retaining surface is a plane that faces the direction opposite to the opposing surfaces.

17. The apparatus according to claim 9, wherein positions of the two frames are adjustable in a direction along the opposing surface before being joined by the filler.

18. The apparatus according to claim 9, wherein the plurality of holes have openings that are different in size from each other on the opposing surfaces.

19. The apparatus according to claim 9, wherein the plurality of holes are elongated holes.

20. An apparatus, comprising:
a first frame having a first surface;
a second frame having a second surface, the first frame opposing the second frame such that the first surface opposes the first surface; and
a plurality of holes open to the first surface and the second surface, wherein
each hole of the plurality of holes is filled with a filler in a state that the plurality of holes communicate with each other and the first frame and the second frame are fixed by the filler, and
each hole of the plurality of holes has an inner surface that is wider in a cross-sectional direction at a location distant from an opening of the hole than at a location close to the opening.

* * * * *